United States Patent [19]

Shiratori

[11] Patent Number: 5,418,076

[45] Date of Patent: May 23, 1995

[54] MAGNETIC-OPTICAL RECORDING MEDIUM

[75] Inventor: Tsutomu Shiratori, Tokyo, Japan

[73] Assignee: Canon Kabushiki Kaisha, Tokyo, Japan

[21] Appl. No.: 795,345

[22] Filed: Nov. 20, 1991

[30] Foreign Application Priority Data

Nov. 20, 1990 [JP] Japan .................................. 2-312770
Sep. 20, 1991 [JP] Japan .................................. 3-241752

[51] Int. Cl.$^6$ ............................................. G11B 11/10
[52] U.S. Cl. ..................... 428/694 EC; 428/694 MM; 428/900; 369/13
[58] Field of Search ................... 369/13; 428/611, 694, 428/694 EC, 694 ML, 694 MM, 900

[56] References Cited

FOREIGN PATENT DOCUMENTS 0258978 7/1987 European Pat. Off. .
078652 5/1982 Japan .
302448 12/1988 Japan .

Primary Examiner—Paul J. Thibodeau
Assistant Examiner—R. Follett
Attorney, Agent, or Firm—Fitzpatrick, Cella, Harper & Scinto

[57] ABSTRACT

A magneto-optical recording medium in which n layers (n is an odd number equal to or more than 5) of magnetic thin film are exchange-coupled to be laminated on a substrate, and assuming that the n layers of magnetic thin film are the first magnetic layer, the second magnetic layer, ... the n-th magnetic layer in sequence, and the Curie temperature on the i-th magnetic layer is $Tc_i$, the following conditions are satisfied (where $Tc_{n+1}$ is an ambient temperature and m is an arbitrary natural number equal to or less than $(n-1)/2$).

(1) $Tc_{2m+1} \geq Tc_{2m}$, $Tc_1 \geq Tc_{2m}$ (2) $Tc_{2m} \geq Tc_{2(m+1)}$ (3) In a cooling process after heating the medium to a temperature of $Tc_2$ or more, when the temperature of the (2m)-th magnetic layer drops down to a temperature near $Tc_{2m}$, the magnetization of the (2m)-th and (2m+1)-th magnetic layers orients to the (2m−1)-th magnetic layer so that the bonding state due to exchange interaction may be stable, while the magnetization on the (2m−1)-th magnetic layer retains its immediately previous orientation state.

15 Claims, 21 Drawing Sheets

MAGNETIC-OPTICAL RECORDING MEDIUM

BACKGROUND OF THE INVENTION

1. Field of the Invention

The present invention relates to a magneto-optical recording medium for use in a magneto-optical memory, magnetic recording, or display element to read a record by utilizing a magnetic optical effect such as the magnetic Kerr effect or Faraday effect.

2. Related Background Art

In the magneto-optical recording, the information is written (or recorded) in such a manner as to cause a laser beam to irradiate a surface of a magnetic layer under the application of a bias magnetic field to a magnetic layer region of a magneto-optical recording medium. The laser heats an irradiated portion to a temperature near a Curie point or compensation point of the magnetic layer, and orients the magnetization of this portion in a direction opposite to that of other portions. On the other hand, the reading (regeneration) of written information is performed in such a manner as to cause a laser beam having a lower output than that used for recording and linear polarization, to irradiate a surface of the magnetic layer, and to optically detect the rotation performed by the magnetic optical effect on a polarized plane of reflected light via an analyser.

As the magneto-optical recording medium for use in such a magneto-optical recording, it is desirable to have a high writing efficiency, a stable storage of written information, and excellent reading characteristics. However, it is very difficult to meet all of these requirements with a single material. For example, in writing at the Curie point, it is necessary to decrease the Curie temperature in order to raise the writing efficiency, while the decreased Curie temperature may bring about the degradation of reading characteristics due to the lowered magnetic optical effect. Also, in writing at the compensation point, it is possible to write onto a material of a high Curie temperature with a relatively low power, as the material whose coercive force rapidly decreases near the compensation point is used, but there is a problem associated with the preserving stability of written information and the shape of magnetic domains.

Therefore, conventionally, a magneto-optical recording medium with the composite film having separate functions has been proposed. That is, a magnetic layer having a large magnetic optical effect and an excellent reading characteristic and a magnetic layer having a relatively low Curie temperature, a large vertical magnetic anisotropy, and an excellent writing characteristic are magnetically coupled to make a laminate, whereby the information written into the layer having the excellent writing characteristic is transferred onto the layer having the excellent reading characteristic with a magnetic coupling force to read out this transferred information. Particularly, the composite film which is coupled with an exchange coupling force is favorable in the transferability of the information and the preserving ability of transferred information, wherein a magneto-optical recording medium using Gd-Fe/Tb-Fe exchange coupling double layer film or Tb-FeCo/Tb-FeGo exchange coupling double layer film has been disclosed in Japanese Patent Application Laid-Open No. 57-78652 or No. 63-302448.

However, in the magneto-optical recording medium with the conventional composite film as above described, the magnetic layer having a large magnetic optical effect and an excellent reading characteristic is constituted of a material or composition with which the magnetic domains produced by the writing cannot be stably held with a single layer. That is, this magnetic layer can form and preserve the magnetic domains well only by the exchange coupling with the magnetic layer superior in the writing characteristic. Therefore, as its reaction, an action will be exerted in a direction collapsing the magnetic domains, due to the exchange coupling with the unstable magnetic layer (magnetic layer superior in the reading characteristic) of magnetic domains, in the magnetic domains formed in the magnetic layer superior in the writing characteristic. Accordingly, with the magneto-optical recording medium having conventional composite film, there was a problem that the preserving stability of the information was inferior to a medium where the layer for reading was not laminated. Particularly, it was inferior in the durability on repeated regeneration, or regenerative durability.

Also, in order to obtain a sufficient improvement of the reading characteristic, it is necessary to make the layer for reading thicker to some extent, but there was a problem that if the film thickness of this layer was larger, excellent magnetic domains could not be formed, or the preserving stability of the magnetic domains was worse.

In order to avoid these problems, it can be conceived that the characteristics of the reading layer should be those capable of stably preserving the magnetic domains formed, even when its layer exists singly. For its purpose, it is necessary to constitute this layer of a material or composition having a large vertical magnetic anisotropy and a relatively small saturated magnetization.

However, in this case, it is very difficult to implement a process of transferring the information written into the layer for writing into the layer for reading, and particularly, there is a problem that it is impossible to make the film thickness of the reading layer sufficiently large for reproduction.

SUMMARY OF THE INVENTION

It is an object of the present invention to provide a magneto-optical recording medium which solves the above-mentioned problems, and is excellent in the writing and reading characteristics, with the improvement in the preserving stability of the information, particularly, in the reproducing durability.

The above-mentioned objects can be accomplished by a magneto-optical recording medium having the following composition.

A magneto-optical recording medium in which n layers (n is an odd number equal to or more than 3) of magnetic thin film are laminated on a substrate, with the exchange coupling, and assuming that the n layers of magnetic thin film are the first magnetic layer, the second magnetic layer, . . . , the n-th magnetic layer in sequence, and the Curie temperature on the i-th magnetic layer is $Tc_i$, the following conditions are satisfied (where $Tc_{n+1}$ is an ambient temperature and m is an arbitrary natural number equal to or less than $(n-1)/2$).

1. $Tc_{2m+1} \geq Tc_{2m}$, $Tc_1 \geq Tc_{2m}$
2. $Tc_{2m} \geq Tc_{2(m+1)}$
3. In the cooling process after heating the medium to a temperature of $Tc_2$ or greater, when the temperature of the (2m)-th magnetic layer drops down to a temperature near $Tc_{2m}$, the magnetization on the (2m)-th and (2m+1)-th magnetic layers orients so that the coupling state with exchange interaction may be stable with respect to the (2m−1)-th magnetic layer, while the magnetization on the (2m−1)-th magnetic layer retains the same as its immediately previous orientation state.

According to another aspect, the present invention provides a magneto-optical recording medium in which (a) n layers, wherein n is an odd number equal to or more than 7, of magnetic thin film are exchange-coupled and sequentially laminated together and adhered to a substrate;

(b) the Curie temperatures, which are represented by Tc and a subscript, for the magnetic layers satisfy the following four relationships, wherein m is a positive, non-zero integer equal to or less than (n−1)/2, the value of each Tc subscript in said relationships representing the particular magnetic layer, when counting from 1 to n from the substrate, to which that Curie temperature pertains, except that a Tc having a subscript value equaling the value of n+1 represents, instead, room temperature:

(1) $Tc_1 \geq Tc_3$,
(2) $Tc_{2m} \geq Tc_{2(m+1)}$ for $m \geq 2$,
(3) $Tc_6 \geq Tc_2 \geq Tc_{(n+1)}$, and
(4) $Tc_{2m+1} \geq Tc_6$ for each possible value of m; and (c) at room temperature, the medium is stable in either a first magnetized state, in which the first magnetic layer is magnetized in a predetermined orientation state and atomic spins of each magnetic layer are aligned along the direction of film thickness, or a second magnetized state, in which the first magnetic layer is magnetized in the predetermined orientation state and atomic spins of each magnetic layer are aligned except for non-alignment of atomic spins between the third and fifth magnetic layers, said non-alignment of magnetic spins forming an interface magnetic wall;

(d) the properties of the magnetic layers are such that when the medium is heated from a temperature below $Tc_6$ to a first temperature level at which the temperature of the sixth magnetic layer exceeds $Tc_6$ and the temperature of the third magnetic layer is less than $Tc_3$, the magnetizations of the fourth and fifth magnetic layers are oriented and aligned with the atomic spin of the third magnetic layer so that the coupling state due to exchange interaction is rendered stable, while the magnetization of the third magnetic layer retains the orientation state existing therein before the heating;

(e) the properties of the magnetic layers are such that when the medium is heated from a temperature below $Tc_3$ to a second temperature level at which the temperature of the third magnetic layer exceeds $Tc_3$, the magnetization of the third magnetic layer changes to an orientation state different from the orientation state existing therein before the heating;

(f) the properties of the magnetic layers are such that when the medium, after having been heated to either the first or the second temperature level, is cooled, and as the declining temperature of each (2m)-th magnetic layer passes through its Curie temperature, the magnetizations of that layer and the adjacent (2m+1)-th magnetic layer are oriented and aligned with the atomic spin of the (2m−1)-th magnetic layer so that the coupling state due to the exchange interaction is rendered stable with respect to the adjacent (2m−1)-th layer, while the magnetization of the (2m−1)-th magnetic layer retains its immediately previous orientation state;

(g) the properties of the magnetic layers are such that when the medium, after having been heated to the second temperature level, is cooled, and as the declining temperature of the second magnetic layer passes through its Curie temperature, the magnetizations of that layer and the third magnetic layer are oriented and aligned with the atomic spin of the first magnetic layer so that the coupling state due to exchange interaction is rendered stable with respect to the first layer, while the magnetization of the fifth magnetic layer retains its immediately previous orientation state; and (h) the properties of the magnetic layers are such that when the medium, after having been heated to either the first or the second temperature level, is cooled, the first magnetic layer always retains the predetermined orientation state existing therein at room temperature.

According to still another aspect, the present invention provides a magneto-optical recording medium in which (a) n layers, wherein n is an odd number equal to or more than 5, of magnetic thin film are exchange-coupled and sequentially laminated together and adhered to a substrate;

(b) the Curie temperatures, which are represented by Tc and a subscript, for the magnetic layers satisfy the following three relationships for each possible value of m, wherein m is a positive, non-zero integer equal to or less than (n−1)/2, the value of each Tc subscript in said relationships representing the particular magnetic layer, when counting from 1 to n from the substrate, to which that Curie temperature pertains, except that a Tc having a subscript value equaling the value of n+1 represents, instead, room temperature:

(1) $Tc_1 \geq Tc_4$,
(2) $Tc_{2m+1} \geq Tc_4$, and
(3) $Tc_{2m} \geq Tc_{2(m+1)}$; and (c) the properties of the magnetic layers are such that when a first external magnetic field is applied to said medium, the magnetization of the first magnetic layer is oriented to be in a stable state relative to the external magnetic field, and the magnetization of the third magnetic layer retains the orientation existing therein before the application of the first external magnetic field;

(d) the properties of the magnetic layers are such that after the application of the first external magnetic field and during the application of a second external magnetic field that is constant, the following conditions are satisfied:

(i) at room temperature, the medium is stable in either a first magnetized state, in which atomic spins of each magnetic layer are aligned along the direction of film thickness, or a second magnetized state, in which the atomic spins of each magnetic layer are aligned, except for non-alignment of atomic spins between the first and third magnetic layers, said non-alignment forming an interface magnetic wall;

(ii) when the medium is heated from a temperature below $Tc_4$ to a first temperature level at which the temperature of the fourth magnetic layer exceeds $Tc_4$ and the temperature of the first magnetic layer is below $Tc_1$, the magnetizations of the second and third magnetic layers are oriented and aligned with the atomic spin of the first magnetic layer so that the coupling state due to exchange interaction is rendered stable, while the magnetization of the first magnetic layer retains the orientation state existing therein before the heating;

(iii) when the medium is heated from a temperature below $Tc_1$ to a second temperature level at which the temperature of the first magnetic layer exceeds $Tc_1$, the magnetization of the first magnetic layer changes to an orientation state different from the orientation state existing therein before the heating; and (iv) when the medium, after having been heated to either the first or the second temperature level, is cooled, and as the declining temperature of each (2m)-th magnetic layer passes through its Curie temperature, the magnetizations of that layer and the (2m+1)-th magnetic layer are oriented and aligned with the atomic spin of the (2m−1)-th magnetic layer so that the coupling state due to exchange interaction is rendered stable, while the magnetization of the (2m−1)-th magnetic layer retains its immediately previous orientation state.

DETAILED DESCRIPTION OF THE PREFERRED EMBODIMENT

The first example of the present invention will be described below with reference to the drawings.

Figure 1:
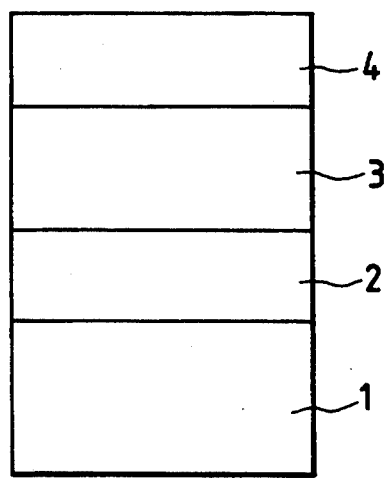
FIG. 1 is a typical cross-sectional view showing the constitution of a magneto-optical recording medium in the first example of the present invention.

FIG. 1 is a typical cross-sectional view showing the constitution of a magneto-optical recording medium in the first example of the present invention. This magneto-optical recording medium has an under coating layer 2, a magnetic composite film 3 and a protective layer 4 which are sequentially laminated on a transparent substrate 1 composed of a glass or plastic. The under coating layer 2 serves to prevent the corrosion of the magnetic composite film 3, as well as properly causing the light to enter the magnetic composite film 3, and is composed of a dielectric such as $Si_3N_4$, AlN, $SiO_2$, SiO, ZnS, or $MgF_2$.

The magnetic composite film 3 is one by which n magnetic layers of magnetic thin film (where n is an odd number equal to or more than 3) are laminated to exert the exchange interaction to each other, in which the n-th magnetic layer, the (n−1)-th magnetic layer, . . . are sequentially laid down from the side of the under coating layer 2, with the first magnetic layer being on the top or the opposite side to the under coating layer 2. Representing the Curie temperature of the i-th magnetic layer (where i is a natural number equal to or less than n) to be $Tc_i$, and defining as $Tc_{n+1} \approx$ ambient temperature, the following three fundamental conditions are satisfied for all natural numbers m equal to or less than (n−1)/2.

(a) $Tc_{2m+1} \geq Tc_{2m}$, $Tc_1 \geq Tc_{2m}$ (b) $Tc_{2m} \geq Tc_{2(m+1)}$ (c) In the cooling process after heating a part of the magneto-optical recording medium to a temperature near the Curie temperature Tc of the first magnetic layer, and changing an orientation state of magnetization for the first magnetic layer on the heated part of the magnetooptical recording medium to a state different from the state prior to heating, when the temperature of the (2m)-th magnetic layer drops down below the Curie temperature $Tc_{2m}$, the magnetization on the (2m)-th and (2m+1)-th magnetic layers orients so that the coupling state due to exchange interaction may be stable with respect to the (2m−1)-th magnetic layer, while the magnetization on the (2m−1)-th magnetic layer holds the orientation state just before the temperature of the (2m)-th magnetic layer drops down below the Curie temperature $Tc_2$.

Also, it is further preferable if the following conditions are satisfied.

(d) The vertical magnetic anisotropy (Ku) of the (2m+1)-th magnetic layer at the room temperature is $7 \times 10^5$ erg/cm$^3$ or more, preferably, $1 \times 10^6$ erg/cm$^3$ or more, and the saturated magnetization (Ms) at the room temperature is 300 emu/cm$^3$, preferably, 200 emu/cm$^3$.

Among the above-mentioned three conditions, the change of orientation state stable with the magnetization of the first magnetic layer in the condition (c) may be performed with the application of the bias magnetic field from the outside, or the magnetic field caused by the magneto-optical recording medium itself. In any case, it is sufficient that the magnetic field to transit the orientation state may be effectively applied on the first magnetic layer of heated part.

The protective layer 4 acts to prevent the corrosion of the magnetic composite layer 3 by covering the magnetic composite layer 3, and the protective layer 4 is composed of a dielectric of $Si_3N_4$, for example. The under coating layer 2, the magnetic composite film 3 and the protective layer 4 are deposited on the substrate 1, with the continuous sputtering by the use of a magnetron sputtering apparatus or the continuous evaporation method. Particularly, when the magnetic composite film 3 is formed, each magnetic layer is preferably exchange-coupled with each other if the film of each magnetic layer is continuously formed without breaking the vacuum.

In the magneto-optical recording medium as above described, it is considered that each magnetic layer may be constituted of various magnetic materials, but can be constituted with rare earth-iron group amorphous alloy, for example, containing about 10 to 40 atomic percent of one or more rare earth metal elements such as Pr, Nd, Sm, Gd, Tb, Dy, Ho, and about 60 to 90 atomic percent of one or more iron group elements such as Fe, Co, Ni. For the improvement of the corrosion resistance, elements such as Cr, Mn, Cu, Ti, Al, Si, Pt, may be added by a small amount. However, for the (2m+1)-th magnetic layer, it is preferable to use an element of the non-S state such as Tb, Dy, in order to satisfy the previous condition (Condition (d)) concerning the vertical magnetic anisotropy.

In the rare earth-iron group amorphous alloy, when the rare earth element is a heavy rare earth element, the magnetic moment of the rare earth element and that of the iron group element are coupled in antiparallel to each other, showing a so-called ferromagnetism. In this case, as the net magnetization appears as a difference between respective sub-lattice magnetizations, the saturated magnetization can be freely controlled by adjusting the composition ratio of both. Also, when the rare earth is a light rare earth such as Pr, Nd, Sm, the magnetic moment of the rare earth element and that of the iron group element are coupled in parallel to each other, showing a so-called ferromagnetism. In this case, the control of the saturated magnetization is difficult, but can be adjusted to some extent by adding a heavy rare earth element.

The Curie temperature can be controlled with the composition ratio of rare earth element to iron group element, but to control independently of the saturated magnetization, a method is more preferably used in which using an iron group element having Fe as the main component and partially substituting Co, the amount of substitution is controlled. That is, a Curie temperature elevation of about 5° C. can be expected by substituting Co for 1 atomic percent of Fe, whereby the additional amount of Co may be adjusted to obtain a desire Curie temperature, using this relation. Also, by adding a non-magnetic element such as Cr, Ti by a small amount, the Curie temperature can be lowered conversely. Or the Curie temperature can be controlled by using two or more rare earth elements and adjusting the composition ratio between them. As the Curie temperature can be freely controlled with any of these methods, the realization of the conditions (Condition (a), (b)) concerning the Curie temperature, which are required in practicing the present invention, is easy. However, taking into consideration the operating ambient temperature or recording sensitivity, the Curie temperature of the first magnetic layer satisfies the relation $Tc(2m+1) \geq Tc_1 \geq Tc_{2m}$, and more specifically, it is appropriate that it is in a range of about 120° to 200° C., the Curie temperature of the (2m)-th magnetic layer is in a range of about 70° to 200° C., and the Curie temperature of the (2m+1)-th magnetic layer is more than about 180° C.

The temperature dependence of various physical property values for the magnetic material is difficult to control, because of complex mechanisms. Therefore, in practicing the present invention, for the condition (Condition (c)) of defining a transition process of magnetized orientation state with the variation of temperature of the magneto-optical recording medium, an experiment was performed with the "film thickness" easily controlled without temperature dependence as a main parameter to determine the film thickness to meet the condition. However, in view of the recording sensitivity, the total film thickness of the magnetic layers is desirably less than about 2500 Å. Also, it is appropriate that the first magnetic layer is 100 to 500 Å, the (2m)-th magnetic layer is 5 to 100 Å, and the (2m+1)-th magnetic layer is 10 to 500 Å, in which the total film thickness of the (2m+1)-th magnetic layer is desirably more than 200 Å.

Here, a simplified theory in a typical case is shown to give a general design guide for the film thickness of each magnetic layer or a variety of physical property values for satisfying the condition (c).

In general, as the energy participating to the magnetized state of magnetic thin film, there are Zeeman energy, interface magnetic wall energy, Bloch magnetic wall energy, and demagnetizing field energy, in which the state energy in one magnetized state can be determined as the total of these energies.

When the magnetic thin film for one layer uniform in physical properties is noted, the state transition from state A to state B may occur if the state energy $E_A$ in a magnetized state A of this layer is higher than the state energy $E_B$ in the other magnetized state B of the same layer, and their difference is larger than a coercive force energy of this layer.

Now, assume that the magneto-optical recording medium having an exchange-coupled magnetic multilayer structure was placed in an initial state where the orientation of spins for each magnetic layer is all aligned. In the cooling process after heating a part of the medium and transiting the magnetized state of the first magnetic layer on the heated part to a state different from the initial state, some unaligned region of spin orientation should exist anywhere between the first, second and third magnetic layers, if the third magnetic layer may maintain the initial state. In the following explanation, it was assumed that the saturated magnetization at the temperature t on the i-th magnetic layer is $Ms_i(t)$, the coercive force is $Hc_i(t)$, the film thickness is hi, and the interface magnetic wall energy density between the i-th magnetic layer and the j-th magnetic layer is $\sigma w_{(i,j)}(t)$. And $H_E$ is a magnitude of the external magnetic field, and $\theta(t)$ is an angle by which the direction of the magnetization for the i-th magnetic layer is made with respect to the direction of the external magnetic field.

Now, consider an instance where the film thickness of the (2m)-th magnetic layer is relatively thin, and the Zeeman energy and the coercive force energy for this layer can be ignored. When the temperature of the second magnetic layer is below the Curie temperature $Tc_2$ so that the exchange interaction begins to act between spins, the unaligned region of spins between each layer is concentratively formed within the second magnetic layer where the exchange interaction is relatively small owing to the closeness to the Curie temperature. And the interface magnetic wall energy $\sigma w_{(1,3)}$ is stored therein. In this state, the alignment of spins with the fifth magnetic layer must be considered if an instance is included where the fourth magnetic layer is below the Curie temperature $Tc_4$, but the energy will not be stored as the unalignment may not occur if the fifth magnetic layer maintains the initial state at this time. Accordingly, the state energy $E_A$ for the third magnetic layer in this state A is, $$E_A = -Ms_3(t) \cdot h_3 \cdot H_E \cos\theta_3(t) + \sigma w_{(1,3)}(t)$$

Where the first term corresponds to the Zeeman energy. The Bloch magnetic wall energy or demagnetizing field energy is ignored here because of its relatively small contribution to the magnetized state.

Assuming that the magnetization of the third magnetic layer is reversed by 180° at this temperature when each layer is a vertical magnetized film, the orientation of spins for the first and third magnetic layers is aligned so that the magnetic wall at this interface will vanish. Conversely, the unalignment of spins will occur within the fourth magnetic layer between the third and fifth magnetic layers, where the interface magnetic wall energy $\sigma w_{(3,5)}$ is stored. (However, $\sigma w_{(3,5)} = 0$ when the fourth magnetic layer is above the Curie temperature $Tc_4$). The state energy $E_B$ of the third magnetic layer in this virtual state B is $$E_B = -Ms_3(t) \cdot h_3 \cdot H_E \cos(\theta_3(t) + 180°) + \sigma w_{(3,5)}(t)$$

Therefore, if the inequality $$E_A - E_B = -2 \cdot Ms_3(t) \cdot h_3 \cdot H_E \cos\theta_3(t) + \sigma w_{(1,3)}(t) - \sigma w_{(3,5)}(t) > 2 \cdot Ms_3(t) \cdot h_3 \cdot Hc_3(t) \quad (1)$$

stands, the third magnetic layer actually makes the state transition. Where the right side shows the coercive force energy for the third magnetic layer.

As the condition where the first magnetic layer is not reversely magnetized, before the expression (1) stands, that is, at a temperature exceeding the highest temperature $t_{max}$ at which the expression (1) stands, it is necessary that the following inequality always stands, in the same way of thinking, $$-2 \cdot Ms_1(t) \cdot h_1 \cdot H_E \cos\theta_1(t) + \sigma w_{(1,3)}(t) < 2 \cdot Ms_1(t) \cdot h_1 \cdot Hc_1(t) \quad (2)$$

The condition for the state transition of the magnetization in the (2m+1)-th magnetic layer when the (2m)-th magnetic layer is below respective Curie temperature $Tc_{2m}$ can be obtained in the same way of thinking. This is summarized as follows.

① In a range temperature $Tc_{2m}$ or less, the temperature $t_0$ satisfying the following inequality, $$2 \cdot Ms_{2m+1}(t_0) \cdot h_{2m+1} \cdot (Hc_{2m+1}(t_0) + H_E \cdot \cos\theta_{2m+1}(t_0)) < \sigma w_{(2m-1, 2m+1)}(t_0) - \sigma w_{(2m+1, 2m+3)}(t_0)$$

must exist.

② In a range from the highest temperature $t_{0max}$ among the temperatures $t_0$ to $Tc_{2m}$, the following inequality must always stand, $$\Sigma_{i=1}^{2m}2 \cdot Ms_i(t) \cdot h_i \cdot (Hc_i(t) + H_E \cdot \cos\theta_i(t)) > \sigma w_{(2m-1, 2m+1)}(t)$$

The above conditions serve as only a broad guide. In practice, the Zeeman energy or coercive force energy of the (2m)-th magnetic layer may affect the magnetization process to some extent, and the Bloch magnetic wall energy can not be completely ignored.

As it is possible to take a confirmation method as shown in the following example 1 as to whether or not the condition (c) stands in practice, the condition (c) can be realized with the attempts to adjust the film thickness of each layer or the Curie temperature, based on the above design guide.

In the magneto-optical recording medium of the present invention, the first magnetic layer corresponds to a magnetic layer for writing, and the (2m+1)-th magnetic layer corresponds to a magnetic layer for reading. The (2m)-th magnetic layer is one for disconnecting the magnetic coupling between layers. Next, a process of forming the magnetic domain in the magneto-optical recording medium composed of such a composite film will be described below.

After the erasion, by causing a laser beam to radiate a surface of the magnetic layer under the application of a bias magnetic field for recording, the radiated part is heated near the Curie temperature $Tc_1$ for the first magnetic layer. In the cooling process from this temperature after the radiation of the laser beam, the magnetic domain having a reversed magnetized orientation is first formed in the first magnetic layer. At this time, as the second magnetic layer is above the Curie temperature, the magnetic coupling between the first magnetic layer and the third magnetic layer has been disconnected. As the (2m+1)-th magnetic layer has a Curie temperature above $Tc_1$, and is composed of a material having a great vertical magnetic anisotropy, it has no reversed magnetization near this temperature, retaining the magnetized orientation in the erased state. (However, the reversal of magnetization may occur depending on the material. Also, with a temperature gradient within the laser radiating region, minute magnetic domains may be formed in a central portion of the region. In either case, there is no great difference in the following explanation.) Now, if the medium temperature drops down to the Curie temperature of the second magnetic layer or less, the exchange interaction may begin to act between the first and second magnetic layers, and between the second and third magnetic layers, resulting in each layer being magnetically coupled. As the fourth magnetic layer is above its Curie temperature, the magnetic coupling between the third and fifth magnetic layers has been disconnected. Here, as the first magnetic layer and the third magnetic layer are reversed in the spin orientation, the spin transition region is formed between these two layers, where the energy caused by the exchange interaction will be stored. As that energy will increase if the temperature further drops down, one layer may be reversely magnetized to align the orientation of spins for both layers. Then, if the film thickness or physical property value of each magnetic layer is controlled so that the energy required to reverse the magnetization of the third magnetic layer may be less than the energy required to reverse the magnetization of the first magnetic layer at this temperature, the third magnetic layer is preferentially reversed in the magnetization to be aligned with the direction of spins in the first magnetic layer. (The design guide for the film thickness or physical property value to implement this process will be further described below in the example.) Thus, the magnetic domains of the first magnetic layer are transferred onto the third magnetic layer.

If the medium temperature falls below the Curie temperature for the fourth magnetic layer, the fifth magnetic layer is magnetically coupled via this layer, so that the magnetic domains in the third layer and its preceding layers are transferred onto the fifth magnetic layer. In this way, the magnetic domains are transferred successively, and finally when the medium temperature falls below the Curie temperature $Tc_{n-1}$ for the (n−1)-th magnetic layer, the magnetic domains are transferred onto the n-th magnetic layer, whereby the formation of magnetic domains on the composite film can be completed.

The reading of record information from the magneto-optical recording medium having the information recorded as above described can be performed by causing a linearly polarized, low output laser beam to radiate the side of the n-th magnetic layer. A high magnetic optical effect can be obtained as an incident laser beam is reflected by a group of magnetic layers having high Curie temperatures, or the (2m+1)-th magnetic layer. Also, these magnetic layers can retain the recorded information stably in spite of the temperature elevation of medium with the incident laser beam or the application of magnetic field from the outside, because of the high Curie temperature, great vertical magnetic anisotropy, and relatively small saturated magnetization.

Next, the first example of the present invention will be described in detail in contrast with the comparative examples.

EXAMPLE 1

Figure 2:
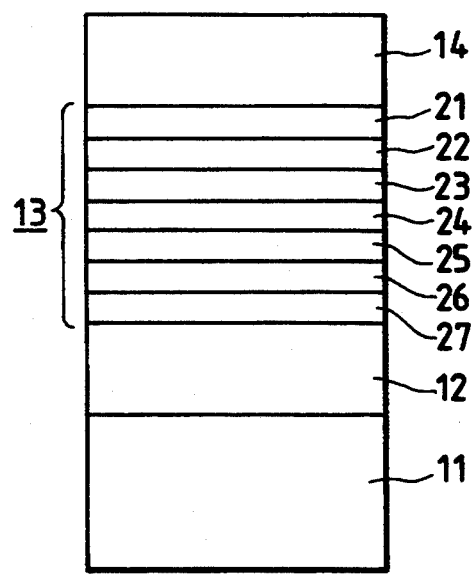
FIG. 2 is a typical cross-sectional view showing the constitution of a magneto-optical recording medium of present invention, consisting of seven magnetic layers.

As shown in FIG. 2, a magneto-optical recording medium in which the magnetic composite layer 13 has seven magnetic layers 21 to 27 was fabricated. This magneto-optical recording medium has the under coating layer 12 composed of SiN, the magnetic composite film 13, and the protective layer 14 composed of SiN which are sequentially laminated on a substrate 11 made of polycarbonate. The magnetic composite layer 13 has the seventh magnetic layer 27, the sixth magnetic layer 26, ... sequentially laminated from the side of the under coating layer 12, the protective layer 14 side being the i-th magnetic layer 21.

In the following, a method of fabricating this magneto-optical recording medium will be described in detail.

The disk-like substrate 11 made of polycarbonate having a diameter of 86 mm in which track grooves and format signals were preformed was set within a sputtering apparatus having four target sources so that the distance to target may be 20 cm, and rotated.

First of all, the sputtering was performed in the atmosphere of argon under a pressure of 0.15 Pa, using a target of $Si_3N_4$, to deposit the under coating layer 12 of SiN having a thickness of 60 nm on the substrate 11 at a film formation speed of about 4 nm/min.

Next, the simultaneous sputtering was performed using three targets of Tb, Fe and Co to form the seventh magnetic layer 27 of $Tb_{0.21}(Fe_{0.70}Co_{0.30})_{0.79}$, dominant in FeCo sub-lattice magnetization having a film thickness of 18 nm at a film formation speed of 5 nm/min. The control of the Tb-Fe-Co composition was performed by adjusting the electric power applied to the respective targets of Tb, Fe and Co. The magnetic characteristics of this layer as a single layer film had a coercive force of 15 kOe, a saturated magnetization of 100 emu/cm$^3$ and a vertical magnetic anisotropy constant of $2.0 \times 10^6$ erg/cm$^3$ at the room temperature. The Curie temperature was 270° C.

Subsequently, the sixth magnetic layer 26 of $Tb_{0.26}(Fe_{0.96}Co_{0.04})_{0.74}$, dominant in Tb sub-lattice magnetization, having a film thickness of 10 Å, a coercive force of 19 kOe at the room temperature and a saturated magnetization of 50 emu/cm$^3$ was formed at a film formation speed of 2 nm/min, by using three targets of Tb, Fe and Co, and changing the electric power applied to each target. The Curie temperature was 140° C.

Subsequently, the fifth magnetic layer 25 of $Tb_{0.205}(Fe_{0.70}Co_{0.30})_{0.795}$, dominant in FeCo sub-lattice magnetization, having a film thickness of 14 nm was formed at a film formation speed of 50 nm/min by changing the electric power applied to each target again. The magnetic characteristics of this layer as a single layer film had a coercive force of 12.5 kOe, a saturated magnetization of 120 emu/cm$^3$ and a vertical magnetic anisotropy constant of $2.0 \times 10^6$ erg/cm$^3$ at the room temperature. The Curie temperature was 270° C.

Next, the fourth magnetic layer 24 of $Tb_{0.26}(Fe_{0.94}Co_{0.06})_{0.74}$, dominant in Tb sub-lattice magnetization, having a film thickness of 1 nm, a coercive force of 19 kOe at the room temperature and a saturated magnetization of 50 emu/cm$^3$ was formed at a film formation speed of 2 nm/min by changing the electric power applied to each target again. The Curie temperature was 150° C.

Subsequently, the third magnetic layer 23 of $Tb_{0.20}(Fe_{0.70}Co_{0.30})_{0.80}$, dominant in FeCo sub-lattice magnetization, having a film thickness of 10 nm was formed at a film formation speed of 5 nm/min by changing the electric power applied to each target again. The magnetic characteristics of this layer as a single layer film had a coercive force of 10.7 kOe, a saturated magnetization of 140 emu/cm$^3$ and a vertical magnetic anisotropy constant of $2.0 \times 10^6$ erg/cm$^3$ at the room temperature. The Curie temperature was 270° C.

Furthermore, the second magnetic layer 22 of $Tb_{0.26}(Fe_{0.92}Co_{0.08})_{0.74}$, dominant in Tb sub-lattice magnetization, having a film thickness of 1 nm, a coercive force of 20 kOe at the room temperature and a saturated magnetization of 50 emu/cm$^3$ was formed at a film formation speed of 2 nm/rain by changing the electric power applied to each target again. The Curie temperature was 160° C.

Finally, the first magnetic layer 21 of $Tb_{0.21}(Fe_{0.90}Co_{0.10})_{0.79}$, dominant in FeCo sub-lattice magnetization, having a film thickness of 35 nm, a coercive force of 12 kOe at the room temperature and a saturated magnetization of 100 emu/cm$^3$ was formed at a film formation speed of 5 nm/min. The Curie temperature was 170° C.

Figure 3:
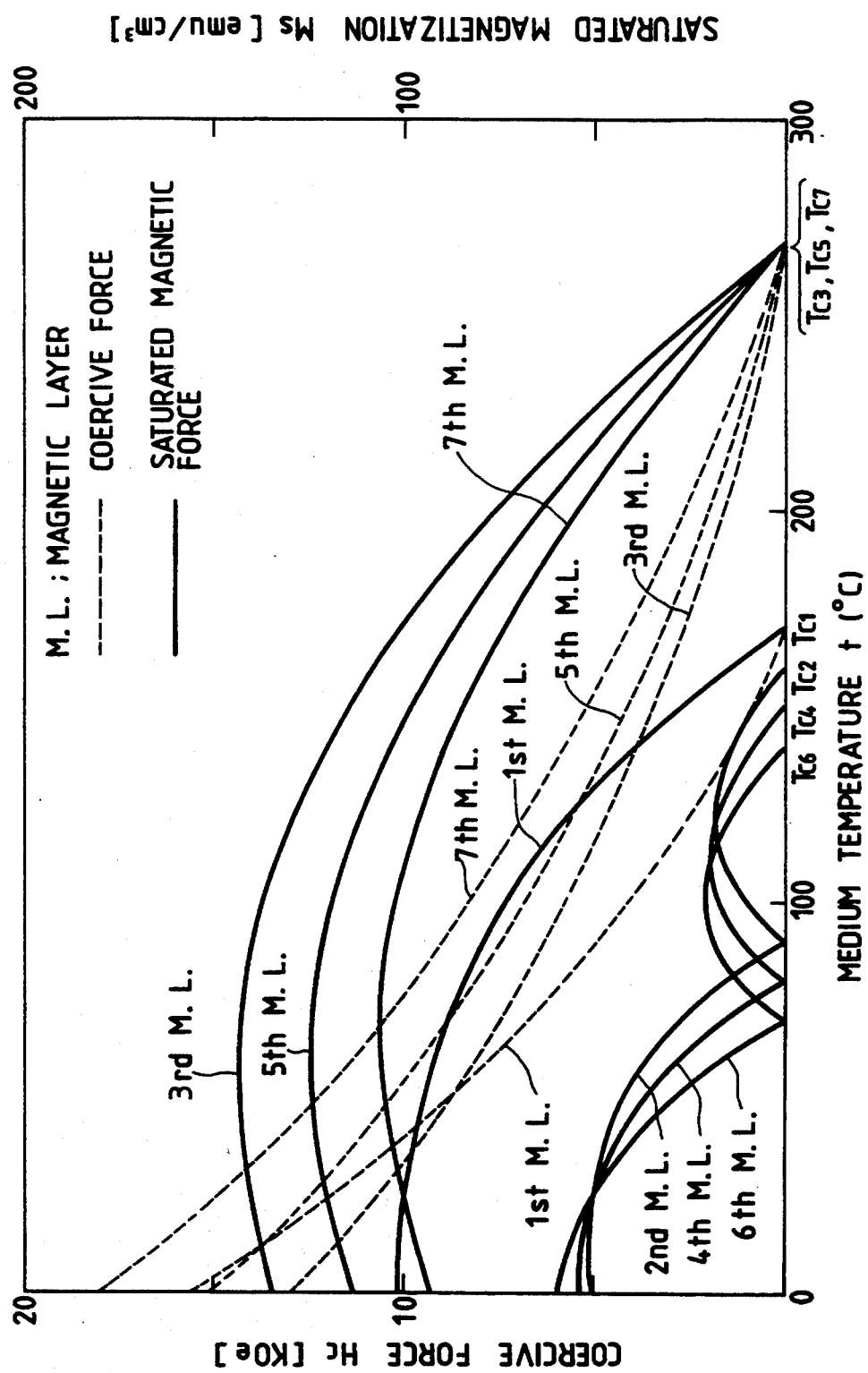
FIG. 3 is a characteristic diagram showing the temperature variation of the magnetic characteristics for each magnetic layer constituting the magneto-optical recording medium as illustrated in FIG. 2.

Thereby, the exchange coupled magnetic seven-layer film satisfying the conditions (a) to (c), and (d) as previously described was formed. The interface magnetic wall energy density between each magnetic layer was about 6 erg/cm$^2$ at the room temperature. Here, the total film thickness for the magnetic layers 21 to 27 was 80 nm, and the total film thickness for the third magnetic layer 23, the fifth magnetic layer 25 and the seventh magnetic layer 27 was 42 nm. The characteristics of each magnetic layer are shown in Table 1. The temperature dependence of the coercive force and saturated magnetization for each magnetic layer as a single layer film are shown in FIG. 3. Note that in Table 1, a sign "+" in a column of saturated magnetization represents a rare earth element sub-lattice magnetization dominance, and a sign "—" represents an iron group element sub-lattice magnetization dominance.

On these layers, the protective layer 14 of SiN having a thickness of 60 nm was provided at a film formation speed of about 4 nm/min, using a target of $Si_3N_4$. Thereafter, this substrate 11 was taken out from the sputtering apparatus, spin coated with an ultraviolet rays curable resin on the side of film surface, and then cured, whereby a single plate of magneto-optical disk was fabricated by forming a protective coat layer (not shown) having a thickness of about 8 μm.

Next, this magneto-optical disk was mounted on a magneto-optical disk drive with an optical head having a laser beam wavelength of 820 nm and NA=0.52, and rotated at a rotation number of 3600 rpm to make the measurement by causing a laser beam to radiate a portion having a radius of 24 mm around a center of the magneto-optical disk.

First, when the medium temperature was 30° C., the recording was performed by applying intermittently a laser beam at a frequency of 5.8 MHz and a duty ratio of 33% under the application of a bias magnetic field of 300 Oe, and then a regenerative C/N (carrier/noise) was obtained with the regeneration at a laser power of 1.5 mW. With the change of recording power, the regenerative C/N was saturated at a recording power of abut 6.0 mW, with the value of C/N being 51 dB at this time.

Next, reproduction with 10$^4$ times were repeatedly performed on one recorded track in a state where a magnetic field of 600 Oe was applied in the erasing direction. The degradation of reproducing signal was investigated by examining the C/N for reproducing signal in such a way as to use various values of the reproducing power in the repetitive reproductions and make the reproduction at a reproducing power of 1.5 mW after such repetitive reproductions. As a result, it has been found that the reproducing signal would not be degraded with the repetitive reproductions if the reproducing power is less than 3.5 mW.

Next, an examination was made to determine whether this magneto-optical recording medium might satisfy the condition for transiting the magnetized orientation state with the variation of medium temperature which was a feature of the present invention, that is, the above-mentioned condition (c).

A sample for the test was fabricated in the same way as the magneto-optical disk as above described, with the exception that a glass substrate was used, instead of a polycarbonate substrate. The magnetic characteristics for this sample are completely the same as those of the above-described magnetooptical disk.

Figure 4:
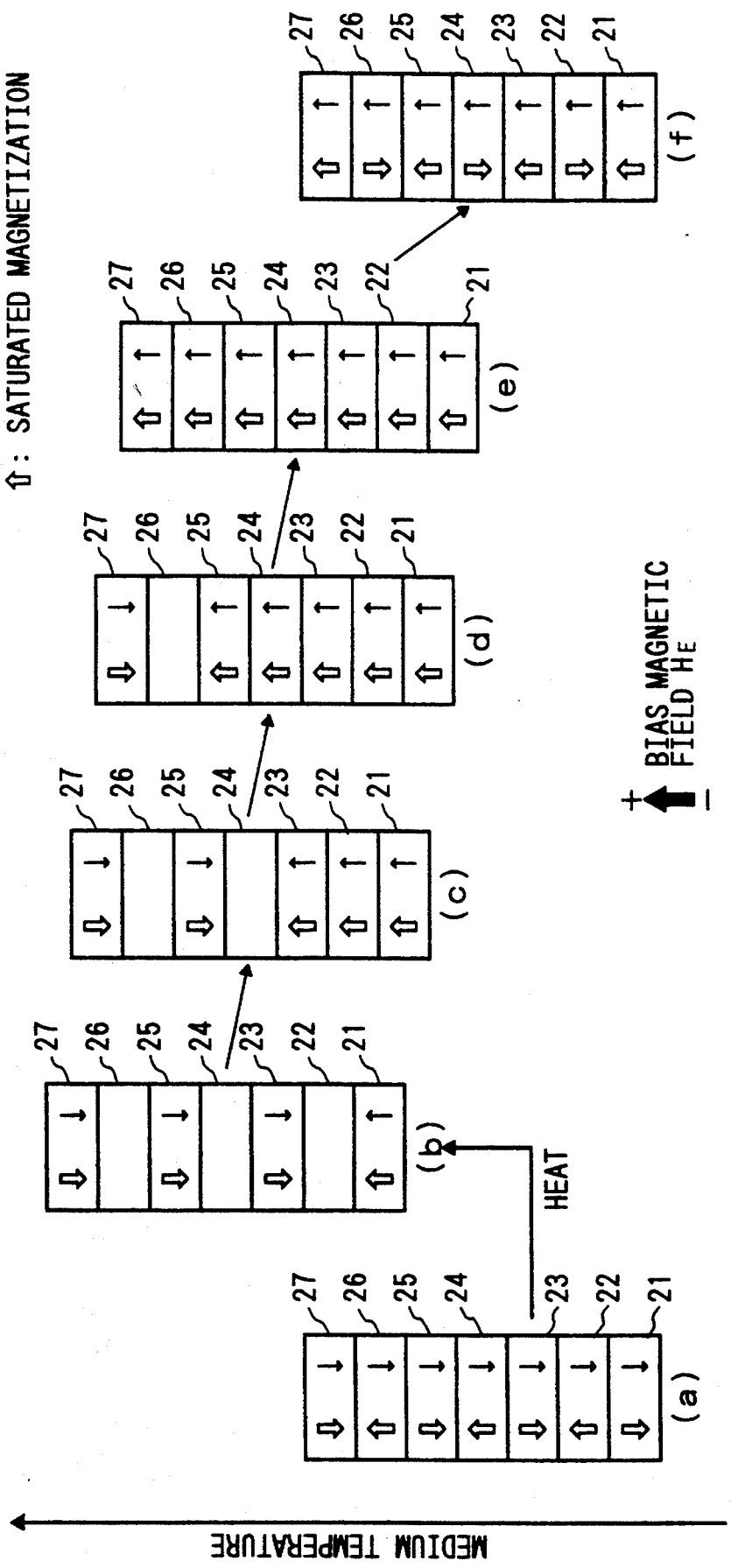
FIG. 4 depicts typical views typically showing the change of magnetized orientation state in the heating-/cooling process for the magneto-optical recording medium as illustrated in FIG. 2.

FIG. 4 shows schematically the changes of magnetized orientation state in the heating/cooling process in which a sample premagnetized in the minus direction is subject to a bias magnetic field $H_E$ of 300 Oe applied in the plus direction at the room temperature [magnetized orientation state (a)], heated above 170° C. under the application of the bias magnetic field [magnetized orientation state (b)], cooled thereafter [magnetized orientation state (c) to (e)], and again placed at the room temperature [magnetized orientation state (f)]. The magnetized orientation state was represented by the direction of saturated magnetization (broad arrow in the figure) and the direction of magnetic moment for an iron group element (black arrow in the figure). In the figure, the magnetic layer without the arrow shows that it is above the Curie temperature. The magnetized orientation states (a) and (f) are ones at the room temperature corresponding to the two-value records respectively.

Next, an experiment performed for confirming the transition of the magnetized orientation state will be described below.

Figure 5A:
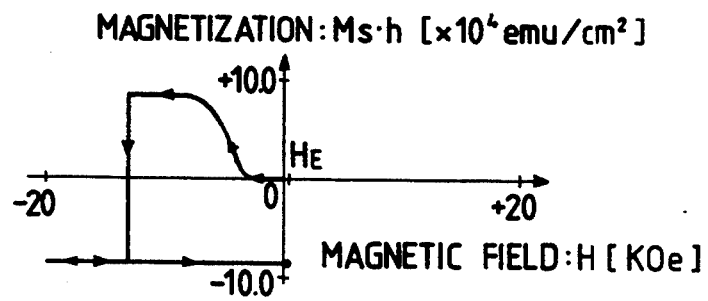
FIGS. 5A to 5E are characteristic diagrams showing the magnetization curve measured at each temperature in the magneto-optical recording medium as illustrated in FIG. 2.

First, this sample was mounted to a vibration sample-type magnetometer (VSM) so that the magnetic field might be vertically applied, whereby each layer was magnetized in one direction by applying a bias magnetic field $H_E$ of up to about 20 kOe in the minus direction, and then was subjected to a magnetic field of up to 300 Oe in the plus direction. The magnetization curve showing this magnetizing process is shown in FIG. 5A. The black point in the figure corresponds to the final state of this process, that is, the magnetized orientation state (a) (FIG. 4).

Next, the temperature of the sample was heated above 170° C. from the magnetized state (a) under the application of the bias magnetic field $H_E$. Subsequently, the variation of magnetization in the sample, when lowering the temperature under the application of the bias magnetic field $H_E$, is shown in FIG. 6. It will be seen that the reversal of magnetization takes place at a temperature at which the magnetization abruptly changes. Then, the sample was cooled from the heating state of more than 170° C. to each temperature (four points of 165° C., 155° C., 145° C. and 135° C.) which occurs before and after the reversal of magnetization, in which the magnetization curve was measured. The results are shown in FIGS. 5B to 5E.

Figure 5B:
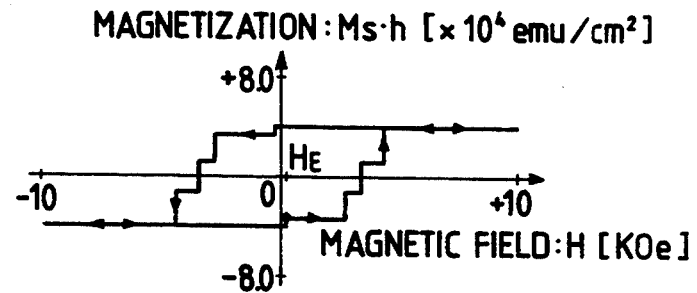
Figure 6:
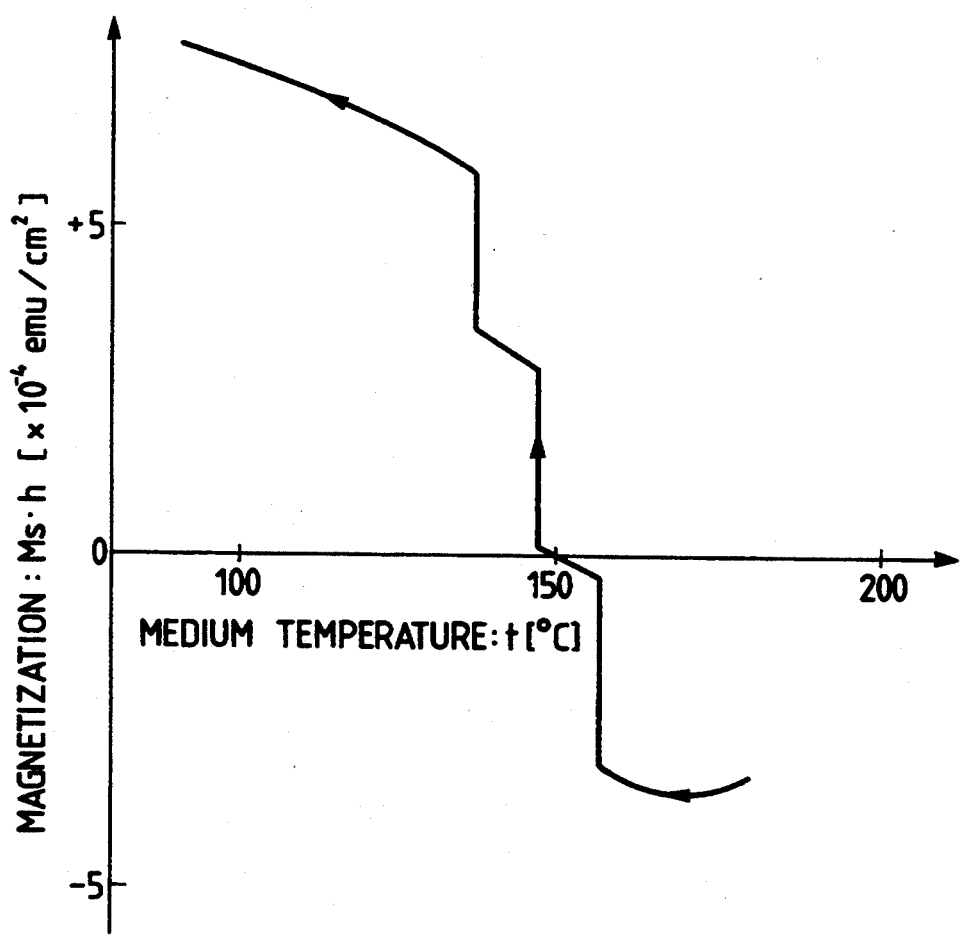
FIG. 6 is a characteristic diagram showing the variation of magnetization with the temperature in the cooling process when the magneto-optical recording medium as illustrated in FIG. 2 is heated and then cooled.

FIG. 5B is a magnetization curve at 165° C. As the second, fourth and sixth magnetic layers 22, 24, 26 are above the Curie temperatures, respectively, at this temperature, the first, third, fifth and seventh magnetic layers 21, 23, 25, 27 have no interaction, in which an independent magnetization curve for each layer is overlapped to appear as the four stages of loop. As the coercive force and the saturated magnetization for each layer as a single layer film at this temperature are known, as shown in FIG. 3, it is possible to determine to which magnetic layer each stage among the four stages of loop corresponds in the reversal of magnetization. In this case, it will be seen that the loop corresponds to the first, third, fifth and seventh magnetic layers 21, 23, 25, 27 in sequence from the lowest stage on the right side of the loop.

In the figure, the black point indicates a start point of loop, having a magnitude of magnetization corresponding to the magnetized orientation state of each layer when the temperature is lowered from the temperature of more than 170° C. to this temperature under the application of a magnetic field of 300 Oe in the plus direction. In the figure, a minor loop containing the broken line portion is a magnetization curve for the first magnetic layer itself. From those loops and the start points thereof, it can be judged that each layer is in a magnetized orientation state (b) (FIG. 4), when the temperature is lowered down to this temperature. The comparison between the magnetized orientation state (b) and the magnetized orientation state (a) shows that the magnetization of the first magnetic layer is reversed.

Figure 5C:
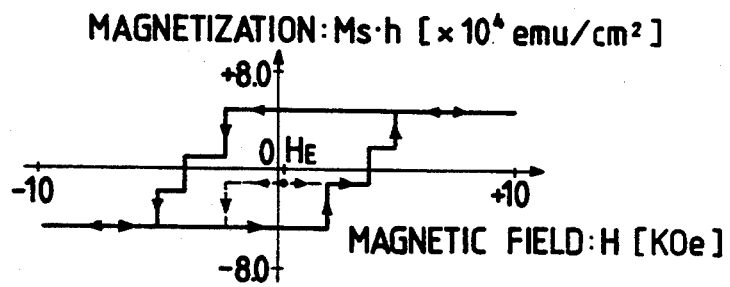
Figure 5D:
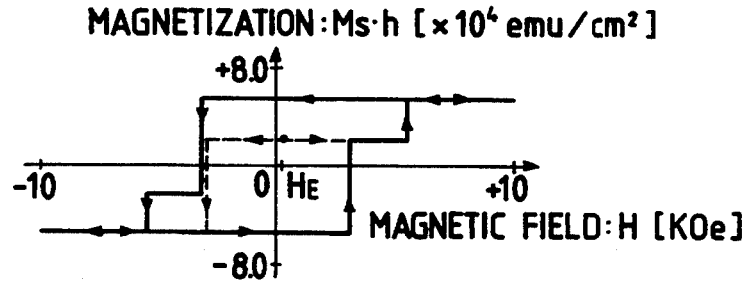
Figure 5E:
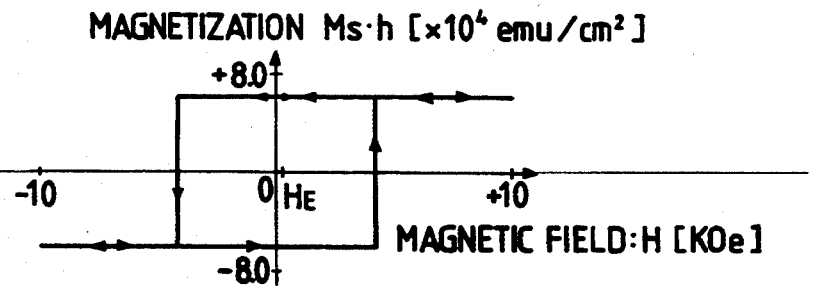

FIG. 5C is a magnetization curve at 155° C. As the second magnetic layer 22 is below the Curie temperature, at this temperature, the first, second and third magnetic layers 21, 22, 23 are to take the magnetization process with the interaction to each other. It will be found that the two upper states on the right side of the loop correspond to the magnetization reversals for the fifth and seventh magnetic layers 25, 27 themselves, respectively, by the collation with the coercive force as the single layer film of each layer at this temperature. Accordingly, it will be understood that the minor loop containing the broken line portion is a magnetization curve obtained by the concurrent magnetization reversal of the first, second and third magnetic layers 21, 22, 23 due to the exchange coupling. Taking into consideration the start position of the loop as indicated by the black point in the figure, and the magnitude of magnetization for the first, second and third magnetic layers 21, 22, 23 at this temperature, it can be determined that each layer is in a magnetized orientation state (c) as indicated in FIG. 4, when the temperature is lowered from a temperature above 170° C. to this temperature. That is, the magnetization for the third magnetic layer 23 is reversed, the magnetization for the second and third magnetic layers 22, 23 is oriented so that the coupling state with the first magnetic layer 21 due to the exchange interaction may be a stable state, and the magnetization of the first magnetic layer 21 maintains the orientation state confirmed at 165° C.

In the same way, the magnetized orientation states (d) and (e) can be confirmed from the magnetization curves as shown in FIG. 5, at temperatures 145° C. and 135° C., respectively.

As above described, it is confirmed that the constitution of the magneto-optical recording medium in the example 1 can realize the condition for the transition process of magnetized orientation state with the variation of medium temperature which is a feature of the present invention, that is, the condition (d).

Since the compensation temperature for each (2m)-th magnetic layer, i.e., the second, fourth and sixth magnetic layers 22, 24, 26 lies between the room temperature and a respective Curie temperature, in the constitution of magnetic layer as above described, the polarity of magnetization of these layers is reversed without state transition through the compensation temperature of the (2m)-th magnetic layer, if the temperature is further lowered from the magnetized orientation state (e) down to near the ambient temperature, as shown in FIG. 4, resulting in the magnetized orientation state (f).

Comparative Example 1

After forming an under coating layer of SiN on the substrate in the same way as in example 1, the simultaneous sputtering was performed using three targets of Gd, Fe and Co to form a magnetic layer for reading of $Gd_{0.22}(Fe_{0.70}Co_{0.30})_{0.78}$, dominant in FeCo sub-lattice magnetization, having a film thickness of 40 nm at a film formation speed of 5 nm/min. The magnetic characteristics of this layer as a single layer film had a coercive force of 0.5 kOe, a saturated magnetization of 50 emu/cm$^3$ and a vertical magnetic anisotropy constant of $4.0 \times 10^5$ erg/cm$^3$ at the room temperature. The Curie temperature was above 300° C.

Subsequently, a magnetic layer for writing of Tb$_{0.21}$(Fe$_{0.90}$Co$_{0.10}$)$_{0.79}$, dominant in FeCo sub-lattice magnetization, having a film thickness of 40 nm was formed at a film formation speed of 5 nm/min by using three targets of Tb, Fe and Co. The magnetic characteristics of this layer as a single layer film were exactly the same, with a coercive force of 12 kOe and a saturated magnetization of 100 emu/cm$^3$, and the Curie temperature was 170° C.

A magneto-optical disk was fabricated in the exactly same constitution and fabricating method as in example 1, except for the magnetic layer. For the magneto-optical disk in this comparative example 1, the exactly same evaluation as in example 1 was performed. As this result, the C/N was saturated at a recording power of about 6.0 mW, in which the C/N value was 51 dB and the same recording characteristics as in example 1 were obtained. However, the maximum reproducing power at which the reproducing degradation will not occur in the magnetic field was 2.1 mW, lower than in example 1.

Comparative Example 2

After forming an under coating layer of SiN on the substrate in the same way as in example 1, the simultaneous sputtering was performed using three targets of Tb, Fe and Co to form a magnetic layer for reading of Tb$_{0.18}$(Fe$_{0.70}$Co$_{0.30}$)$_{0.82}$, dominant in FeCo sub-lattice magnetization, having a film thickness of 20 nm at a film formation speed of 5 nm/min. The magnetic characteristics of this layer as a single layer film had a coercive force of about 20 kOe, a saturated magnetization of 250 emu/cm$^3$ and a vertical magnetic anisotropy constant of $1.5 \times 10^6$ erg/cm$^3$ at the room temperature. The Curie temperature was about 300° C.

Subsequently, a magnetic layer for writing of Tb$_{0.21}$(Fe$_{0.90}$Co$_{0.10}$)$_{0.79}$, dominant in FeCo sub-lattice magnetization, having a film thickness of 60 nm was formed at a film formation speed of 5 nm/min by using three targets of Tb, Fe and Co. The magnetic characteristics of this layer as a single layer film were the same as those of the first magnetic layer in example 1, with a coercive force of 12 kOe and a saturated magnetization of 100 emu/cm$^3$, and the Curie temperature was 170° C.

A magneto-optical disk was fabricated in the exactly same constitution and fabricating method as in example 1, except for the magnetic layer. For the magneto-optical disk in this comparative example 2, the exactly same evaluation as in example 1 was performed. As this result, the C/N was saturated at a recording power of about 6.0 mW, in which the C/N value was 49 dB. Also, the maximum reproducing power at which the reproducing degradation will not occur in the magnetic field was 2.8 mW, lower than in example 1.

In the comparative example 2, the film thickness of the magnetic layer for reading was made 20 nm as the recording noise may be increased if it is thicker. Therefore, the C/N is slightly lower than in example 1 and comparative example 1.

Comparative Example 3

After forming an under coating layer of SiN on the substrate in the same way as in example 1, the simultaneous sputtering was performed using three targets of Tb, Fe and Co to form a magnetic layer of Tb$_{0.21}$(Fe$_{0.90}$Co$_{0.10}$)$_{0.79}$, dominant in FeCo sub-lattice magnetization, having a film thickness of 80 nm at a film formation speed of 5 nm/min. The magnetic characteristics of this layer was the same as those of the first magnetic layer as a single layer film, having a coercive force of 12 kOe, a saturated magnetization of 100 emu/cm$^3$ at the room temperature, and the Curie temperature was 170° C.

A magneto-optical disk was fabricated in the exactly same constitution and fabricating method as in example 1, except for the magnetic layer.

For the magneto-optical disk in this comparative example 3, the exactly same evaluation as in example 1 was performed.

As this result, the C/N was saturated at a recording power of about 6.0 mW, in which the C/N value was 47 dB. Also, the maximum reproducing power at which the reproducing degradation will not occur in the magnetic field was 3.0 mW.

As the magnetic layer for reading does not exist in the comparative example 3, the C/N is lower than in example 1 and other comparative examples. On the other hand, the reproducing durability is higher than in comparative example 1, as the layer having unstable magnetic domain is not coupled. However, it is not higher than in example 1. This is conceivably due to the fact that in the medium of example 1, the magnetic domains in the reading layer are stable, and written magnetic domains are retained in the reading layer itself having a high Curie temperature.

Comparative Example 4

A magneto-optical disk was fabricated in the exactly same constitution and fabricating method as in example 1, except for the use of GdFeCo having a vertical magnetic anisotropy constant of $4.0 \times 10^5$ erg/cm$^3$ as the third, fifth and seventh magnetic layers. The constitution and characteristics of the magnetic layer are shown in Table 2. Note that in Table 2, a sign "+" in a column of saturated magnetization represents a rare earth element sub-lattice magnetization dominance, and a sign "−" represents an iron group element sub-lattice magnetization dominance.

For the magneto-optical disk in this comparative example 4, the exactly same evaluation as in example 1 was performed. As this result, the C/N was saturated at a recording power of about 6.0 mW, in which the C/N value was 51 dB. However, the maximum reproducing power at which the reproducing degradation will not occur in the magnetic field was 1.9 mW, having a lower reproducing durability as compared with example 1. With this magneto-optical disk, the condition (a) among the above-mentioned four conditions is not satisfied.

EXAMPLE 2

A magneto-optical disk was fabricated in the exactly same constitution and fabricating method as in example 1, except for the constitution of magnetic layer as shown in Table 3.

In each example as given below, each characteristics value is a value as the single layer film at the room temperature. Note that in each table following Table 3, a sign "+" is attached to a column of saturated magnetization (Ms) for a rare earth element sub-lattice magnetization dominance, and a sign "−" is attached for an iron group element sub-lattice magnetization dominance.

For the magneto-optical disk in the example 2, the exactly same evaluation as in example 1 was performed. As a result, the C/N was saturated at a recording power of about 5.4 mW, in which the C/N value was 51 dB. Also, the maximum reproducing power at which the reproducing degradation will not occur in the magnetic field was 3.1 mW.

As the Curie temperature of the first magnetic layer is lower than in example 1, a necessary mininum recording power is smaller by 0.6 mW, that is, has a more excellent sensitivity. However, the C/N value is the same. Also, the maximum reproducing power is smaller with the increasing sensitivity, but its ratio to the minimum recording power is 0.58 in example 1 and 0.57 in example 2, which are almost the same, having an excellent reproducing durability.

EXAMPLE 3

A magneto-optical disk was fabricated in the exactly same constitution and fabricating method as in example 1, except for the constitution of magnetic layer as shown in Table 4.

For the magneto-optical disk in the example 3, the exactly same evaluation as in example 1 was performed. As a result, the C/N was saturated at a recording power of about 6.2 mW, in which the C/N value was 51 dB. Also, the maximum reproducing power at which the reproducing degradation will not occur in the magnetic field was 3.3 mW, having an excellent reproducing durability.

EXAMPLE 4

A magneto-optical disk was fabricated in the exactly same constitution and fabricating method as in example 1, except for the constitution of magnetic layer as shown in Table 5. In the constitution of the magnetic layer in this disk, the thickness of the second magnetic layer is set to be 0 nm, i.e., the disk is constructed such that no second magnetic layer exists. The reason why the second magnetic layer can be omitted is that owing to a relatively large saturated magnetization of the third magnetic layer, the reversal or magnetization will occur even near the Curie temperature of the first magnetic layer, so that the spins of the first and third magnetic layers are aligned from the beginning of the cooling process.

Also, with the constitution of the magnetic layer in this disk, the Curie temperature of the fourth magnetic layer and that of the sixth magnetic layer are equal, in which upon radiation of the laser beam for the recording, there is a slight temperature gradient in a direction of film thickness of magnetic layer, whereby the recording process of the present invention will be realized.

For the magneto-optical disk in the example 4, the exactly same evaluation as in example 1 was performed. As this result, the C/N was saturated at a recording power of about 6.0 mW, in which the C/N value was 51 dB. Also, the maximum reproducing power at which the reproducing degradation will not occur in the magnetic field was 3.3 mW, had an excellent reproducing durability.

EXAMPLE 5

A magneto-optical disk was fabricated in the exactly same constitution and fabricating method as in example 1, except for the constitution of magnetic layer as shown in Table 6. In the constitution of magnetic layer in this disk, the (2m)-th magnetic layer was an in-plane magnetized film of ferromagnetism, but as the (2M+1)-th magnetic layer had a large vertical magnetic anisotropy, the excellent formation and retention of magnetic domains were allowed. Also, the magnetic optical effects were improved in the short wavelength because of the use of a light rare earth element.

EXAMPLE 6

A magneto-optical disk was fabricated in the exactly same constitution and fabricating method as in example 1, except for the constitution of magnetic layer as shown in Table 7. In the constitution of magnetic layer in this disk, the (2m)-th magnetic layer was an in-plane magnetized film as in example 5. And one more layer was laminated on the fifth magnetic layer with the exchange coupling of magnetic layer for the purpose of improving the magnetic optical effects in the short wavelength.

The medium in which other magnetic layer is laminated before and after the magnetic composite film of the present invention, or one layer within the magnetic composite film of the present invention is constituted as a further composite film is included within the range of the present invention.

By comparing the examples 1 to 6 with the comparative examples 1 to 4 as above described, it will be found that a magneto-optical recording medium having excellent reproducing characteristics can be obtained with a high C/N and a superior reproducing durability, and without degradation of the reproducing characteristics with increasing regenerative power, if n layers of magnetic layer are laminated with exchange coupling therebetween, and the previously-mentioned three conditions (a) to (c), preferably condition (d), are satisfied.

Next, an experiment of the second example of the present invention will be described below.

This second example is one is which the information written using the Faraday effect as well as the magnetic Kerr effect is read out in such a manner as to transmit a part of the regenerative light through the magnetic layer, using a magnetic layer having a total thickness of less than about 30 nm. In this case, it is desirable that the thickness of the first magnetic layer is about 50 to 20 nm, and the thickness of the (2m)-th magnetic layer or even numbered magnetic layer is about 0.5 to 5 nm. Also, it is desirable that the thickness of odd numbered magnetic layer except for the (2m+1)-th magnetic layer or the first magnetic layer is about 0.5 to 10 nm, and the total thickness of the (2m+1)-th magnetic layers is more than about 10 nm.

EXAMPLE 7

After forming an under coating layer of SiN having a thickness of 110 nm on the substrate in the same way as in example 1, the magnetic layers having the constitution as shown in Table 8 were laminated in sequence from the fifth magnetic layer.

On these layers, an interference layer of SiN having a thickness of 50 nm was laid down, and further a reflective layer of Al having a thickness of 60 nm was formed thereon.

This substrate was taken out from the sputtering apparatus, and a magneto-optical disk was fabricated through the same process as in example 1.

For the magneto-optical disk in this example 7, the exactly same evaluation as in example 1 was performed. As this result, the C/N was saturated at a recording power of about 5.5 mW, in which the C/N value was 52 dB. Also, the maximum reproducing power at which the reproducing degradation will not occur in the magnetic field was 3.3 mW, and had an excellent reproducing durability.

EXAMPLE 8

A magneto-optical disk was fabricated in the exactly same constitution and fabricating method as in example 7, except for the constitution of magnetic layer as shown in Table 9. The constitution of the magnetic layer in this disk is one in which the present invention is applied and developed, commonly using the first magnetic layer, before and after which layer is formed the constitution of a basic magnetic layer according to the present invention. With this constitution, the layer having a high magnetic optical effect is also formed on the side of the interference layer in the magnetic layer, whereby the quality of reproducing signal can be further improved.

For the magneto-optical disk in the example 8, the exactly same evaluation as in example 1 was performed. As this result, the C/N was saturated at a recording power of about 5.8 mW, in which the C/N value was 53 dB. Also, the maximum reproducing power at which the reproducing degradation will not occur in the magnetic field was 3.5 mW, and had an excellent reproducing durability.

EXAMPLE 9

A magneto-optical disk was fabricated in the exactly same constitution and fabricating method as in example 7, except for the constitution of magnetic layer as shown in Table 10. The constitution of the magnetic layer in this disk is one in which the present invention is applied and developed, commonly using the third magnetic layer, before and after which layer is formed the constitution of a basic magnetic layer according to the present invention.

For the magneto-optical disk in the example 9, the exactly same evaluation as in example 1 was performed. As this result, the C/N was saturated at a recording power of about 5.5 mW, in which the C/N value was 50 dB. Also, the maximum reproducing power at which the reproducing degradation will not occur in the magnetic field was 3.1 mW, and had an excellent reproducing durability.

From the results of the examples 7 to 9 as above described, it will be found that the magneto-optical recording medium of the present invention has an excellent reproducing characteristic and a superior reproducing durability, even when the reproduction may be effected with a smaller thickness of magnetic layer and using the Faraday effect as well.

Next, the third example of the present invention will be described below.

The magneto-optical recording medium in the above example must magnetize each magnetic layer in one magnetizing direction before recording, when making a new recording, but the magneto-optical recording medium in the third example allows the overwriting which does not need such an operation.

In the following, the example will be described in detail with reference to the drawings.

Figure 8:
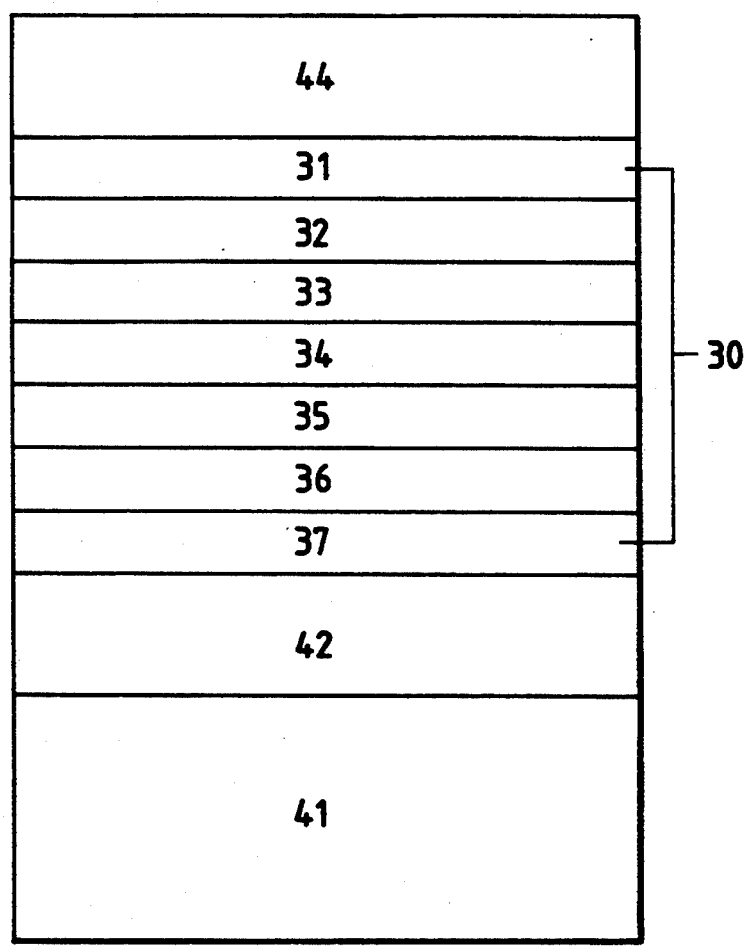
FIG. 8 is a typical cross-sectional view showing a schematic constitution of a magneto-optical recording medium in the third example of the present invention.

FIG. 8 is a typical cross-sectional view showing a schematic constitution of the magneto-optical recording medium in this example, in which numeral 41 in the figure shows a transparent substrate composed of a glass or plastic. On this substrate is provided an under coating layer 42, composed of a dielectric such as $Si_3N_4$, AlN, $SiO_2$, SiO, ZnS, or $MgF_2$, in order to obtain the interference effect or corrosion prevention effect. On the under coating layer 42, seven magnetic composite layers 30 are sequentially formed from the seventh magnetic layer 37 to the first magnetic layer 31. A protective layer 4 composed of a dielectric such as $Si_3N_4$ is further formed thereon to protect the magnetic film from the corrosion. These layers are deposited with the continuous sputtering by the use of a magnetron sputtering apparatus or the continuous evaporation method, for example. Particularly, each magnetic layer is bonded with the exchange interaction to each other by continuously forming the film without breaking the vacuum.

It is considered that each magnetic layer in the above-mentioned medium may be constituted of various magnetic materials, but can be constituted with rare earth-iron group amorphous alloy, for example, containing about 10 to 40 atomic percent of one or more rare earth metal elements such as Pr, Nd, Sm, Gd, Tb, Dy, Ho, and about 60 to 90 atomic percent of one or more iron group elements such as Fe, Co, Ni. For the improvement of the corrosion resistance, elements such as Cr, Mn, Cu, Ti, Al, Si and Pt, and it may be added by a small amount.

Note that among the magnetic composite layers 30 of the magneto-optical recording medium in this example, the seventh magnetic layer 37 corresponds to a magnetic layer for reading in the first example as previously described, and the fifth magnetic layer 35 corresponds to a magnetic layer for writing. That is, as far as the seventh magnetic layer 37, the sixth magnetic layer 36 and the fifth magnetic layer 35 are concerned, each condition of (a), (b) and (c) as described in the previous first example is satisfied. Also, the first magnetic layer 31 to the fourth magnetic layer 34 are ones which are newly added to enable the over-writing. The operation of each magnetic layer at the recording will be described later.

For the whole of the magnetic composite layers 30, the physical property values for each magnetic layer are set to satisfy the following condition.

That is, for a magneto-optical recording medium in which n layers of magnetic thin film (where n is an odd number equal to or more than 7) are laminated with the exchange coupling on the substrate, assuming that the n layers of magnetic thin film are the first magnetic layer, the second magnetic layer, . . . , the n-th magnetic layer in sequence, and the Curie temperature of the i-th magnetic layer is $Tc_i$, the following conditions are satisfied under the application of an appropriate constant external magnetic field (Hb) (where $Tc_{n+1}$ is an ambient temperature, and m is an arbitrary natural number equal to or less than $(n-1)/2$), 1. $Tc_1 \geq Tc_3$
2. $Tc_{2m} \geq Tc_{2(m+1)}$ for $m \geq 2$
3. $Tc_6 \geq Tc_2 \geq Tc_{n+1}$
4. $Tc_{2m+1} \geq Tc_6$
5. At the room temperature, the medium is placed in either a first magnetized state where the first magnetic layer is magnetized in an appropriate predetermined orientation state, with atomic spins of each magnetic layer being aligned over the direction of film thickness, or a second magnetized state where the first magnetic layer is magnetized in the predetermined orientation state, with atomic spins of each magnetic layer being aligned, except for the interface magnetic wall formed owing to unalignment of atomic spins between the third and fifth magnetic layers.

6. When heated to an appropriate first temperature state where the sixth magnetic layer exceeds a temperature near $Tc_6$, and the third magnetic layer does not reach the temperature $Tc_3$, from the first and second magnetized states, the magnetization of the fourth and fifth magnetic layers orients and aligns atomic spins of the third magnetic layer so that the coupling state with the exchange interaction may be placed in a stable state, while the magnetization of the third magnetic layer retains the orientation state before heating.

7. When heated to an appropriate second temperature state where the third magnetic layer reaches a temperature near $Tc_3$ from the first and second magnetized states, the magnetization of the third magnetic layer transits the state to an orientation state different from the orientation state before heating.

8. In each cooling process after heating from the first and second magnetized states to the first and second temperature states, the magnetization of the (2m)-th magnetic layer and the (2m+1)-th magnetic layer orients and aligns atomic spins of the (2m−1)-th magnetic layer so that the coupling state with the exchange interaction may be placed in a stable state when the temperature of the (2m)-th magnetic layer drops down to a temperature near Tc while the magnetization of the (2m−1)-th magnetic layer retains its immediately previous orientation state.

9. In the cooling process after heating from the first and second magnetized states to the second temperature state, when the magnetization of the second magnetic layer and the third magnetic layer orients and aligns atomic spins of the first magnetic layer so that the coupling state with the exchange interaction may be placed in a stable state, as the temperature of the second magnetic layer drops down to a temperature near $Tc_2$, the magnetization of the fifth magnetic layer retains its immediately previous orientation state.

10. In each process for cooling after heating from the first and second magnetized states to the first and second temperature states, the magnetization of the first magnetic layer always retains the predetermined orientation state.

Note that the method of adjusting the Curie temperature and the saturated magnetization for each magnetic layer can be accomplished with the same method as in the previous example. However, if taking into consideration the operating ambient temperature or recording sensitivity and the recording power margin, it is appropriate that the Curie temperature of the third magnetic layer is in a range of 150° to 250° C., the Curie temperature of the sixth magnetic layer is in a range of 120° to 180° C., the Curie temperature of the first magnetic layer is above 250° C., and the Curie temperature of the n-th magnetic layer is above 180° C.

Also, the temperature dependence of various physical property values for the magnetic material is quite difficult to control, because of complex mechanisms. Therefore, in practicing the present invention, for the condition of defining a transition process of magnetized orientation state with the variation of temperature for the magneto-optical recording medium, an experiment was performed with the "film thickness" easily controlled without temperature dependence as a main parameter to determine the film thickness to meet the condition. However, in view of the recording sensitivity, the total film thickness of the magnetic layers is desirably less than about 250 nm. Also, it is appropriate that the first and third magnetic layers are 10 to 50 nm thick, the (2m+1)-th magnetic layer except for them is 1 to 20 nm thick, and the fourth magnetic layer is 5 to 25 nm thick, the (2m)-th magnetic layer except for it is 0.5 to 10 nm thick, in which the total film thickness for the (2m+1)-th magnetic layer from the fifth magnetic layer is desirably more than 20 nm.

In the composite film having the above-mentioned layer constitution, the layer onto which the information is first written is the third magnetic layer, and the layer onto which this information is transferred and retained is the (2m+1)-th magnetic layer (where $m \geq 2$). The reading is started from the side of the n-th magnetic layer, so that the information carried on a group of the (2m+1)-th magnetic layers is read out. The first magnetic layer is a layer for erasing the information written in the third magnetic layer after transfer and initializing it. The (2m)-th magnetic layer is a layer for controlling whether or not the magnetic coupling between each layer exists depending on the medium temperature, and particularly, the fourth magnetic layer is a layer for adjusting the magnitude of coupling power between layers.

Figure 7:
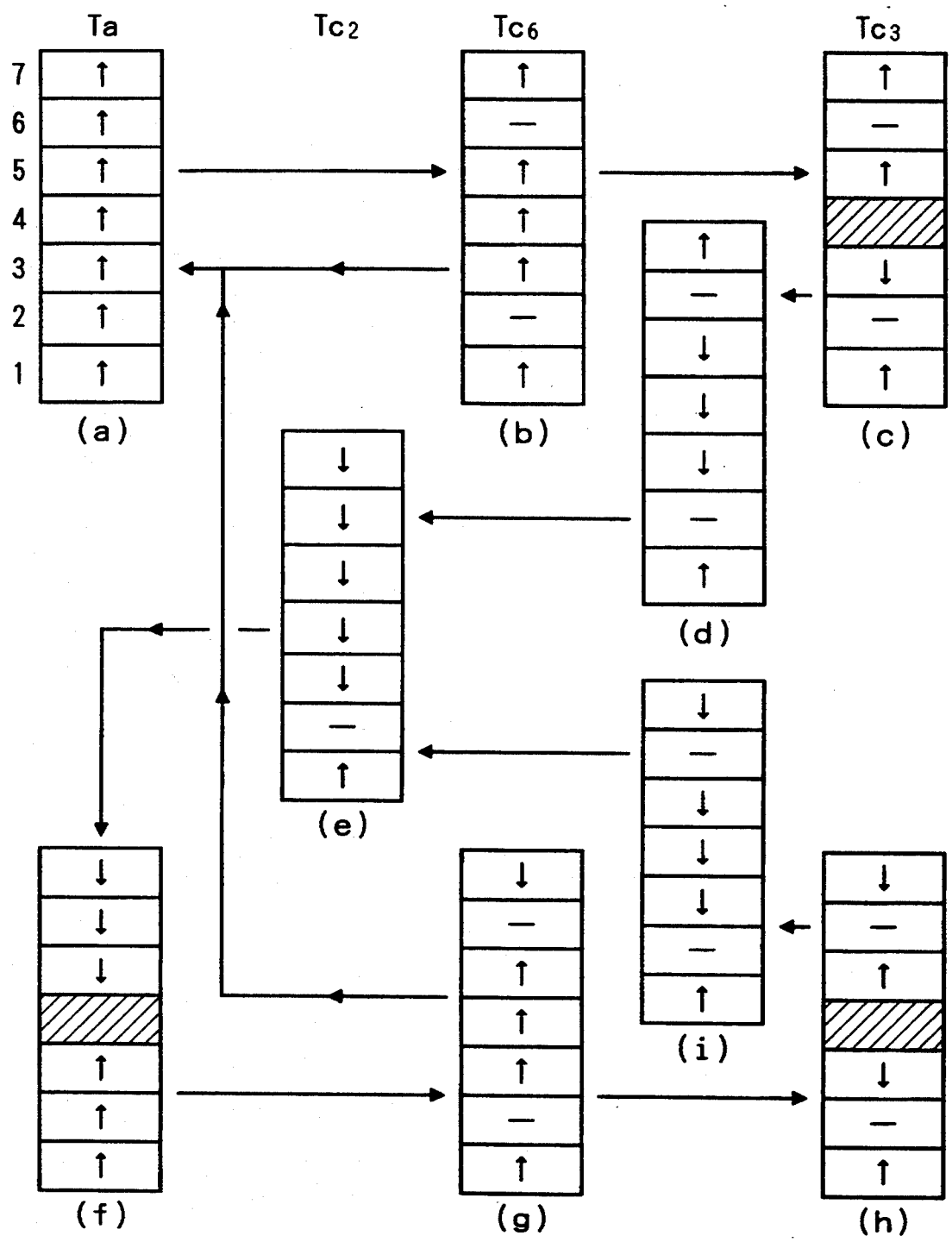
FIG. 7 is a diagram showing a recording process of the magneto-optical recording medium as shown in FIG. 8, illustrating a transition process of magnetized orientation state of the magnetic layer with the variation of medium temperature. In the figure, 1 to 7 correspond to the first to seventh magnetic layers, respectively. The arrow shows the direction of atomic spins in which the energy state becomes stable when they are oriented in parallel to each other. The slanting line section indicates that there is unalignment of atomic spins by which the interface magnetic wall is formed.

Next, the fact that the composite film is placed in two magnetized states corresponding to respective temperature states by rising or lowering the temperature to two different temperature states, irrespective of the initial magnetized state, will be described below with reference to FIG. 7.

First of all, the initial state in which the first magnetic layer is magnetized in a predetermined direction and the spins of each layer are all aligned without the magnetic wall at the interface (thereinafter referred to as the state A) will be considered.

A laser beam of first kind (a bottom power Pb) is caused to radiate a surface of the magnetic layer under the application of an appropriate bias magnetic field as thereinafter described from the initial state (state A: FIG. 7a) so as to heat a radiated part to an appropriate first temperature state in which the temperature of the sixth magnetic layer is above $Tc_6$ and the temperature of the third magnetic layer does not reach $Tc_3$. Provided that no temperature gradient exists in the direction of film thickness (i.e., the direction perpendicular to the film surface) for the magnetic layer, the (2m)-th magnetic layers on the radiated part except for the fourth magnetic layer are all above the Curie temperature, and the magnetic coupling of each layer is disconnected. And the third magnetic layer is placed in a state where the initial magnetized state is maintained, and the magnetization of the fourth and fifth magnetic layers has atomic spins aligned with the third magnetic layer, so that the coupling state with the exchange interaction takes an initial stable magnetized state (FIG. 7b). If the medium temperature may fall down after stopping the laser radiation, the magnetic layers become below the Curie temperature, successively from the sixth magnetic layer, so that each layer is coupled together by taking the magnetized state providing a stable coupling. That is, each layer is all brought into the initial magnetized state, and the magnetized state of composite film remains in the state A (FIG. 7a).

Next, a laser beam of second kind (a peak power Pb) is caused to radiate a surface of the magnetic layer under the application of the same bias magnetic field as previously described from the initial state (state A) so as to heat a radiated part to an appropriate second temperature state in which the temperature of the third magnetic layer is near $Tc_3$. At this time, by setting the bias magnetic field to be applied in appropriate direction and magnitude so that the magnetization of the third magnetic layer may be reversed at this temperature, the magnetization of this radiated part is reversed (FIG. 7c). At this time, the (2m)-th magnetic layers except for the fourth magnetic layer are all above the Curie temperature, resulting in the magnetic coupling of each layer being disconnected. The Curie temperature of the fourth magnetic layer does not have any defined relation with $Tc_3$, so that the magnetic coupling between the third magnetic layer and the fifth magnetic layer may or may not be disconnected at this time. Provided that the fifth magnetic layer might not reverse the magnetization concurrently with the third magnetic layer, it follows that the third and fifth magnetic layers will not have aligned spin orientation. Therefore, when the fourth magnetic layer is below the Curie temperature, a spin transition region is formed between the third and fifth magnetic layers carrying that layer, where the energy (interface magnetic wall energy) caused by the exchange interaction is stored. If the medium temperature may fall down from this temperature after stopping the laser radiation, the magnetization of one layer is reversed to align the spin orientation of both layers, because the fourth magnetic layer falls below the Curie temperature in any case, and this energy increases with decreasing temperature. At this time, if the film thickness has been adjusted in the design so that the coercive force energy of the fifth magnetic layer may be smaller than that of the third magnetic layer, the magnetization of the fifth magnetic layer is preferentially reversed to be aligned with the spins of the third magnetic layer (FIG. 7d). In this way, the magnetized state of the third magnetic layer which is a magnetized state reversed with respect to the initial state is transferred onto the fifth magnetic layer. (However, when the magnetization of the fifth and third magnetic layers is simultaneously reversed, there is no restriction as previously described on the coercive force energy at this temperature. Also, a process can be adopted in which either the fourth magnetic layer or the fifth magnetic layer may be first reversed and then transferred onto the third magnetic layer.)

If the medium temperature further falls down below the Curie temperature of the sixth magnetic layer, the seventh magnetic layer is magnetically coupled via that layer, and in the same process, the magnetized state of the fifth magnetic layer is transferred onto the seventh magnetic layer (FIG. 7e). In this way, the magnetized state reversed with respect to the initial state is sequentially transferred, and finally onto the n-th magnetic layer when the medium temperature falls down below $Tc_{n-1}$, thereby completing the transfer.

On the other hand, if the second magnetic layer falls down below the Curie temperature in this cooling process, the magnetized state (unchanged from the initial state) of the first magnetic layer is transferred onto the third magnetic layer, so that the magnetization of the third magnetic layer is reversed again to return to the initial state. Therefore, the third and fifth magnetic layers have the spin orientation unaligned, and the spin transition region is formed between two layers carrying the fourth magnetic layer, where the interface magnetic wall energy is stored. However, as the fifth magnetic layer has been already coupled with the sixth magnetic layer and following layers, the immediately previous magnetized state can be retained under the influence of the coercive force energy of these layers. As a result, the magnetic composite film is placed in such a magnetized state that the first to third magnetic layers have the spin orientation aligned with respect to the first magnetic layer which is magnetized in a predetermined direction, and the fifth to the n-th magnetic layers have the spin orientation aligned in an opposite direction to that of the first magnetic layer, in which there is unalignment of spins between the third and fifth magnetic layers where the magnetic wall of spin transition region exists (thereinafter referred to as state B; FIG. 7f).

Next, the changes of magnetized state when the initial state is a state B will be considered.

The laser beam of first kind is caused to radiate a surface of the magnetic layer under the application of the same bias magnetic field as previously described from this state (state B: FIG. 7f) so as to heat a radiated part to an appropriate first temperature state in which the temperature of the sixth magnetic layer is above $Tc_6$, and the temperature of the third magnetic layer does not reach $Tc_3$. In this case, the third and fifth magnetic layers have the spin orientation unaligned, between two layers carrying the fourth magnetic layer is formed a spin transition region, where the interface magnetic wall energy is stored. The fifth magnetic layer retained the magnetized state owing to the coupling with the sixth magnetic layer and following layers, and supported by the coercive force energy of these layers, but as the coupling is disconnected with the heating, it can not maintain the magnetized state only with a single coercive force energy, and will reverse the magnetization so that the spin orientation may be aligned with respect to the third magnetic layer (FIG. 7g). If the medium temperature may fall down after stopping the laser radiation, the magnetic layers become below the Curie temperature, successively from the sixth magnetic layer, so that each layer is coupled together sequentially by aligning the spin orientation so that the bonding with the exchange interaction may be placed in a stable state. That is, each layer is all placed in the magnetized state where the spin orientation is aligned with respect to the first magnetic layer which is magnetized in a predetermined direction, and consequently, the magnetized state of composite film is brought into the state A (FIG. 7a).

Finally, an instance will be considered in which the laser beam of second kind is caused to radiate a surface of the magnetic layer under the application of the same bias magnetic field as previously described from the state B (FIG. 7f) so as to heat a radiated part to an appropriate second temperature state in which the temperature of the third magnetic layer is near $Tc_3$. In this case, the magnetization of the third magnetic layer in this radiated part is reversed (FIG. 7h), and in the following cooling process, through the same process as the case where the initial state is a state A (FIG. 7i, e), finally the magnetized state of composite film becomes a state B (FIG. 7f).

Since the magnetized state of state A on a radiated region by the laser beam of first kind, and the magnetized state of state B by the laser beam of second kind can be formed, irrespective of the initial magnetized state of medium, as above described, it is possible to record information with the overwriting, by moving the radiated part while switching and modulating these two kinds of laser beam in accordance with the information. Here, two kinds of laser beams may be any kind if they induce the first temperature state and the second temperature state on the radiated part of medium, respectively, but for example, a combination of two kinds of laser beams having different powers or pulse widths can be considered.

Also, in the above constitution, the first magnetic layer is provided to initialize the third magnetic layer, but the initialization of the third magnetic layer can be performed by a magnetic field from auxiliary magnetic means from the outside, in which the first and second magnetic layers may be omitted.

And with such a layer constitution, the magnetic composite layer satisfies the following conditions.

That is, a magneto-optical recording medium in which $(n-2)$ layers of magnetic thin film (where n is an odd number equal to or more than 7) are laminated with the exchange coupling on the substrate, and assuming that the $(n-2)$ layers of magnetic thin film are the third magnetic layer, the fourth magnetic layer, ..., the n-th magnetic layer in sequence, and the Curie temperature of the i-th magnetic layer is $Tc_i$, the following conditions are satisfied (where $Tc_{n+1}$ is an ambient temperature, and m is an arbitrary natural number from 2 to $(n-1)/2$), 1. $Tc_{2m} \geq Tc_{2(m+1)}$
 2. $Tc_{2m+1} \geq Tc_6$, $Tc_3 \geq Tc_6$
 3. When an appropriate first external magnetic field (Hini) is applied, the magnetization of the third magnetic layer is oriented so as to be a stable state relative to the external magnetic field, and the magnetization of the fifth magnetic layer retains the oriented state before the application of the external magnetic field.

The following conditions stand after the application of the first external magnetic field (Hini) and under the application of an appropriate constant second external magnetic field (Hb).

4. At the room temperature, the medium is placed in either a first magnetized state where the third and fifth magnetic layers retain a magnetized state immediately after the application of the first external magnetic field (Hini), with the atomic spins of each magnetic layer being aligned over the direction of film thickness, or a second magnetized state where the atomic spins of each magnetic layer are aligned except for the interface magnetic wall formed with atomic spins unaligned between the third and fifth magnetic layers.
 5. When heated to an appropriate first temperature state where the sixth magnetic layer exceeds a temperature near $Tc_6$ and the third magnetic layer does not reach the temperature $Tc_3$, from the first and second magnetized states, the magnetization of the fourth and fifth magnetic layers orients and aligns atomic spins to the third magnetic layer so that the coupling state with the exchange interaction may be placed in a stable state, while the magnetization of the third magnetic layer retains the orientation state before heating.
 6. When heated to an appropriate second temperature state where the third magnetic layer reaches a temperature near $Tc_3$ from the first and second magnetized states, the magnetization of the third magnetic layer transits the state to an orientation state different from the orientation state before heating.
 7. In each cooling process after heating from the first and second magnetized states to the first and second temperature states, the magnetization of the $(2m)$-th magnetic layer and the $(2m+1)$-th magnetic layer orients and aligns atomic spins to the $(2m-1)$-th magnetic layer so that the coupling state with the exchange interaction may be placed in a stable state when the temperature of the $(2m)$-th magnetic layer drops down to a temperature near $Tc_{2m}$, while the magnetization of the $(2m-1)$-th magnetic layer retains its immediately previous orientation state.

In a composite film having the layer constitution as above described, it is necessary to apply the magnetic field Hini with external auxiliary means to initialize the third magnetic layer, because the magnetic layer for initializing the third magnetic layer is omitted. Other operations are the same as the previous magneto-optical recording medium.

Even if any magneto-optical recording medium may be used, the reading of recording information from a recording medium having the information recorded is performed by applying the laser beam at a low output which is linearly polarized toward the n-th magnetic layer side. To improve the recording sensitivity, it is necessary that the third magnetic layer may be set at a low Curie temperature, but the magnetic layer on the reading side can be set at a high Curie temperature separately so that high magnetic optical effects can be obtained by reflecting an incident laser beam against a group of magnetic layers having high Curie temperature. As the recorded information is retained by the magnetic layers having high Curie temperature, it can be stably retained even if the temperature of the medium may rise with the laser radiation for reading.

Next, the third example will be described in detail in contrast with the comparative examples.

As indicated above, the first and second magnetic layers may be omitted. If that is the case, then references to the "n-th" magnetic layer in the following examples should be construed as referring to the "$(n-2)$-th" magnetic layer; e.g. references to the seventh magnetic layer should be construed as references to the fifth magnetic layer when the first and second layers are omitted.

EXAMPLE 10

Within a sputtering apparatus having five sources of target, a disk-like substrate 11 made of polycarbonate having a diameter of 86 mm in which track grooves and format signals were preformed was set and exhausted to the vacuum.

First of all, the sputtering was performed in the atmosphere of Ar gas under a pressure of 0.3 Pa, using a target of $Si_3N_4$, to deposit an under coating layer of silicon nitride having a thickness of about 60 nm on the substrate 11.

Next, the sputtering was performed using three targets of Tb, Fe and Co to deposit the seventh magnetic layer of $Tb_{20}(Fe_{85}Co_{15})_{80}$ having a thickness of abut 20 nm on the under coating layer. The control of the composition was performed by adjusting the electric power applied to the respective targets, while the control of film thickness was performed by adjusting the sputtering time. Subsequently, the sixth magnetic layer of $Tb_{20}(Fe_{96.7}Co_{3.3})_{80}$ was deposited in a thickness of about 5 nm, by changing the distribution of the applied power. Then the fifth magnetic layer of $Tb_{20}(Fe_{85}Co_{15})_{80}$ was deposited in a thickness of abut 10 nm, by changing the distribution of the applied power again. After leaving it for several hours in this state, the sputtering was performed using four targets of Gd, Tb, Fe and Co to deposit the third magnetic layer of $(Tb_{70}Gd_{30})_{20}(Fe_{90}Co_{10})_{80}$ having a thickness of about 150 nm on the fifth magnetic layer.

To prevent the corrosion of magnetic film, these layers was provided with a protective layer of silicon nitride having a thickness of about 60 nm, using a target of $Si_3N_4$ again.

After this substrate was taken out from the sputtering apparatus, it was spin coated with an ultraviolet rays curable resin on the side of film surface and then cured to improve the mechanical strength, whereby a single plate of magneto-optical disk was fabricated by forming a protective coat layer (not shown) having a thickness of about 8 μm.

Figure 9:
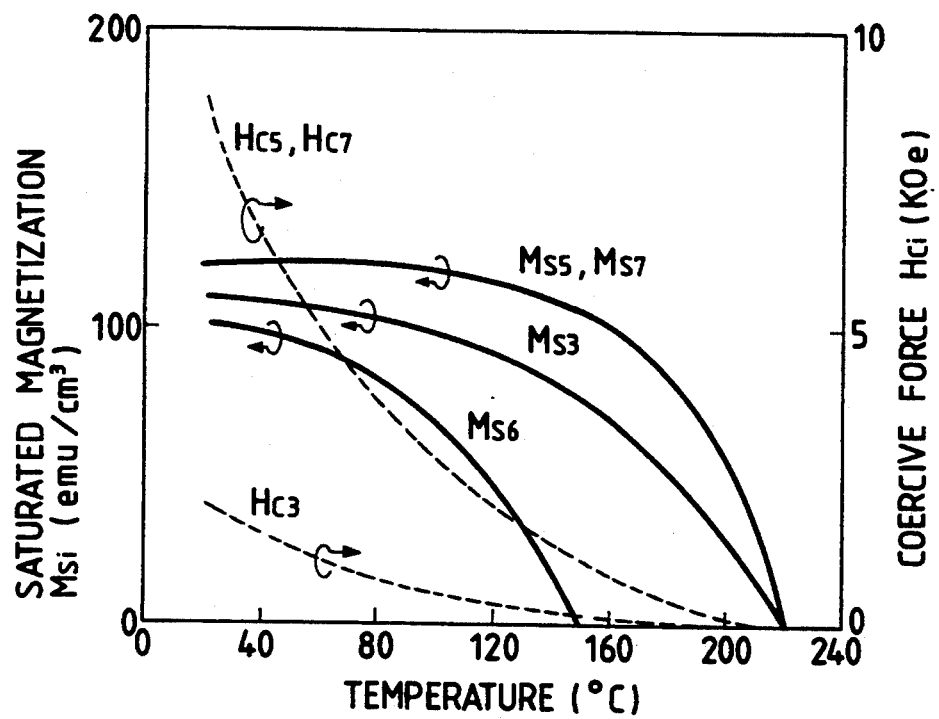
FIG. 9 is a graphical representation showing the temperature dependence of the saturated magnetization and the coercive force for each magnetic layer of the magneto-optical recording medium as illustrated in FIG. 8.
Figure 10:
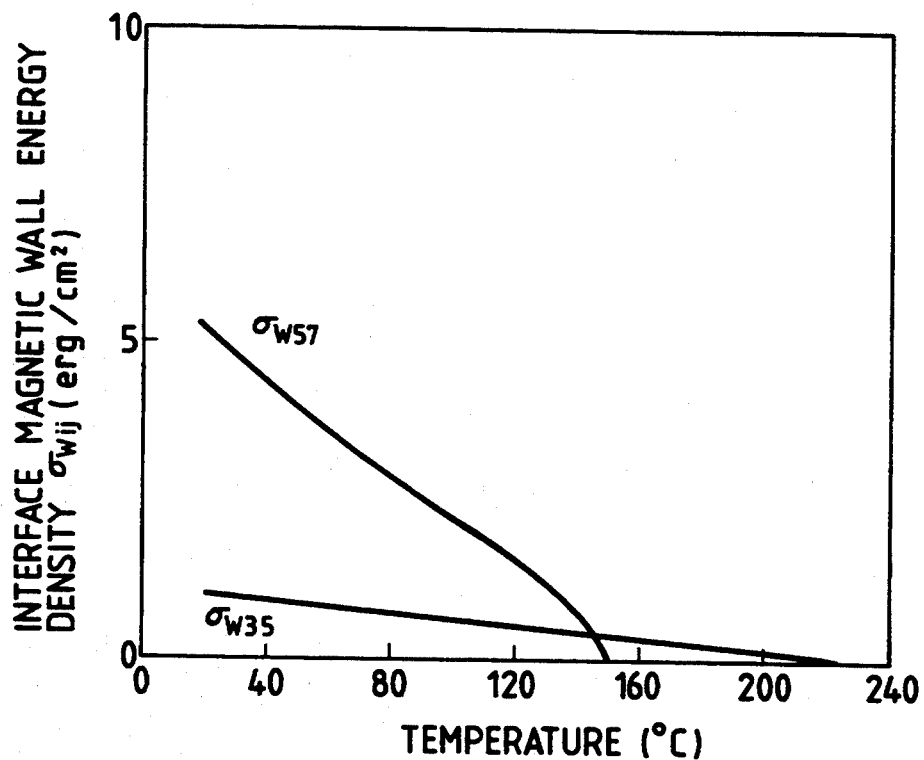
FIG. 10 is a graphical representation showing the temperature dependence of the interface magnetic wall energy density between magnetic layers of the magneto-optical recording medium as illustrated in FIG. 8.

The composition, the film thickness and Curie temperature for each magnetic layer selected in the magneto-optical disk of example 10 are shown in Table 10. In this example, the simplest constitution to carry out the process of the present invention is shown, and particularly, the fourth magnetic layer is considered to be the same material and composition as those of the third magnetic layer, and has no film thickness, so that it is substantially omitted. However, in order to adjust the interface magnetic wall energy between the third magnetic layer and the fifth magnetic layer, the exchange interaction between layers was adequately weakened in such a manner that after forming the fifth magnetic layer, the surface was deliberately contaminated by leaving it within a chamber for several hours and then the third magnetic layer was laminated. The temperature dependence of the saturated magnetization, the coercive force and the interface magnetic wall energy for each layer are shown in FIGS. 9 and 10.

The fact that a process of transiting the magnetized orientation state with the variation medium temperature which is a feature of the present invention is realized by a medium having such a constitution will be described with reference to FIG. 5. In the following explanation, assume that the saturated magnetization of the i-th magnetic layer is $Ms_i$, the coercive force is $Hc_i$, the film thickness is $h_i$, the Curie temperature is $Tc_i$, and the interface magnetic wall energy density between the i-th magnetic layer and the j-th magnetic layer is $\sigma w_{ij}$.

In the medium immediately after forming the film, the atomic spins are all aligned in the direction of film thickness, but left in a maze pattern in the direction of film face, in which there are portions where the TM spins (atomic spins of iron group element) for each layer are aligned "upward" in the vertical direction of film face and where they are aligned "downward".

To this medium, an external magnetic field Hini of about 4 kOe is applied.

Figure 11:
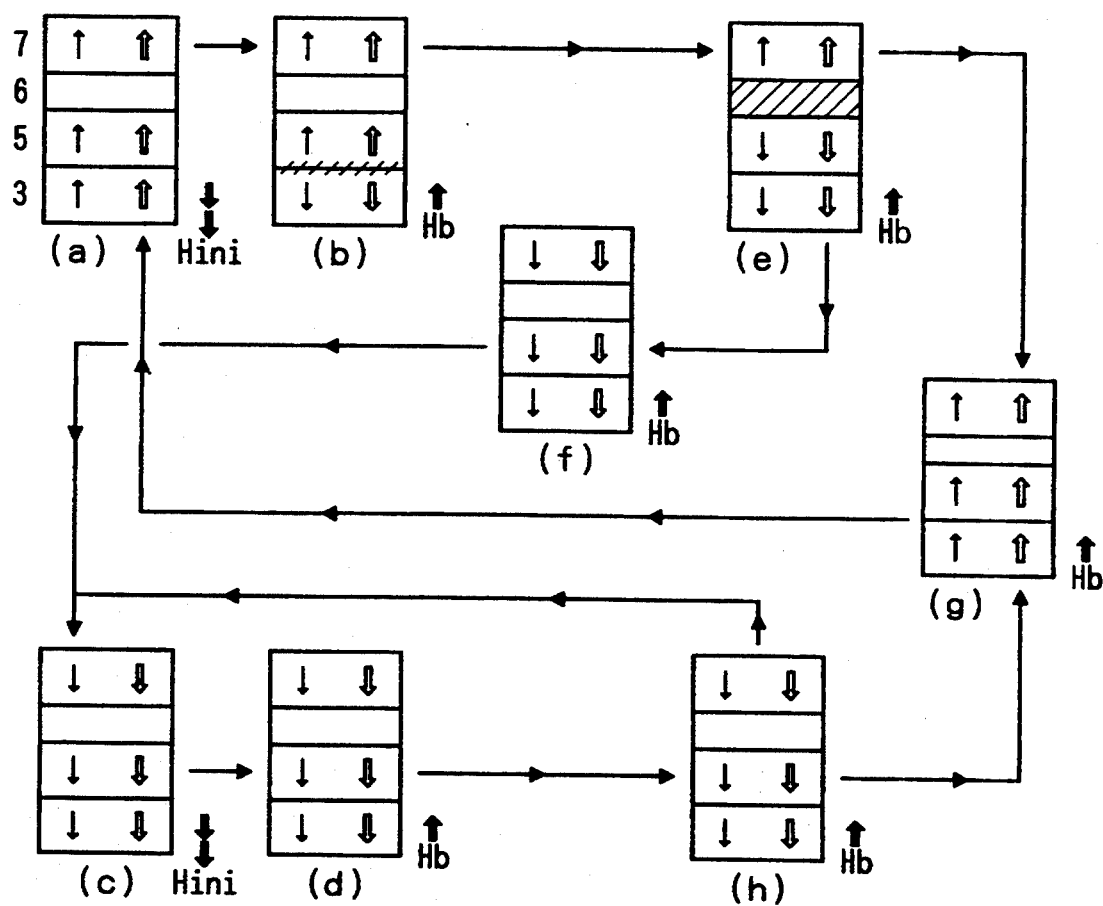
FIG. 11 is a diagram showing a recording process for the magneto-optical recording medium as illustrated in FIG. 8, illustrating a transition process of magnetized orientation state in the magnetic layer with the variation of medium temperature. In the figure, 3 to 7 correspond to the third to seventh magnetic layers, respectively. The arrow indicates the direction of atomic spins for an iron family element, and the broad arrow indicates the direction of magnetization. The slanting line section indicates that there is unalignment of atomic spins.

On the portion where the TM spins of each layer are all aligned, the magnetization appears upward because each layer is dominant in the iron group element sub-lattice magnetization at the room temperature (FIG. 11a). Accordingly, for a sufficiently small external magnetic field H in the downward direction, the following inequalities will stand, $$2Ms_3Hc_3h_3 > 2Ms_3h_3H - \sigma w_{35} \quad (110)$$

$$2Ms_3Hc_3h_3 + 2Ms_5Hc_5h_5 > 2(Ms_3h_3 + Ms_5h_5)H - \sigma w_{57} \quad (111)$$

$$2Ms_3Hc_3h_3 + 2Ms_4Hc_4h_4 + 2Ms_7Hc_7h_7 > 2(Ms_3h_3 + Ms_5h_4 + Ms_7h_7)H \quad (112)$$

$$2Ms_5Hc_5h_5 > 2Ms_5h_5H - \sigma w_{35} - \sigma w_{57} \quad (113)$$

$$2Ms_5Hc_5h_5 + 2Ms_7Hc_7h_7 > 2(Ms_5h_5 + Ms_7h_7)H - \sigma w_{35} \quad (114)$$

$$2Ms_7Hc_7h_7 > 2Ms_7h_7H - \sigma w_{57} \quad (115)$$

Now, if the external magnetic field H is continuously increased up to Hini, the relation of expression (110) is reversed while the relation of other expressions are maintained, so that the third magnetic layer can be oriented in a stable state against the external magnetic field Hini, by reversing the magnetization of the third magnetic layer downward, without reversing the magnetization of the fifth magnetic layer. Thereafter, if an external magnetic field Hb of 300 Oe, for example, is applied upward, the following expressions will stand at the room temperature, in which a state (state B1) where the magnetic wall exists at the interface between the third magnetic layer and the fifth magnetic layer is retained (FIG. 11b).

$$2Ms_3Hc_3h_3 > 2Ms_3h_3Hb + \sigma w_{35} \quad (120)$$

$$2Ms_5Hc_5h_5 > -2Ms_5h_5Hb + \sigma w_{35} - \sigma w_{57} \quad (121)$$

$$2Ms_5Hc_5h_5 + 2Ms_7Hc_7h_7 > -2(Ms_5h_5 + Ms_7h_7)Hb + \sigma w_{35} \quad (122)$$

$$2Ms_7Hc_7h_7 > -2Ms_7h_7Hb - \sigma w_{57} \quad (123)$$

On the portion (FIG. 11c) where the TM spins of each layer are all aligned downward, the magnetization all appears downward, so that the magnetized state will not change even if a downward external magnetic field Hini may be applied. As the coercive force of each layer is greater than Hb even if an external magnetic field of 300 Oe is applied upward, the magnetized state will not also change, in which the TM spins of each layer are directed downward, and the atomic spins are aligned over the direction of film thickness. The magnetized state at this time is assumed as a state A1 (FIG. 11d).

If the medium temperature may rise with the heating of the medium from the state B1, $\sigma w_{57}$ decreases in approaching to $Tc_6$, and the relation of expression (121) is reversed, so that the magnetization of the fifth magnetic layer is reversed downward. That is, the spins of the fifth magnetic layer are aligned with those of the third magnetic layer.

In a state after reversing the magnetization of the fifth magnetic layer, the following expressions will stand in which the magnetic wall moves to the interface between the fifth magnetic layer and the seventh magnetic layer.

$$2Ms_3Hc_3h_3 > 2Ms_3h_3Hb - \sigma w_{35} \quad (130)$$

$$2Ms_3Hc_3h_3 + 2Ms_5Hc_5h_5 > 2(Ms_3h_3 + Ms_5h_5)Hb + \sigma w_{57} \quad (131)$$

$$2Ms_5Hc_5h_5 > 2Ms_5h_5Hb - \sigma w_{57} \quad (132)$$

$$2Ms_7Hc_7h_7 > -2Ms_7h_7Hb + \sigma w_{57} \quad (133)$$

If the medium temperature falls down from this state, $\sigma w_{57}$ will abruptly increase, so that the relation of expression (133) is reversed, and the magnetization of the seventh magnetic layer is reversed downward. That is, the spins of the seventh magnetic layer are aligned with those of the fifth magnetic layer (FIG. 11f). The temperature falls down to the room temperature while this state is maintained. Consequently, each layer is placed in a state where the TM spins are directed downward, that is, state A1 (FIGS. 11c, d).

On the other hand, if the medium temperature is further raised with the heating from $Tc_6$ to about $Tc_3$, the relation of expression (131) is reversed, so that the magnetization of the third and fifth magnetic layers is reversed upward at the same time. As a result, the spin direction for each layer is aligned upward (FIG. 11g). If the temperature may fall down from this state, the fifth and seventh magnetic layers are magnetically coupled at a temperature below $Tc_6$, but the spin direction is aligned, so that the temperature returns to the room temperature while this state is maintained (FIG. 11a). And if a downward external magnetic field Hini is applied again, the state is changed to the state B1 (FIG. 11b).

Next, the medium is heated under the application of an upward external magnetic field Hb from the state A1 (FIG. 11d). In this case, since the coercive force for each layer is greater than Hb in this temperature range even if it is heated to $Tc_6$, there occurs no state change (FIG. 11h). If the temperature may fall down from this state, the spins are all aligned, with the direction unchanged, and the state A1 being maintained (FIG. 11c, d).

On the other hand, if heated from $Tc_6$ to about $Tc_3$, the coercive force of each layer decreases because $Tc_3$, $Tc_5$ and $Tc_7$ are all equal in this medium, whereby the magnetization of the third, fifth and seventh magnetic layers is reversed upward substantially at the same time at a temperature at which the coercive force of each layer is below Hb (FIG. 11g).

If the temperature may fall down from this state, the fifth and seventh magnetic layers are magnetically bonded at the temperature below $Tc_6$, but the spin direction is aligned upward in both layers, so that the temperature returns to the room temperature with the state being unchanged (FIG. 11a). And if the downward external magnetic field Hini is applied again from this state, the medium is placed in the state B1 (FIG. 11b).

From the above explanation, it is apparent that this medium satisfies the conditions which are features of the present invention. Note that in the above explanation, more correctly, the coercive force energy and the Zeeman energy for the sixth magnetic layer must be considered, but because of a significantly complex explanation, and a small contribution to the magnetization process due to relatively thin film thickness, particularly, its ignorable magnitude at the temperature near $Tc_6$, the explanation is omitted here.

The magneto-optical disk of this example 10 was mounted on a magneto-optical disk drive with an optical head having a wavelength of about 780 nm and NA=0.53, and rotated at a rotation number of 3600 rpm to make the measurement at a position with a radius of 24 mm. A permanent magnet was fixed at a position that an initializing magnetic field of 4 kOe may be applied onto a recording film in the direction of film face.

Figure 12:
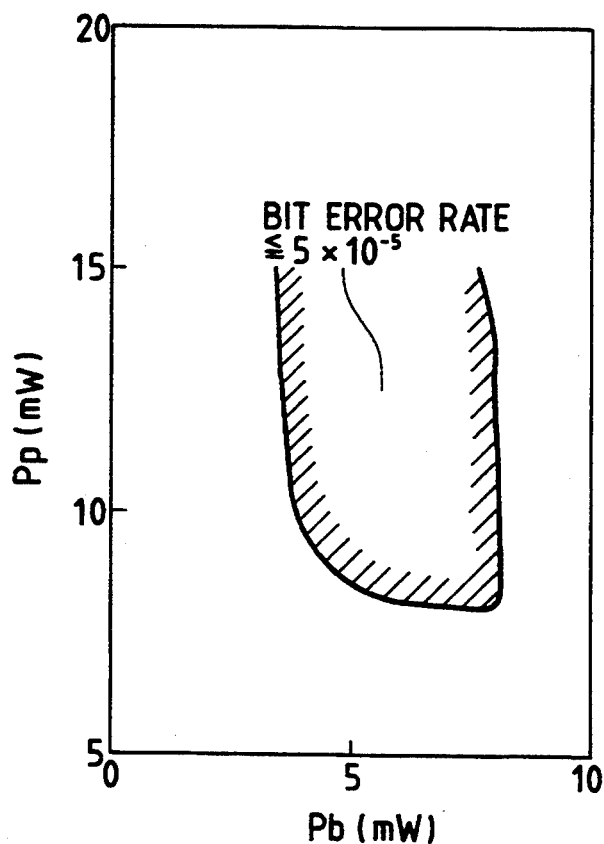
FIG. 12 is a graphical representation showing a recording power region having a bit error rate of $5 \times 10^{-5}$ or less in the magneto-optical recording medium as illustrated in FIG. 8.
Figure 13:
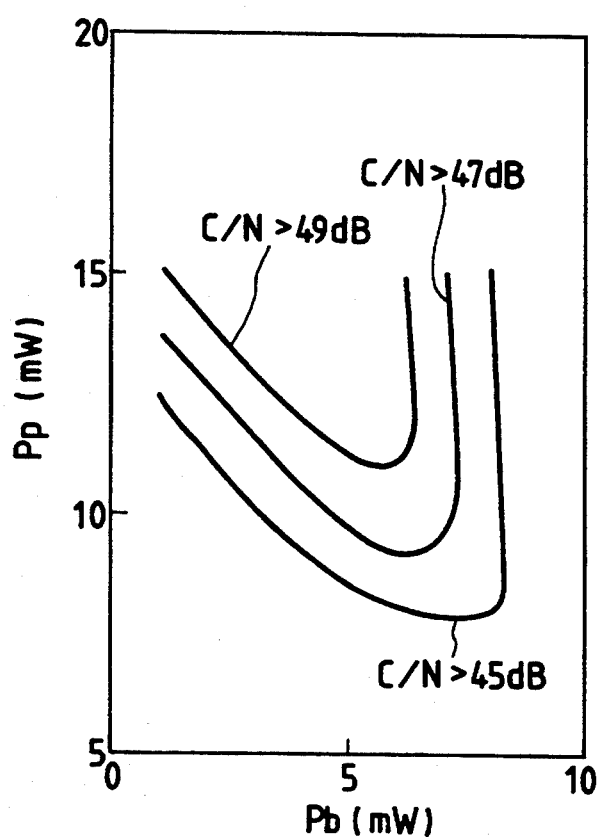
FIG. 13 is a graphical representation showing the relation between the C/N and the recording power in the magneto-optical recording medium as illustrated in FIG. 8.

The recording was performed by pulse modulating a laser beam for recording at two values of a bottom power (Pb) and a peak power (Pp) as in the previous example under the application of a bias magnetic field for reading of 300 Oe in an opposite direction to the magnetic field for initialization, and then read out at a regenerative power of 1.0 mW. The (2.7) modulation recording was performed at a channel rate of 17.4 MHz, with the pulse width fixed at 57 nsec, and the bit error rate at this time was measured. When the above recording was performed by modulating to the bottom power and the peak power, respectively, after the disk was made in a whole surface recording enable state, the recording power region having a bit error rate of less than $5 \times 10^{-5}$ is shown in FIG. 12 with the slanting line. In this region, the excellent overwriting characteristics have been obtained. Furthermore, after the disk has been completely erased, the relation between the C/N and the recording power in recording the 3T pattern is shown in FIG. 13.

Next, the degradation of reproducing signal after reproductions with $10^4$ times repeatedly performed on one recorded track by modulating the regenerative power was examined by the comparison between the signals reproduced at a reproducing power of 1.0 mW before and after their repetitive reproductions. As a result, the reproducing degradation would not occur up to 3.1 mW.

Comparative Example 5

A magneto-optical disk was fabricated with the same constitution and fabricating method as in example 10, except that the magnetic layer was constituted as described below.

After forming the under coating layer, the magnetic layer for reading having the same material and constitution as for the sixth magnetic layer in example 10 was formed in a thickness of 35 nm. The Curie temperature of this layer was about 150° C. After leaving it for several hours in this state, the magnetic layer for writing having the same material and constitution as for the third magnetic layer in example 10 was formed in a thickness of 150 nm. The Curie temperature of this layer was about 220° C. The constitution of magnetic layer was a two-layer constitution as above described, and the interface was deliberately contaminated to adjust the interface magnetic wall energy in the same way as in example 10, so that the exchange interaction between layers was adequately weakened.

Figure 14:
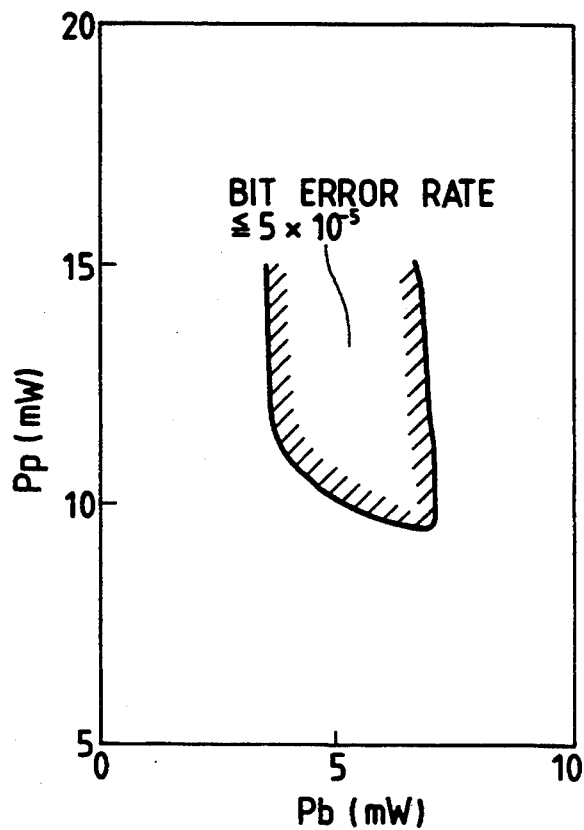
FIG. 14 is a graphical representation showing a recording power region having a bit error rate of $5 \times 10^{-5}$ or less in the magneto-optical recording medium of comparative example 5.
Figure 15:
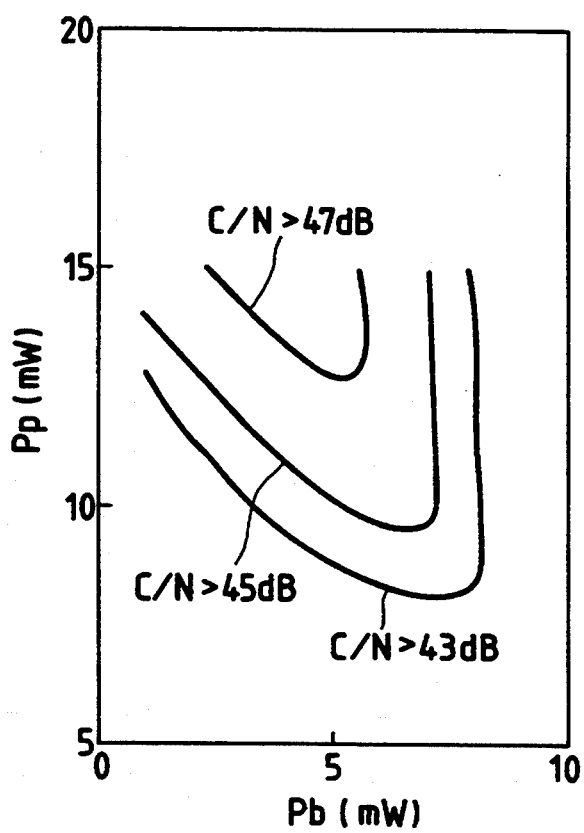
FIG. 15 is a graphical representation showing the relation between the C/N and the recording power in the magneto-optical recording medium of comparative example 5.

For the magneto-optical disk in this comparative example 5, the exactly same evaluation as in example 10 was performed. The recording power region where the bit error rate is below $5 \times 10^{-5}$ is shown in FIG. 14 with the slanting line. The relation between the C/N and the recording power is shown in FIG. 15. By the comparison with the example 10, it will be found that the C/N decreases about 2 to 3 dB as a whole, and thus the power margin for allowing an excellent recording is narrowed. The maximum reproducing power at which the degradation would not occur with the repetitive reproduction was 2.1 mW, lower than in example 10.

Comparative Example 6

A magneto-optical disk was fabricated with the same constitution and fabricating method as in example 10, except that the magnetic layer was constituted as described below.

After forming an under coating layer, the magnetic layer for reading of $Tb_{20}(Fe_{91.7}Co_{8.3})_{80}$ having a thickness of 35 nm was deposited on the under coating layer, with the sputtering, using three targets of Tb, Fe and Co. The Curie temperature of this layer was about 180° C. After leaving it for several hours in this state, the magnetic layer for writing having the same material and constitution as for the third magnetic layer in example 10 was formed in a thickness of 150 nm. The Curie temperature of this layer was about 220° C. The constitution of magnetic layer was a two-layer constitution as above described. The interface was deliberately contaminated to adjust the interface magnetic wall energy in the same way as in example 10, so that the exchange interaction between layers was adequately weakened.

Figure 16:
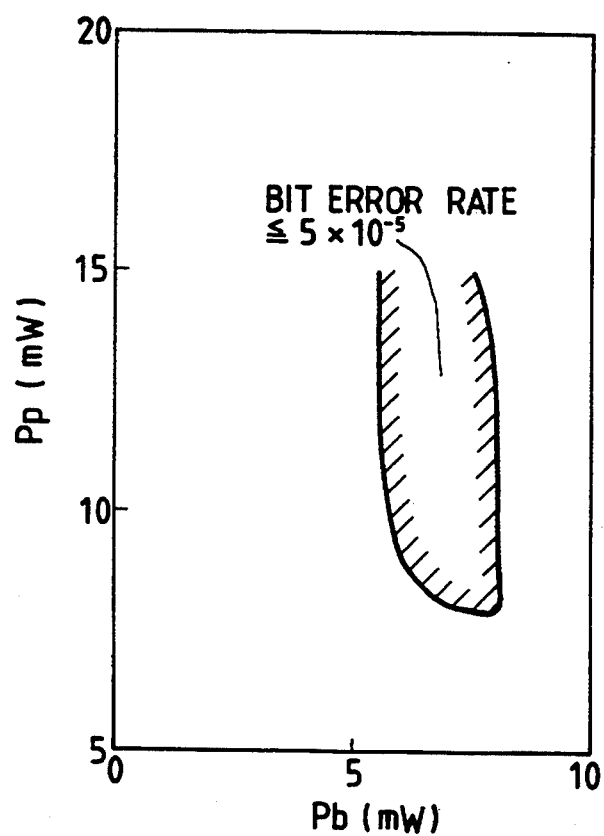
FIG. 16 is a graphical representation showing a recording power region having a bit error rate of $5 \times 10^{-5}$ or less in the magneto-optical recording medium of comparative example 6.

For the magneto-optical disk in this comparative example 5, the exactly same evaluation as in example 10 was performed. The recording power region where the bit error rate of this disk is below $5 \times 10^{-5}$ is shown in FIG. 16 with the slanting line. The comparison with the example 10 indicates that the power margin of the bottom power is narrowed. The maximum reproducing power at which the degradation would not occur with the repetitive reproduction was 2.6 mW, lower than in example 10.

Comparative Example 7

A magneto-optical disk was fabricated with the same constitution and fabricating method as in example 10, except that the magnetic layer was constituted as described below.

After forming an under coating layer, the magnetic layer for reading of $Tb_{20}(Fe_{91.7}Co_{8.3})_{80}$ having a thickness of about 35 nm was deposited on the under coating layer, with the sputtering, using three targets of Tb, Fe and Co. The Curie temperature of this layer was about 180° C. After leaving it for several hours in this state, the magnetic layer for writing of $(Tb_{70}Gd_{30})_{20}(Fe_{83.3}Co_{16.7})_{80}$ having a thickness of about 150 nm was formed, with the sputtering, using four targets of Gd, Tb, Fe and Co. The Curie temperature of this layer was about 260° C. The constitution of magnetic layer was a two-layer constitution as above described. The interface was deliberately contaminated to adjust the interface magnetic wall energy in the same way as in example 10, so that the exchange interaction between layers was adequately weakened.

Figure 17:
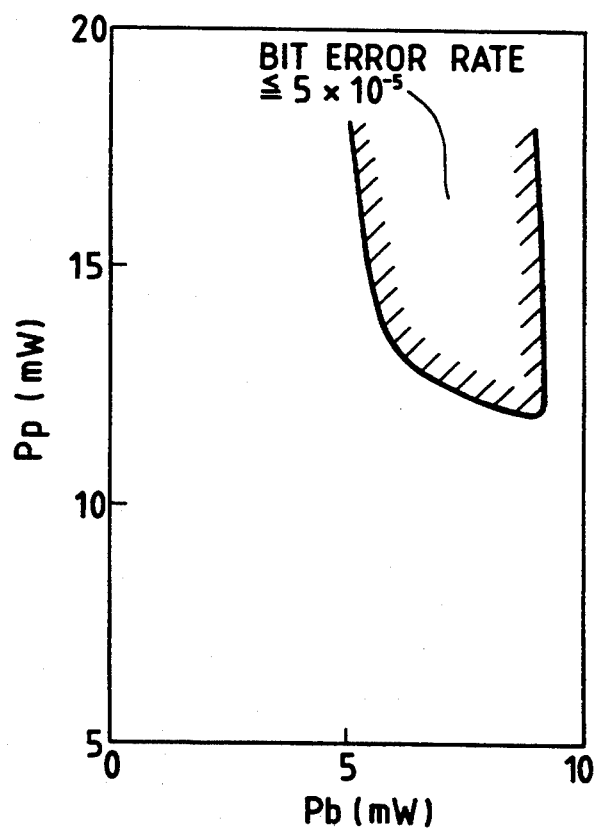
FIG. 17 is a graphical representation showing a recording power region having a bit error rate of $5 \times 10^{-5}$ or less in the magneto-optical recording medium of comparative example 7.

For the magneto-optical disk in this comparative example 5, the exactly same evaluation as in example 10 was performed. The recording power region where the bit error rate of this disk is below $5 \times 10^{-5}$ is shown in FIG. 17 with the slanting line. The comparison with the example 10 indicates that the recording sensitivity is worse, and thus a large laser power is required to make an excellent recording. The maximum reproducing power at which the degradation would not occur with the repetitive reproduction was 2.6 mW, lower than in example 10.

EXAMPLE 11

Figure 18:
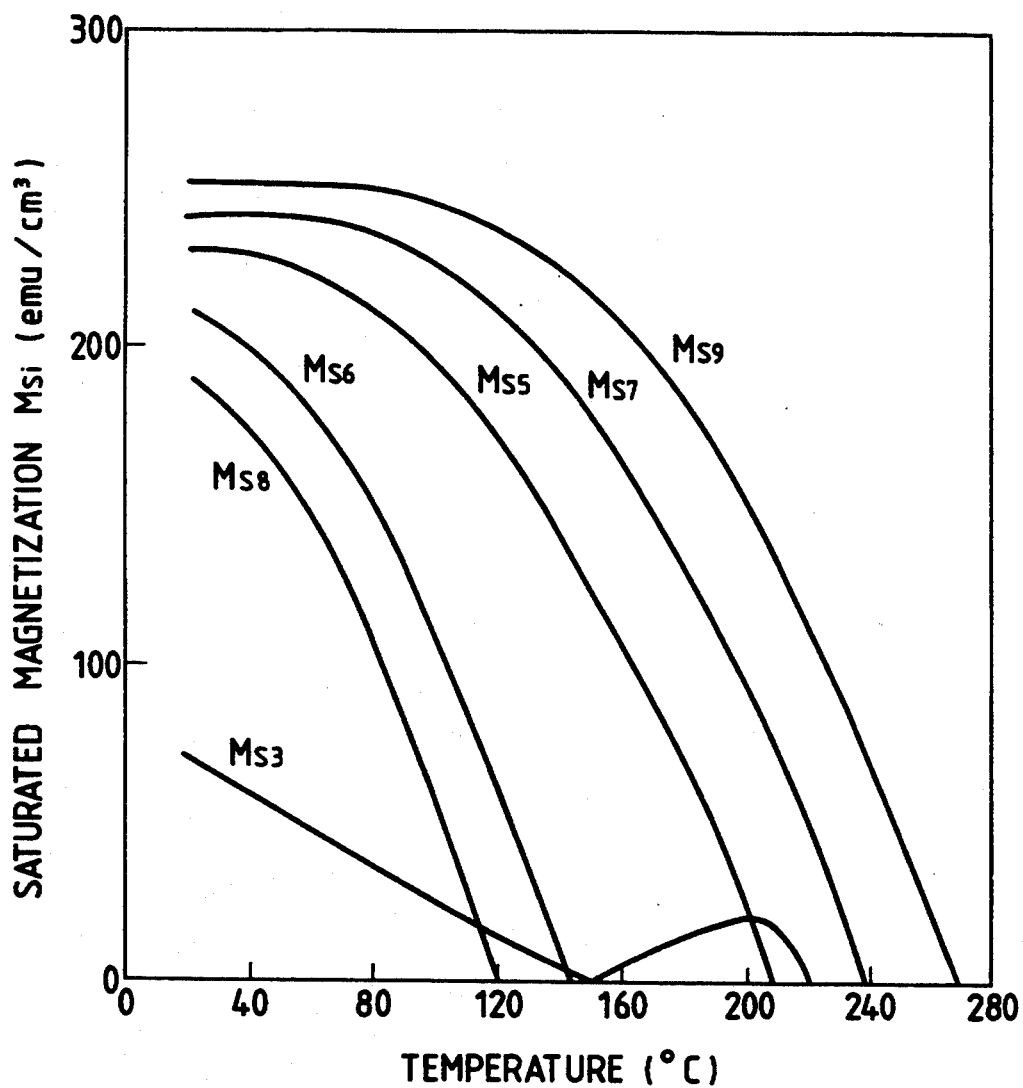
FIG. 18 is a graphical representation showing the temperature dependence of the saturated magnetization for each magnetic layer of the magneto-optical recording medium in another embodiment of the third example.
Figure 19:
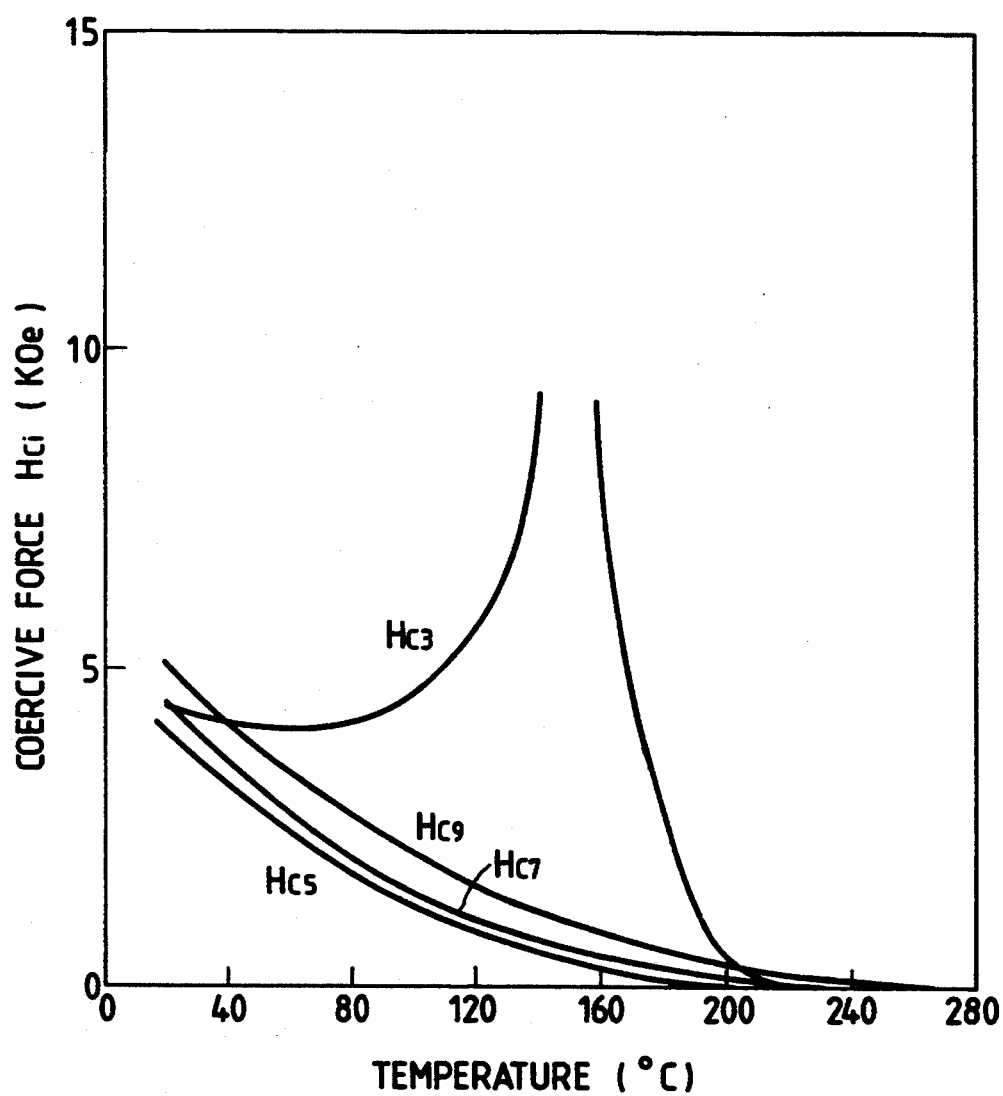
FIG. 19 is a graphical representation showing the temperature dependence of the coercive force for each magnetic layer of the magneto-optical recording medium as illustrated in FIG. 18.
Figure 20:
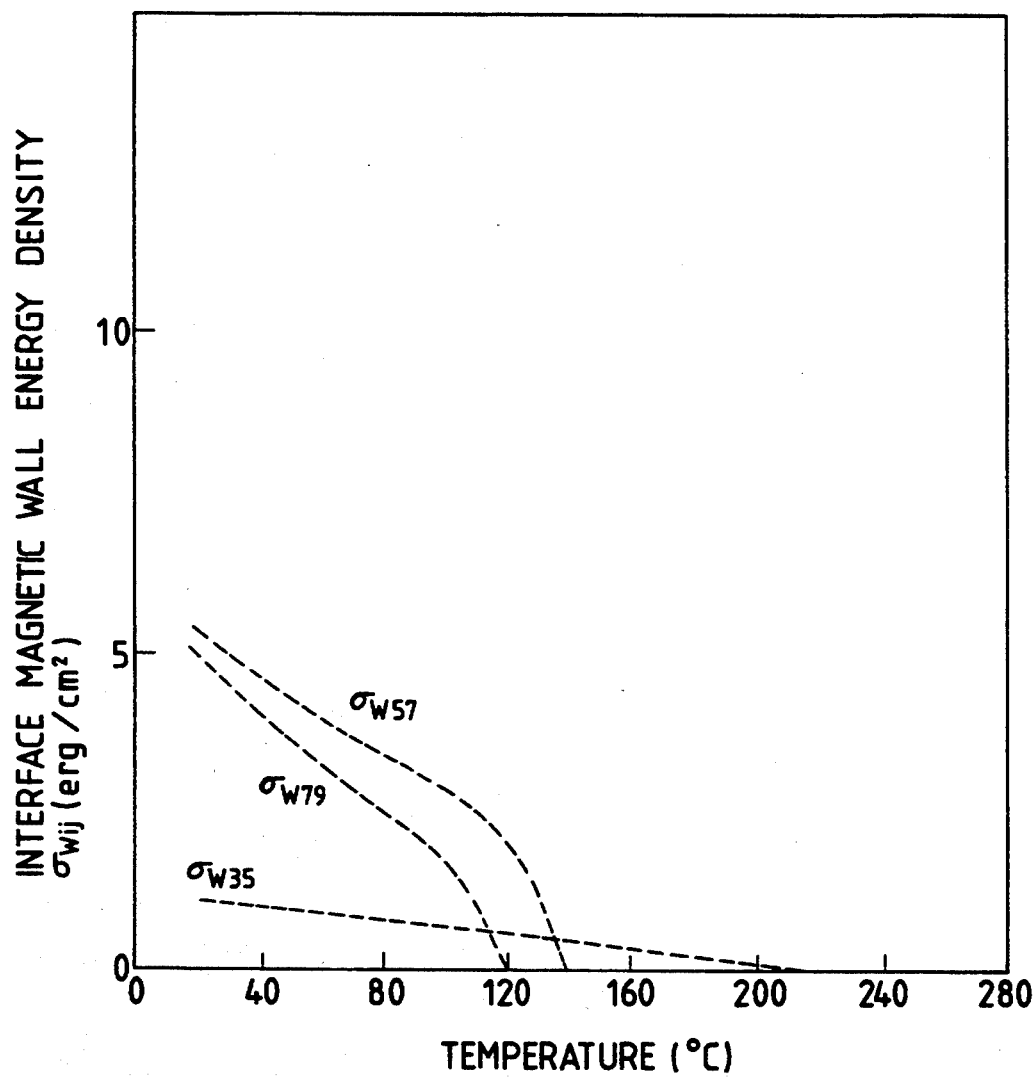
FIG. 20 is a graphical representation showing the temperature dependence of the interface magnetic wall energy density between magnetic layers of the magneto-optical recording medium as illustrated in FIG. 18.

A magneto-optical disk was fabricated with the same constitution and fabricating method as in example 10, except that the magnetic layer was constituted as shown in Table 12. In this example, the fourth magnetic layer is also omitted, but the interface magnetic wall energy is adjusted with interposition of a Cr layer having a thickness of about 0.5 to 1 nm between the third magnetic layer and the fifth magnetic layer. The temperature dependence of the saturated magnetization, the coercive force and the interface magnetic wall energy density of each layer are shown in FIGS. 18, 19 and 20.

Figure 21:
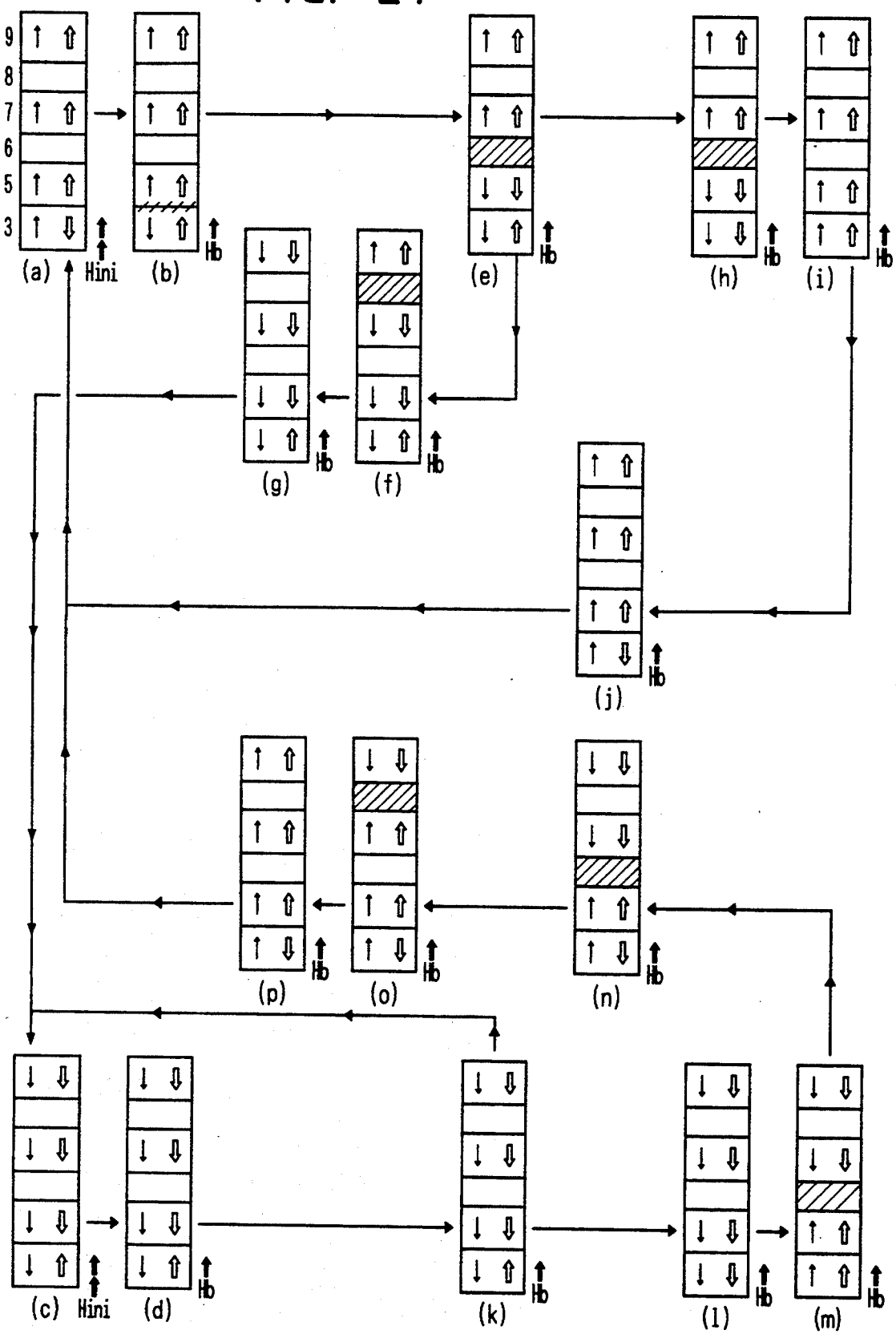
FIG. 21 is a diagram showing a recording process for the magneto-optical recording medium as illustrated in FIG. 18, illustrating a transition process of magnetized orientation state in the magnetic layer with the variation of medium temperature. In the figure, 3 to 9 correspond to the third to ninth magnetic layers, respectively. The arrow indicates the direction of atomic spins for an iron family element, and the broad arrow indicates the direction of magnetization. The slanting line section indicates that there is unalignment of atomic spins.

The fact that a process of transiting the magnetized orientation state with the variation of medium temperature which is a feature of the present invention is realized by a medium having such a constitution will be described with reference to FIG. 21. In the following explanation, assume that the compensation temperature of the i-th magnetic layer is $Tcomp_i$.

To this medium, an external magnetic field Hini of about 6 kOe is applied upward, for example. In this medium, the third magnetic layer is dominant in rare earth element sub-lattice magnetization at the room temperature, and other magnetic layers are dominant in iron group element sub-lattice magnetization, so that on the portion where the TM spins of each layer are all aligned upward in a direction perpendicular to the film face, the magnetization appears downward (FIG. 21a). Accordingly, for a sufficiently small upward external magnetic field H, the following inequalities will stand, $$2Ms_3Hc_3h_3 > 2Ms_3h_3H - \sigma w_{35} \qquad (210)$$

$$2Ms_3Hc_3h_3 + 2Ms_5Hc_5h_5 > 2(Ms_3h_3 - Ms_5h_5)H - \sigma w_{57} \qquad (211)$$

$$2Ms_3Hc_3h_3 + 2Ms_5Hc_5h_5 + 2Ms_7Hc_7h_7 > 2(Ms_3h_3 - Ms_5h_5 - Ms_7h_7)H - \sigma w_{79} \qquad (212)$$

$$2Ms_3Hc_3h_3 + 2Ms_5Hc_5h_5 + 2Ms_7Hc_7h_7 + 2Ms_9Hc_9h_9 > 2(Ms_3h_3 - Ms_5h_5 - Ms_7h_7 - Ms_9h_9)H \qquad (213)$$

$$2Ms_5Hc_5h_5 > -2Ms_5h_5H - \sigma w_{35} - \sigma w_{57} \qquad (214)$$

$$2Ms_4Hc_5h_5 + 2Ms_7Hc_7h_7 > -2(Ms_5h_5 + Ms_7h_7)h - \sigma w_{35} - \sigma w_{79} \qquad (215)$$

$$2Ms_5Hc_5h_5 + 2Ms_7Hc_7h_7 + 2Ms_9Hc_9h_9 > -2(Ms_5h_5 + Ms_7h_7 + Ms_9h_9)H \qquad (216)$$

$$2Ms_7Hc_7h_7 > -2Ms_7h_7H - \sigma w_{57} - \sigma w_{79} \qquad (217)$$

$$2Ms_7Hc_7h_7 + 2Ms_9Hc_9h_9 > -2(Ms_7h_7 + Ms_9h_9)H - \sigma w_{57} \qquad (218)$$

$$2Ms_9Hc_9h_9 > -2Ms_9h_9H - \sigma w_{79} \qquad (219)$$

If the external magnetic field H is continuously increased up to Hini, the relation of expression (210) is reversed while the relation of other expressions is maintained, so that the third magnetic layer can be oriented in a stable state against the external magnetic field Hini, by reversing the magnetization of the third magnetic layer upward, without reversing the magnetization of the fifth magnetic layer. Thereafter, if an external magnetic field Hb of 200 Oe, for example, is applied upward, the following expressions will stand at the room temperature in which a state is retained where the magnetic wall exists at the interface between the third magnetic layer and the fifth magnetic layer. The magnetized state of magnetic composite film for this applied part at this time is set as state B2 (FIG. 21b).

$$2Ms_3Hc_3h_3 > -2Ms_3h_3Hb + \sigma w_{35} \qquad (220)$$

$$2Ms_5Hc_5h_5 > -2Ms_5h_5Hb + \sigma w_{35} - \sigma w_{57} \qquad (221)$$

$$2Ms_5Hc_5h_5 + 2Ms_7Hc_7h_7 > -2(Ms_5h_5 + Ms_7h_7)Hb + \sigma w_{35} - \sigma w_{79} \qquad (222)$$

$$2Ms_5Hc_5h_5+2Ms_7Hc_7h_7+2Ms_9Hc_9h_9 > -2(Ms_5h_5 \\ +Ms_7h_7+Ms_9h_9)Hb+\sigma w_{35} \quad (223)$$

$$2Ms_7Hc_7h_7 > -2Ms_7h_7Hb-\sigma w_{57}-\sigma w_{79} \quad (224)$$

$$2Ms_7Hc_7h_7+2Ms_9Hc_9h_9 > -2(Ms_7h_7+Ms_9h_9)Hb- \\ \sigma w_- \quad (225)$$

$$2Ms_9Hc_9h_9 > -2Ms_9h_9Hb-\sigma w_{79} \quad (226)$$

On the portion (FIG. 21c) where the TM spins of each layer are all aligned downward, the magnetization of the third magnetic layer is all directed upward, whereby the coercive force of the fifth to seventh magnetic layers is above 6 kOe. Accordingly, no magnetized state will change even if an upward external magnetic field Hini of about 6 kOe may be applied. Even if an upward external magnetic field Hb of 200 Oe may be applied thereafter, no magnetized state will also change because the factor causing the state change is only the Zeeman energy with the external magnetic field, and the coercive force of each layer is greater than Hb, in which the TM spins of each layer are all directed downward, and the atomic spins are aligned over the direction of film thickness. The magnetized state at this time is set as state A2 (FIG. 21d).

If the medium temperature may be raised with the heating of the medium from the state B2, $\sigma w_{57}$ decreases in approaching to $Tc_6$, and the relation of expression (221) is reversed, so that the magnetization of the fifth magnetic layer is reversed. That is, the TM spins of the fifth magnetic layer are aligned with those of the third magnetic layer, and directed downward.

In a state after reversing the magnetization of the fifth magnetic layer, the following expressions will stand, in which the magnetic wall moves to the interface between the fifth magnetic layer and the seventh magnetic layer (FIG. 21e).

$$2Ms_3Hc_3h_3 > -2Ms_3h_3Hb-\sigma w_{35} \quad (230)$$

$$2Ms_3Hc_3h_3+2Ms_5Hc_5h_5 > 2(-Ms_3h_3+Ms_5h_5)Hb+- \\ \sigma w_{57} \quad (231)$$

$$2Ms_5Hc_5h_5 > 2Ms_5h_5Hb-\sigma w_{35}+\sigma w_{57} \quad (232)$$

$$2Ms_7Hc_7h_7 > -2Ms_7h_7Hb+\sigma w_{57}-\sigma w_{79} \quad (233)$$

$$2Ms_7Hc_7h_7+2Ms_9Hc_9h_9 > -2(Ms_7h_7+Ms_9h_9)Hb+- \\ \sigma w_{57} \quad (234)$$

$$2Ms_9Hc_9h_9 > -2Ms_9h_9Hb-\sigma w_{79} \quad (235)$$

If the medium temperature falls down from this state, $\sigma w_{57}$ will abruptly increase, so that the relation of expression (233) is reversed, and the magnetization of the seventh magnetic layer is reversed. That is, the TM spins of the seventh magnetic layer are aligned with the fifth magnetic layer, and directed downward.

In a state after reversing the magnetization of the seventh magnetic layer, the following expressions will stand, in which the magnetic wall moves to the interface between the seventh magnetic layer and the ninth magnetic layer (FIG. 21f).

$$2Ms_3Hc_3h_3 > 2Ms_3h_3Hb-\sigma w_{35} \quad (240)$$

$$2Ms_3Hc_3h_3+wMs_5Hc_5h_5 > 2(-Ms_3h_3+Ms_5h_5)Hb- \\ -\sigma w_{57} \quad (241)$$

$$2Ms_3Hc_3h_3+2Ms_5Hc_5h_5+2Ms_7Hc_7h_7 > 2(-Ms_3h_3 \\ +Ms_5h_5+Ms_7h_7)Hb+\sigma w_{79} \quad (242)$$

$$2Ms_5Hc_5h_5 > 2Ms_5h_5Hb-\sigma w_{35}-\sigma w_{57} \quad (243)$$

$$2Ms_5Hc_5h_5+2Ms_7Hc_7h_7 > 2(Ms_5h_5+Ms_7h_7)Hb-\sigma- \\ w_{35}+\sigma w_{79} \quad (244)$$

$$2Ms_7Hc_7h_7 > 2Ms_7h_7Hb-\sigma w_{57}+\sigma w_{79} \quad (245)$$

$$2Ms_9Hc_9h_9 > -2Ms_9h_9Hb+\sigma w_{79} \quad (246)$$

If the medium temperature further falls down from this state, $\sigma w_{79}$ will abruptly increase, so that the relation of expression (246) is reversed, and the magnetization of the ninth magnetic layer is reversed. That is, the TM spins of the ninth magnetic layer are aligned with those of the seventh magnetic layer, and directed downward (FIG. 21g). And the temperature falls down to the room temperature with this state being unchanged. Finally, the medium is placed in a state where the TM spins of each layer are all aligned downward, or state A2 (FIGS. 21c, 21d).

If the medium temperature is further raised with the heating from $Tc_6$ to a temperature above $Tcomp_3$, the third magnetic layer becomes dominant in iron family element sub-lattice magnetization, so that the polarity is reversed (with the spin direction unchanged), and the expressions of magnetization reversal are shown in the following (FIG. 21h).

$$2Ms_3Hc_3h_3 > 2Ms_3h_3Hb-\sigma w_{35} \quad (258)$$

$$2Ms_3Hc_3h_3+2Ms_5Hc_5h_5 > 2(Ms_3h_3+Ms_5h_5)Hb+\sigma- \\ w_{57} \quad (251)$$

$$2Ms_5Hc_5h_5 > 2Ms_5h_5Hb-\sigma w_{35}+\sigma w_{57} \quad (252)$$

$$2Ms_7Hc_7h_7 > -2Ms_7h_7Hb+\sigma w_{57}-\sigma w_{79} \quad (253)$$

$$2Ms_7Hc_7h_7+2Ms_9Hc_9h_9 > -2(Ms_7h_7+Ms_9h_9)Hb+- \\ \sigma w_{57} \quad (254)$$

$$2Ms_9Hc_9h_9 > -2Ms_9h_9Hb-\sigma w_{79} \quad (255)$$

If the medium temperature is further raised up to about $Tc_5$ ($\sim Tc_3$), the relation of expression (251) is reversed, so that the magnetization of the third and fifth magnetic layers is reversed at the same time, and the TM spins are directed upward (FIG. 21i). If the temperature may fall down from this state, the polarity of the third magnetic layer is reversed again at the temperature below $Tcomp_3$, but no magnetized state will change because the following expressions are true (FIG. 21j).

$$2Ms_3Hc_3h_3 > 2Ms_3h_3Hb-\sigma w_{35} \quad (260)$$

$$2Ms_3Hc_3h_3+2Ms_5Hc_5h_5 > 2(Ms_3h_3-Ms_5h_5)Hb-\sigma- \\ w_{57} \quad (261)$$

$$2Ms_3Hc_3h_3+2Ms_5hc_5h_5+2Ms_7Hc_7h_7 > 2(Ms_3h_3-- \\ Ms_5h_5-Ms_7h_7)Hb-\sigma w_{79} \quad (262)$$

$$2Ms_3Hc_3h_3+wMs_5Hc_5h_5+2Ms_7Hc_7h_7+2Ms_9Hc_7h_9- \\ > 2(Ms_3h_3-Ms_5h_5-Ms_9h_9)Hb \quad (263)$$

$$2Ms_5Hc_5h_5 > -2Ms_5h_5Hb-\sigma w_{35}-\sigma w_{57} \quad (264)$$

$$2Ms_5Hc_5h_5+2Ms_7Hc_7h_7 > -2(Ms_5h_5+Ms_7h_7)Hb-- \\ \sigma w_{35}-\sigma w_{79} \quad (265)$$

$$2Ms_5Hc_5h_5+2Ms_7Hc_7h_7+2Ms_9Hc_9h_9>-2(Ms_5h_5+Ms_7h_7+Ms_9h_9)Hb-\sigma w_{35} \quad (266)$$

$$2Ms_7Hc_7h_7>-2Ms_7h_7Hb-\sigma w_{57\ w_{79}} \quad (267)$$

$$2Ms_7Mc_7h_7+2Ms_9Hc_9h_9>-2(Ms_7h_7+Ms_9h_9)Hb--\sigma w_{57} \quad (268)$$

$$2Ms_9Hc_9h_9>-2Ms_9h_9Hb-\sigma w_{79} \quad (269)$$

And below Tc$_6$, the fifth and seventh magnetic layers, and below Tc$_8$, the seventh and ninth magnetic layers are magnetically bonded. However, as the TM spin orientation of each layer is aligned upward, the medium returns to the room temperature while this state is maintained (FIG. 21a), but if an upward external magnetic field Hini is applied again from this state, the medium is placed in a state B2 (FIG. 21b).

Next, the medium is heated by applying an upward external magnetic field Hb from the state A2 (FIG. 21d). In this case, no state change will change because the factor causing the state change is only the Zeeman energy due to the external magnetic field, and the coercive force of each layer is greater than Hb in this temperature range even if the medium is heated up to Tc$_6$ (FIG. 21k). Even if the temperature may fall down from this state, the spins are all aligned without change of the spin direction. That is, the medium remains in the state A2 (FIG. 21d).

On the other hand, if the medium is further heated from Tc$_6$ beyond Tcomp$_3$ (FIG. 21l) to about Tc$_5$ ($\sim$Tc$_3$), the magnetization of the third and fifth magnetic layers is reversed upward at the same time as previously described, and the TM spins are directed upward. However, as the seventh and ninth magnetic layers have high Curie temperatures and sufficiently large coercive forces at this time, the downward magnetization (downward TM spin) is maintained (FIG. 21m).

If the temperature falls down from this state to less than Tcomp$_3$ (FIG. 21n) to further less than TC$_6$, the fifth and seventh magnetic layers are magnetically bonded. If the temperature further falls down below Tc$_8$, the seventh and ninth magnetic layers are bonded. The relational expressions associated with the magnetization reversal before and after this time are as follows.

$$2Ms_3Hc_3h_3>2Ms_3h_3Hb-\sigma w_{35} \quad (270)$$

$$2Ms_3Hc_3h_3+2Ms_5Hc_5h_5>2(Ms_3h_3-Ms_5h_5)Hb+\sigma w_{57} \quad (271)$$

$$2Ms_5Hc_5h_5>-2Ms_5h_5Hb-\sigma w_{35}+\sigma w_{57} \quad (272)$$

$$2Ms_7Hc_7h_7>2Ms_7h_7Hb+\sigma w_{57}-\sigma w_{79} \quad (273)$$

$$2Ms_7Hc_7h_7+2Ms_9Hc_9h_9>2(Ms_7h_7+Ms_9h_9)Hb+\sigma w_{57} \quad (274)$$

$$2Ms_9Hc_9h_9>2Ms_9h_9Hb-\sigma w_{79} \quad (275)$$

If the medium temperature falls down from this state, $\sigma w_{57}$ will abruptly increase, so that the relation of expression (273) is reversed, and the magnetization of the seventh magnetic layer is reversed. That is, the TM spins of the seventh magnetic layer are aligned with those of the fifth magnetic layer, and directed upward.

In a state after reversing the magnetization of the seventh magnetic layer, the following expressions will stand, in which the magnetic wall is formed at the interface between the seventh and ninth magnetic layers (FIG. 21o).

$$2Ms_3Hc_3h_3>2Ms_3h_3Hb-\sigma w_{35} \quad (280)$$

$$2Ms_3Hc_3h_3+2Ms_5Hc_5h_5>2(Ms_3h_3-Ms_5h_5)Hb+\sigma w_{57} \quad (281)$$

$$2Ms_3Hc_3h_3+2Ms_5Hc_5h_5+2Ms_7Hc_7h_7>2(Ms_3h_3-Ms_5h_5-Ms_7h_7)Hb+\sigma w_{79} \quad (282)$$

$$2Ms_5Hc_5h_5-2Ms_5h_5Hb-\sigma w_{35}-\sigma w_{57} \quad (283)$$

$$2Ms_5Hc_5h_5+2Ms_7Hc_7h_7>-2(Ms_5h_5+Ms_7h_7)Hb-\sigma w_{35}+\sigma w_{79} \quad (284)$$

$$2Ms_7Hc_7h_7>-2Ms_7h_7Hb-\sigma w_{57}+\sigma w_{79} \quad (285)$$

$$2Ms_9Hc_9h_9>2Ms_9h_9Hb+\sigma w_{79} \quad (286)$$

If the medium temperature further falls down from this state, $\sigma w_{79}$ will abruptly increase, so that the relation of expression (286) is reversed, and the magnetization of the ninth magnetic layer is reversed. That is, the TM spins of the ninth magnetic layer are aligned with those of the seventh magnetic layer, and directed upward (FIG. 21p). Finally, the medium is placed in a state where the TM spins of each layer are all aligned upward, but if an upward external magnetic field Hini is applied again from this state, it is placed in a state B2 (FIG. 21d).

As will be seen from the above, this medium satisfies the conditions which are features of the present invention.

For the magneto-optical disk of example 11, the exactly same evaluation as for example 10 was performed. However, in this case, the bias magnetic field for recording was oriented in the same direction as the magnetic field for initialization. As a result, excellent recording characteristics and regenerative durability could be obtained.

The magneto-optical disks as shown in examples 12, 13 can be explained to satisfy the conditions which are features of the present invention in the same way.

EXAMPLE 12

A magneto-optical disk was fabricated with the same constitution and fabricating method as in example 10, except that the magnetic layer was constituted as shown in Table 13. In this example, as the fourth magnetic layer, a GdFeCo layer having a saturated magnetization of 400 emu/cm$^3$ at the room temperature was provided. The materials and compositions of other magnetic layers are exactly the same in example 10. As $\sigma w_{35}$ can be effectively reduced with the interposition of the fourth magnetic layer, the exactly same process as in example 10 will be fulfilled in a system where the film thickness of each magnetic layer is thinner than in example 1.

For the magneto-optical disk of example 12, the exactly same evaluation as for example 1 was performed. As a result, excellent magnetic characteristics and regenerative durability could be obtained.

EXAMPLE 13

A magneto-optical disk was fabricated with the same constitution and fabricating method as in example 11, except that the magnetic layer was constituted as shown in Table 14, and two magnetic layers as described below were added.

Subsequently after the exactly same magnetic layers as in example 11 were sequentially laminated from the seventh to third magnetic layers, the sputtering was performed using two targets of Tb and Fe to deposit the second additive magnetic layer composed of TbFe amorphous alloy having a thickness of 5 nm on the third magnetic layer. Further, the sputtering was performed using two targets of Tb and Co to deposit the first additive magnetic layer composed of TbCo amorphous alloy having a thickness of 30 nm on the second additive magnetic layer, in which the first additive magnetic layer was magnetized in one direction all over the face after forming the film. Assuming the interface magnetic wall energy between the additive magnetic layer 1 and the third magnetic layer to be $\sigma w_{1,3}$, $\sigma w_{1,3}$ at the room temperature was 5.0 erg/cm$^3$.

This medium can reduce the minimum value of the external magnetic field Hini necessary for orienting the third magnetic layer in a predetermined direction before recording by the amount of $\sigma w_{1,3}/2Ms_3h_3$ as compared with example 11.

That is, in example 10, to satisfy the relational expression associated with the initialization $$2Ms_3Hc_3h_3 < 2Ms_3h_3 Hini - \sigma w_{35} \qquad (410)$$

it is necessary to satisfy the expression $$Hini > Hc_3 + \sigma w_{35}/2Ms_3h_3 = 5.2 \text{ kOe} \qquad (411)$$

while in example 4, it is sufficient to satisfy $$2Ms_3Hc_3h_3 < 2Ms_3h_3 Hini - \sigma w_{35} + \sigma w_{1,3} \qquad (412)$$

so that the expression $$Hini > Hc_3 + \sigma w_{35}/2Ms_3h_3 - \sigma w_{1,3}/2Ms_3h_3 = 1.6 \text{ kOe} \qquad (413)$$

is obtained.

EXAMPLE 14

Figure 22:
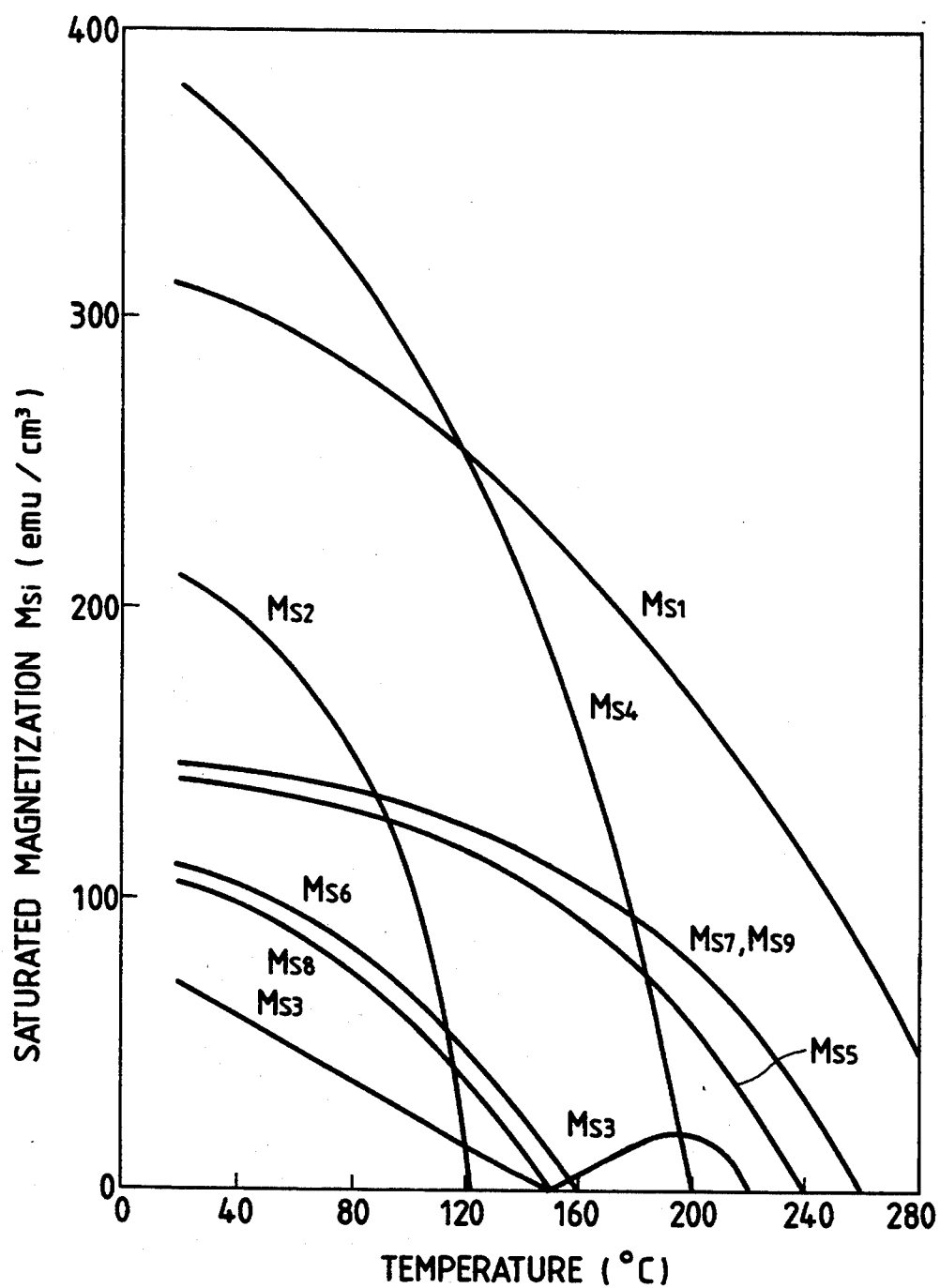
FIG. 22 is a graphical representation showing the temperature dependence of the saturated magnetization for each magnetic layer of the magneto-optical recording medium in a further embodiment of the third example.
Figure 23:
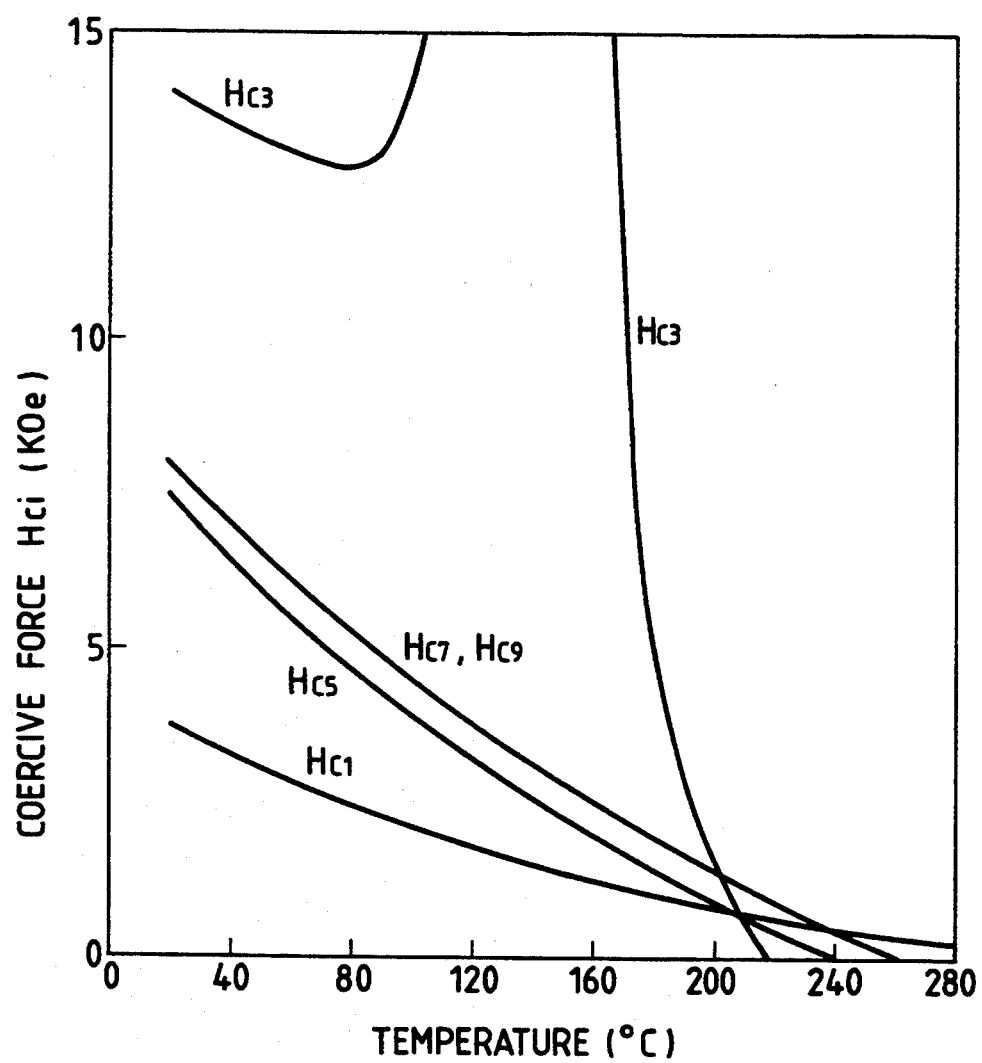
FIG. 23 is a graphical representation showing the temperature dependence of the coercive force for each magnetic layer of the magneto-optical recording medium as illustrated in FIG. 22.
Figure 24:
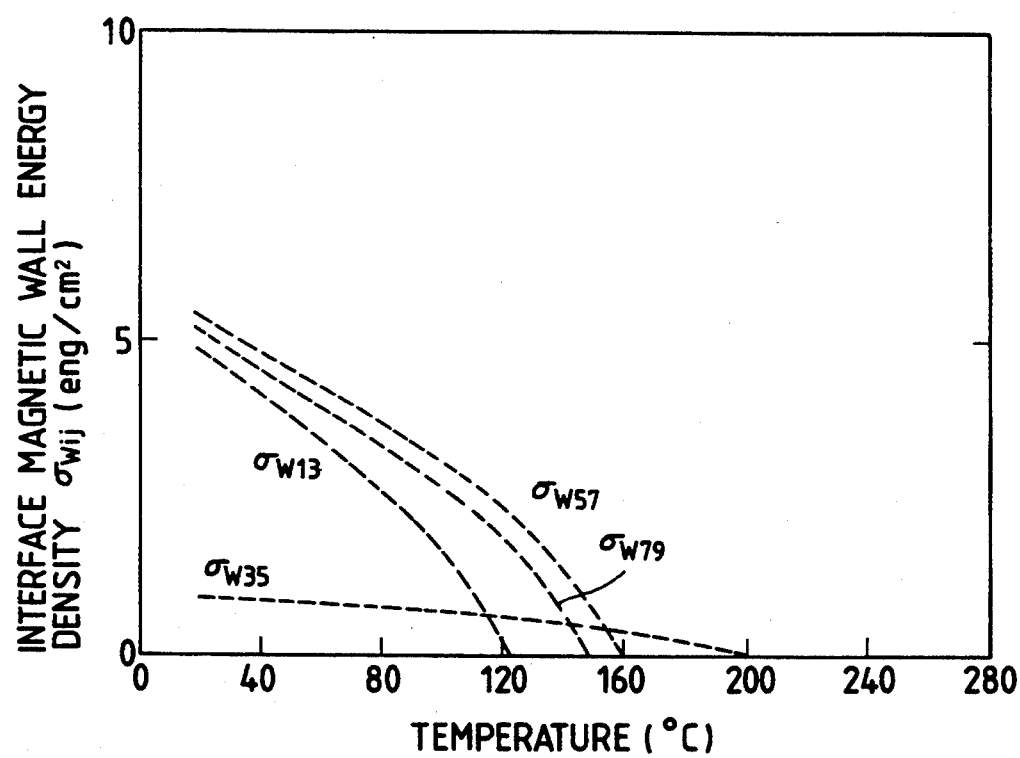
FIG. 24 is a graphical representation showing the temperature dependence of the interface magnetic wall energy density between magnetic layers of the magneto-optical recording medium as illustrated in FIG. 22.
Figure 25:
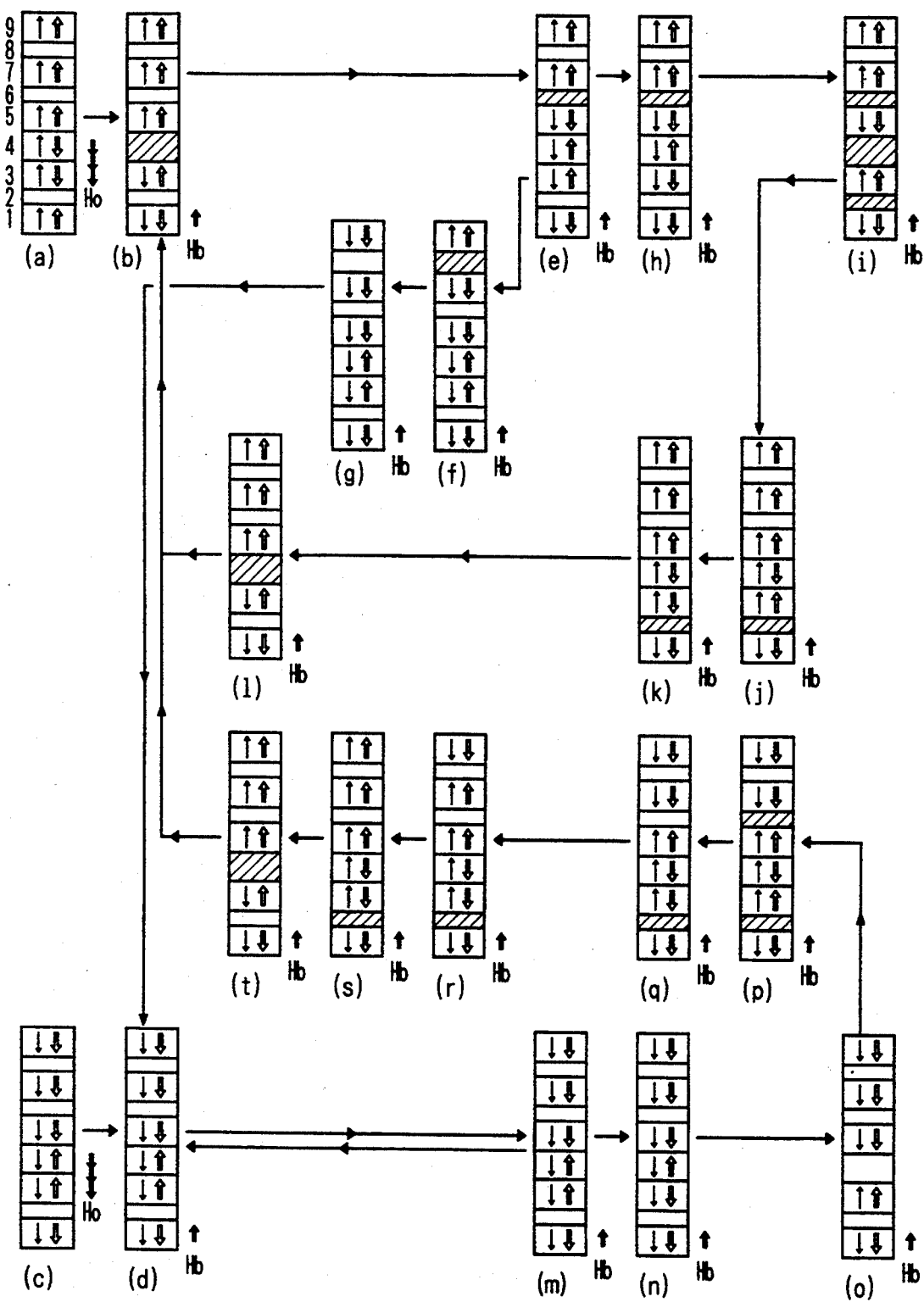
FIG. 25 is a diagram showing a recording process for the magneto-optical recording medium as illustrated in FIG. 22, illustrating a transition process of magnetized orientation state in the magnetic layer with the variation of medium temperature. In the figure, 1 to 9 correspond to the first to ninth magnetic layers, respectively. The arrow indicates the direction of atomic spins for an iron family element, and the broad arrow indicates the direction of magnetization. The slanting line section indicates that there is unalignment of atomic spins.

A magneto-optical disk was fabricated with the same constitution and fabricating method as in example 1, except that the magnetic layer was constituted as shown in Table 15. The temperature dependence of the saturated magnetization, the coercive force and the interface magnetic wall energy density of each layer are shown in FIGS. 22, 23 and 24. The fact that a process of transiting the magnetized orientation state with the variation of medium temperature which is a feature of the present invention is realized by a medium having such a constitution will be described with reference to FIG. 25.

The medium immediately after forming the film is placed in a maze state, and the first magnetic layer is in a different orientation state depending on the position, but can be magnetized in a desired orientation state by applying a sufficient large external magnetic field in an appropriate direction or heating the medium to about Tc$_1$ under the application of an appropriate bias magnetic field.

For example, an instance where an external magnetic field Ho of about 7 kOe is applied downward onto the entire surface of medium at the room temperature will be described. On the portion where the TM spins of each layer in the medium are aligned upward in a direction perpendicular to the film face (FIG. 25a), the following expressions will stand for a sufficient small, downward external magnetic field H.

$$2Ms_1Hc_1h_1 > 2Ms_1h_1H - \sigma w_{13} \qquad (510)$$

$$2Ms_1Hc_1h_1 + 2Ms_3Hc_3h_3 > (2Ms_1h_1 - 2Ms_3h_3 - Ms_4h_4)H - \sigma w_{35} \qquad (511)$$

$$2Ms_1Hc_1h_1 + 2Ms_3Hc_3h_3 + 2Ms_5Hc_5h_5 > (2Ms_1h_1 - 2Ms_3h_3 - 2Ms_3h_3 - Ms_4h_4 + 2Ms_5h_5)H - \sigma w_{57} \qquad (512)$$

$$2Ms_1Hc_1h_1 + 2Ms_3Hc_3h_3 + 2Ms_5Hc_5h_5 + 2Ms_7Hc_7h_7 > (2Ms_1h_1 - 2Ms_3h_3 - Ms_4h_4 + 2Ms_5h_5 + 2Ms_7h_7)H - \sigma w_{79} \qquad (513)$$

$$2Ms_1Hc_1h_1 + 2Ms_3Hc_3h_3 + 2Ms_5Hc_5h_5 + 2Ms_7Hc_7h_7 + 2Ms_9Hc_9h_9 > (2Ms_1h_1 - 2Ms_3h_3 - MS_4h_4 + 2Ms_5h_5 + 2Ms_7h_7 + 2Ms_9h_9)H \qquad (514)$$

$$2Ms_3Hc_3h_3 > (-2Ms_3h_3 - Ms_4h_4)H - \sigma w_{13} - \sigma w_{35} \qquad (515)$$

$$2Ms_3Hc_3H_3 + 2Ms_5Hc_5h_5 > (-2Ms_3h_3 - Ms_4h_4 + 2Ms_5h_5)H - \sigma w_{13} - \sigma w_{57} \qquad (516)$$

$$2Ms_3Hc_3h_3 + 2Ms_5Hc_5h_5 + 2Ms_7Hc_7h_7 > (-2Ms_3h_3 - Ms_4h_4 + 2Ms_5h_5 + 2Ms_7h_7)H - \sigma w_{13} - \sigma w_{79} \qquad (517)$$

$$2Ms_3Hc_3h_3 + 2Ms_5Hc_5h_5 + 2Ms_7Hc_7h_7 + 2Ms_9Hc_9h_9 > (-2Ms_3h_3 - Ms_4h_4 + 2Ms_5h_5 + 2Ms_7h_7 + 2Ms_9h_9)H - \sigma w_{13} \qquad (518)$$

$$2Ms_5Hc_5h_5 > (-Ms_4h_4 + 2Ms_5h_5)H - \sigma w_{35} - \sigma w_{57} \qquad (519)$$

$$2Ms_5Hc_5h_5 + 2Ms_7Hc_7h_7 > (-Ms_4h_4 + 2Ms_5h_5 + 2Ms_7h_7)H - \sigma w_{35} - \sigma w_{79} \qquad (51A)$$

$$2Ms_5Hc_5h_5 + 2Ms_7Hc_7h_7 + 2Ms_9Hc_9h_9 > (-Ms_4h_4 - 2Ms_5h_5 + 2Ms_7h_7 + 2Ms_9h_9)H - \sigma w_{35} \qquad (51B)$$

$$2Ms_7Hc_7h_7 > 2Ms_7h_7H - \sigma w_{57} - \sigma w_{79} \qquad (51C)$$

$$2Ms_7Hc_7h_7 + 2Ms_9Hc_9h_9 > 2(Ms_7h_7 + Ms_9h_9)H - \sigma w_{57} \qquad (51D)$$

$$2Ms_9Hc_9h_9 > 2Ms_9h_9H - \sigma w_{79} \qquad (51E)$$

If the external magnetic field H is continuously increased to H$_o$, the relation of expression (510) is reversed ahead of other expressions. Accordingly, the magnetization of the first magnetic layer is reversed, so that the interface magnetic wall relative to the third magnetic layer is formed. In this state, the magnetization of the third magnetic layer is not reversed under the influence of the external magnetic field H$_o$, but if the application of H$_o$ is stopped, the relation $2Ms_3Hc_3h_3 > (-2Ms_3h_3 - Ms_4h_4)H + \sigma w_{13} - \sigma w_{35}$ is reversed with decreasing external magnetic field H, so that the magnetization of the third magnetic layer is reversed. As a result, the magnetic composite film is in such a magnetized state that the TM spins from the first to third magnetic layers are aligned downward, and the TM spins from the fifth to ninth magnetic layers are aligned upward, in which the unalignment of the spin exists between the third and fifth magnetic layers. This magnetized state is set as a state B5$_o$ (FIG. 25b).

Similarly considering the portion where the TM spins of each layer in the medium are aligned downward in a direction perpendicular to the film face (FIG. 25c), the relation of each expression is not reversed even if a downward external magnetic field of about 7 kOe is applied, whereby the magnetized state will not change. The magnetic composite film at this time is in such a magnetized state that the spins from the first to ninth magnetic layers are aligned downward. This state is set as a state $A5_o$ (FIG. 25d).

Accordingly, it is possible to magnetize the first magnetic layer (and the third magnetic layer) in a predetermined direction, with this operation. In this case, the first magnetic layer can be magnetize so that the TM spins may be oriented downward.

If an upward external magnetic field Hb of 200 Oe, for example, is applied from the state $B5_o$, the following expressions will stand at the room temperature, in which a state is retained where the magnetic wall exists at the interface between the third and fifth magnetic layers. The magnetized state of magnetic composite film is set as a state B5 (FIG. 25b).

$$2Ms_1Hc_1h_1 > 2Ms_1h_1Hb - \sigma w_{13} \quad (520)$$

$$2Ms_1Hc_1h_1 + 2Ms_3Hc_3h_3 > (2Ms_1h_1 - 2Ms_3h_3 - Ms_4h_4)Hb + \sigma w_{35} \quad (521)$$

$$2Ms_3Hc_3h_3 > (-2Ms_3h_3 - Ms_4h_4)Hb - \sigma w_{13} + \sigma w_{35} \quad (522)$$

$$2Ms_5Hc_5h_5 > (Ms_4h_4 - 2Ms_5h_5)Hb + \sigma w_{35} - \sigma w_{57} \quad (523)$$

$$2Ms_5Hc_5h_5 + 2Ms_7Hc_7h_7 > (Ms_4h_4 - 2Ms_5h_5 - 2Ms_7h_7)Hb + \sigma w_{35} - \sigma w_{79} \quad (524)$$

$$2Ms_5Hc_5h_5 + 2Ms_7Hc_7h_7 + 2Ms_9Hc_9h_9 > (Ms_4h_4 - 2Ms_5h_5 - 2Ms_5h_5 - 2Ms_7h_7 - 2Ms_7h_7 - 2Ms_9h_9)Hb + \sigma w_{35} \quad (525)$$

$$2Ms_7Hc_7h_7 > -2Ms_7h_7Hb - \sigma w_{57} - \sigma w_{79} \quad (526)$$

$$2Ms_7Hc_7h_7 + 2Ms_9Hc_9h_9 > -2(Ms_7h_7 + Ms_9h_9)Hb - \sigma w_{57} \quad (527)$$

$$2Ms_9Hc_9h_9 > -2Ms_9h_9Hb - \sigma w_{79} \quad (528)$$

When an upward external magnetic field Hb of 200 Oe may be applied from the state $A5_o$, the spins of each layer are all aligned, and the magnetic wall does not exist at any interface, whereby the factor causing the state change is only the Zeeman energy with the external magnetic field. However, as the coercive force of each layer at the room temperature is greater than Hb, no state change will occur. The magnetized state of magnetic composite film at this time is set as state 5A (FIG. 25c).

If the medium is heated from the state B5 so that the medium temperature may rise, $\sigma w_{57}$ decreases in approaching to $Tc_6$, and the relation of expression (523) is reversed ahead of other expressions, so that the magnetization of the fifth magnetic layer is reversed. That is, the spins of the fifth magnetic layer are aligned with those of the third magnetic layer.

In a state after reversing the magnetization of the fifth magnetic layer, the following expressions will stand, in which the magnetic wall moves to the interface between the fifth and seventh magnetic layers (FIG. 25e).

$$2Ms_1Hc_1h_1 > 2Ms_1h_1Hb - \sigma w_{13} \quad (530)$$

$$2Ms_1Hc_1h_1 + 2Ms_3Hc_3h_3 > (2Ms_1h_1 - 2Ms_3h_3 - Ms_4h_3 - Ms_4h_4) - \sigma w_{35} \quad (531)$$

$$2Ms_1Hc_1h_1 + 2Ms_3Hc_3h_3 + 2Ms_5Hc_5h_5 > 2(Ms_1h_1 - Ms_3h_3 - Ms_4h_4 + Ms_5h_5)Hb + \sigma w_{57} \quad (532)$$

$$2Ms_3Hc_3h_3 > (-2Ms_3h_3 - Ms_4h_4)Hb - \sigma w_{13} - \sigma w_{35} \quad (533)$$

$$2Ms_3Hc_3h_3 + 2Ms_5Hc_5h_5 > 2(-Ms_3h_3 - Ms_4h_4 + Ms_5h_5)Hb - \sigma w_{13} + \sigma w_{57} \quad (534)$$

$$2Ms_5Hc_5h_5 > (2Ms_5h_5 - Ms_4h_4)Hb - \sigma w_{35} + \sigma w_{57} \quad (535)$$

$$2Ms_7Hc_7h_7 > -2Ms_7h_7Hb + \sigma w_{57} - \sigma w_{79} \quad (536)$$

$$2Ms_7Hc_7h_7 + 2Ms_9Hc_9h_9 > -2(Ms_7h_7 + Ms_9h_9)Hb + \sigma w_{57} \quad (537)$$

$$2Ms_9Hc_9h_9 > -2Ms_9h_9Hb - \sigma w_{79} \quad (538)$$

If the medium temperature falls down from this state, $\sigma w_{57}$ will abruptly increase, so that the relation of expression (536) is reversed, and the magnetization of the seventh magnetic layer is reversed. That is, the TM spins of the seventh magnetic layer are aligned with those of the fifth magnetic layer.

In a state after reversing the magnetization of the seventh magnetic layer, the following expressions will stand, in which the magnetic wall moves to the interface between the seventh and ninth magnetic layers (FIG. 25f).

$$2Ms_1Hc_1h_1 > 2Ms_1h_1Hb - \sigma w_{13} \quad (540)$$

$$2Ms_1Hc_1h_1 + 2Ms_3Hc_3h_3 > (2Ms_1h_1 - 2Ms_3h_3 - Ms_4h_4)Hb - \sigma w_{35} \quad (541)$$

$$2Ms_1Hc_1h_1 + 2Ms_3Hc_3h_3 + 2Ms_5Hc_5h_5 > 2(Ms_1h_1 - Ms_3h_3 - Ms_4h_4 + Ms_4h_4 + Ms_5h_5)Hb - \sigma w_{57} \quad (542)$$

$$2Ms_1Hc_1h_1 + 2Ms_3Hc_3h_3 + 2Ms_5Hc_5h_5 + 2Ms_7Hc_7h_7 > 2(Ms_1h_1 - Ms_3h_3 - Ms_3h_3 - Ms_4h_4 + Ms_5h_5 + Ms_7h_7)Hb + \sigma w_{79} \quad (543)$$

$$2Ms_3Hc_3h_3 > (-2Ms_3h_3 - Ms_4h_4)Hb - \sigma w_{13} - \sigma w_{35} \quad (544)$$

$$2Ms_3Hc_3h_3 + 2Ms_5Hc_5h_5 > 2(-Ms_3h_3 - Ms_4h_4 + Ms_5h_5)Hb - \sigma w_{13} - \sigma w_{57} \quad (545)$$

$$2Ms_3Hc_3h_3 + 2Ms_5Hc_5h_5 + 2Ms_7Hc_7h_7 > 2(-Ms_3h_3 - Ms_4h_4 + Ms_5h_5 + Ms_7h_7)Hb - \sigma w_{13} + \sigma w_{79} \quad (546)$$

$$2Ms_5Hc_5h_5 > (-Ms_4h_4 + 2Ms_5h_5)Hb - \sigma w_{35} - \sigma w_{57} \quad (547)$$

$$2Ms_5Hc_5h_5 + 2Ms_7Hc_7h_7 > (-Ms_4h_4 + 2Ms_5h_5 + 2Ms_7h_7)Hb - \sigma w_{35} + \sigma w_{79} \quad (548)$$

$$2Ms_7Hc_7h_7 > 2Ms_7h_7Hb - \sigma w_{57} + \sigma w_{79} \quad (549)$$

$$2Ms_9Hc_9h_9 > -2Ms_9h_9Hb + \sigma w_{79} \quad (54A)$$

If the temperature further falls down from this state, $\sigma w_{79}$ will abruptly increase, so that the relation of expression (54A) is reversed, and the magnetization of the ninth magnetic layer is reversed. That is, the TM spins of the ninth magnetic layer are aligned with those of the seventh magnetic layer (FIG. 25g). And the temperature falls down to the room temperature in this state. As a result, the TM spins of each magnetic layer are all aligned downward. Accordingly, the magnetized state of magnetic composite film at this time becomes a state A5 (FIG. 25d).

On the other hand, if the medium temperature is further raised from $Tc_6$ to more than $Tcomp_3$, with the heating, the third magnetic layer becomes dominant in iron family element sub-lattice magnetization, whereby the polarity is reversed. The relational expressions associated with the reversal of the magnetization are as follows (FIG. 25h).

$$2Ms_1Hc_1h_1 > 2Ms_1h_1Hb - \sigma w_{13} \qquad (550)$$

$$2Ms_1Hc_1h_1 + 2Ms_3Hc_3h_3 > (2Ms_1h_1 + 2Ms_3h_3 - Ms_4h_4)Hb - \sigma w_{35} \qquad (551)$$

$$2Ms_1Hc_1h_1 + 2Ms_3Hc_3h_3 + 2Ms_5Hc_5h_5 > 2(Ms_1h_1 + Ms_3h_3 - Ms_4h_4 + Ms_5h_5)Hb + \sigma w_{57} \qquad (552)$$

$$2Ms_3Hc_3h_3 > (2Ms_3h_3 - Ms_4h_4)Hb - \sigma w_{13} - \sigma w_{35} \qquad (553)$$

$$2Ms_3Hc_3h_3 + 2Ms_5Hc_5h_5 > 2(Ms_3h_3 - Ms_4h_4 + Ms_5h_5)Hb - \sigma w_{13} + \sigma w_{57} \qquad (554)$$

$$2Ms_5Hc_5h_5 > (2Ms_5h_5 - Ms_4h_4)Hb - \sigma w_{35} + \sigma w_{57} \qquad (555)$$

$$2Ms_7Hc_7h_7 > -2Ms_7h_7Hb + \sigma w_{57} - \sigma w_{79} \qquad (556)$$

$$2Ms_7Hc_7h_7 + 2Ms_9Hc_9h_9 > -2(Ms_7h_7 + Ms_9h_9)Hb + \sigma w_{57} \qquad (557)$$

$$2Ms_9Hc_9h_9 > -2Ms_9h_9Hb - \sigma w_{79} \qquad (558)$$

If the medium temperature is further raised to a temperature near $Tc_3$, the relation of expression (553) is reversed, so that the magnetization of the third magnetic layer is reversed. In a state after reversing the magnetization, the unalignment of spins exists between the first and third magnetic layers, between the third and fifth magnetic layers, and between the fifth and seventh magnetic layers, and the following expressions will stand (FIG. 25i). (However, the interface magnetic wall energy is not stored at any interface because in this temperature state, the temperature of magnetic layer interposed between each layer exceeds each Curie temperature.)

$$2Ms_1Hc_1h_1 > 2Ms_1h_1Hb + \sigma w_{13} \qquad (560)$$

$$2Ms_3Hc_3h_3 > (-2Ms_3h_3 + Ms_4h_4)Hb + \sigma w_{13} + \sigma w_{35} \qquad (561)$$

$$2Ms_5Hc_5h_5 > (2Ms_5h_5 - Ms_4h_4)Hb + \sigma w_{35} + \sigma w_{57} \qquad (562)$$

$$2Ms_7Hc_7h_7 > -2Ms_7h_7Hb + \sigma w_{57} - \sigma w_{79} \qquad (563)$$

$$2Ms_7Hc_7h_7 + 2Ms_9Hc_9h_9 > -2(Ms_7h_7 + Ms_9h_9)Hb + \sigma w_{57} \qquad (564)$$

$$2Ms_9Hc_9h_9 > -2Ms_9h_9Hb - \sigma w_{79} \qquad (565)$$

If the medium temperature falls down from this state, the relation of expression (562) is reversed with the increasing of $\sigma w_{35}$, the magnetization of the fifth magnetic layer is reversed so that the spins are aligned with those of the third magnetic layer. As a result, the unalignment of spins exists only between the first and third magnetic layers, and the following expressions will stand (FIG. 25j).

$$2Ms_1Hc_1h_1 > 2Ms_1h_1Hb + \sigma w_{13} \qquad (570)$$

$$2Ms_3Hc_3h_3 > (-2Ms_3h_3 + Ms_4h_4)Hb + \sigma 2_{13} - \sigma w_{35} \qquad (571)$$

$$2Ms_3Hc_3h_3 + 2Ms_5Hc_5h_5 > 2(-Ms_3h_3 + Ms_4h_4 - Ms_5h_5)Hb + \sigma w_{13} - \sigma w_{57} \qquad (572)$$

$$2Ms_3Hc_3h_3 + 2Ms_5Hc_5h_5 + 2Ms_7Hc_7h_7 > 2(-Ms_3h_3 + Ms_4h_4 - Ms_5h_5 - Ms_7h_7)Hb + \sigma w_{13} - \sigma w_{79} \qquad (573)$$

$$2Ms_3Hc_3h_3 + 2Ms_5Hc_5h_5 + 2Ms_7Hc_7h_7 + 2Ms_9Hc_9h_9 > 2(-Ms_3h_3 + Ms_4h_4 - Ms_5h_5 - Ms_7h_7 - Ms_9h_9)Hb + \sigma w_{13} \qquad (574)$$

$$2Ms_5Hc_5h_5 > (Ms_4h_4 - 2Ms_5h_5)Hb - \sigma w_{35} - \sigma w_{57} \qquad (575)$$

$$2Ms_5Hc_5h_5 + 2Ms_7Hc_7h_7 > (Ms_4h_4 - 2Ms_5h_5 - 2Ms_7h_7)Hb - \sigma w_{79} \qquad (576)$$

$$2Ms_5Hc_5h_5 + 2Ms_7Hc_7h_7 + 2Ms_9Hc_9h_9 > (Ms_4h_4 - 2Ms_5h_5 - 2Ms_7h_7)Hb - \sigma w_{35} \qquad (577)$$

$$2Ms_7Hc_7h_7 > -2Ms_7h_7Hb - \sigma w_{57} - \sigma w_{79} \qquad (578)$$

$$2Ms_7Hc_7h_7 + 2Ms_9Hc_9h_9 > -2(Ms_7h_7 - Ms_9h_9)Hb - \sigma w_{57} \qquad (579)$$

$$2Ms_9Hc_9h_9 > -2Ms_9h_9Hb - \sigma w_{79} \qquad (57A)$$

If the temperature further falls down below $Tcomp_3$, the magnetization of the third magnetic layer is reversed again, but the magnetized state will not change because the following expressions will stand (FIG. 25k).

$$2Ms_1Hc_1h_1 > 2Ms_1h_1Hb + \sigma w_{13} \qquad (580)$$

$$2Ms_3Hc_3h_3 > (2Ms_3h_3 + Ms_4h_4)Hb + \sigma w_{13} - \sigma w_{35} \qquad (581)$$

$$2Ms_3Hc_3h_3 + 2Ms_5Hc_5h_5 > 2(Ms_3h_3 + Ms_4h_4 - Ms_5h_5)Hb + \sigma w_{13} - \sigma w_{57} \qquad (582)$$

$$2Ms_3Hc_3h_3 + 2Ms_5Hc_5h_5 + 2Ms_7Hc_7h_7 > 2(Ms_3h_3 + Ms_4h_4 - Ms_5h_5 - Ms_7h_7)Hb + \sigma w_{13} - \sigma w_{79} \qquad (583)$$

$$2Ms_3Hc_3h_3 + 2Ms_5Hc_5h_5 + 2Ms_7Hc_7h_7 + 2Ms_9Hc_9h_9 2 > 2(Ms_3h_3 + Ms_4h_4 - Ms_5h_5 - Ms_7h_7 - Ms_9h_9)Hb + \sigma w_{13} \qquad (584)$$

$$2Ms_5Hc_5h_5 > (-2Ms_5h_5 + Ms_4h_4)Hb - \sigma w_{35} - \sigma w_{57} \qquad (585)$$

$$2Ms_5Hc_5h_5 + 2Ms_7Hc_7h_7 > (-2Ms_5h_5 + Ms_4h_4 - 2Ms_7h_7)Hb - \sigma w_{35} - \sigma w_{79} \qquad (586)$$

$$2Ms_5Hc_5h_5 + 2Ms_7Hc_7h_7 + 2Ms_9Hc_9h_9 > (-2Ms_5h_5 + Ms_4h_4 - 2Ms_7h_7 - 2Ms_9h_9)Hb - \sigma w_{35} \qquad (587)$$

$$2Ms_7Hc_7h_7 > -2Ms_7h_7Hb - \sigma w_{57} - \sigma w_{79} \qquad (588)$$

$$2Ms_7Hc_7h_7 + 2Ms_9Hc_9h_9 > -2(Ms_7h_7 + Ms_9h_9)Hb - \sigma w_{57} \qquad (589)$$

$$2Ms_9Hc_9h_9 > -2Ms_9h_9Hb - \sigma w_{79} \qquad (589A)$$

Below $Tc_6$, the fifth and seventh magnetic layers, and below $Tc_8$, the seventh and ninth magnetic layers are magnetically coupled, respectively, so that $\sigma w_{57}$ and $\sigma w_{79}$ increase, but the state is maintained as the spin orientation is aligned. If the temperature further falls down below $Tc_2$, the first and third magnetic layers are magnetically coupled, but as two layers have the spin orientation unaligned, the magnetic wall is formed at the interface. And $\sigma w_{13}$ increases while the medium temperature falls down to the room temperature, the relation of expression (581) is reversed, with the relation of other expressions being maintained, and the third magnetic layer is reversed. That is, the spins of the third magnetic layer are aligned with those of the first magnetic layer, and the fifth magnetic layer and following layers retain the previous magnetized states (FIG. 25l).

Consequently, the magnetized state of magnetic composite film at this time becomes a state B5 (FIG. 25b).

Next, the medium is heated from the state A5 (FIG. 25d) under the application of an upward external magnetic field Hb. In this case, even if the medium is heated up to $Tc_6$, no state change will occur, because the factor causing the state change is only the Zeeman energy with the external magnetic field, and the coercive force of each layer in this range of temperature is greater than Hb (FIG. 25m). If the temperature may fall down from this state, the spins are all aligned, without change of the spin direction. Accordingly, the magnetized state of magnetic composite film at this time becomes a state A5 (FIG. 25d).

On the other hand, if the medium is further heated beyond $Tcomp_3$ (FIG. 25n) up to about $Tc_3$, the magnetization of the third magnetic layer is reversed in the same way as previously described (FIG. 25o), and in a subsequent cooling process, the fifth, seventh and ninth magnetic layers are magnetically coupled in sequence, the spins being oriented and aligned with those of the third magnetic layer (FIGS. 25p to 25s). Finally, the third magnetic layer is coupled to the first magnetic layer, and the magnetization is reversed so that the spins may be aligned with those of the first magnetic layer, in which eventually the magnetized state of magnetic composite film at this time becomes a state B5 (FIG. 25b), as will be explained in the same way as previously described.

From the above explanation, it can be understood that the conditions which are features of the present invention are satisfied. Note that the coercive force energy for the second, sixth and eighth magnetic layers, and the Zeeman energy were ignored in the above explanation. Also, the coercive force energy for the fourth magnetic layer was ignored, but as the Zeeman energy could not be ignored, it was taken into consideration based on the following assumption. That is, it was thought that when the unalignment of spins might exist between the third and fifth magnetic layers, the spin transition region would be formed over the direction of film thickness for the fourth magnetic layer, assuming that the Zeeman energy did not contribute because the magnetization of the fourth magnetic layer canceled each other within the layer.

The magneto-optical disk of this example 14 was mounted on a magneto-optical disk drive with an optical head having a wavelength of 780 nm and NA=0.53, and rotated at a rotation number of 3600 rpm to make the measurement at a position over a radius of 24 mm.

Figure 26:
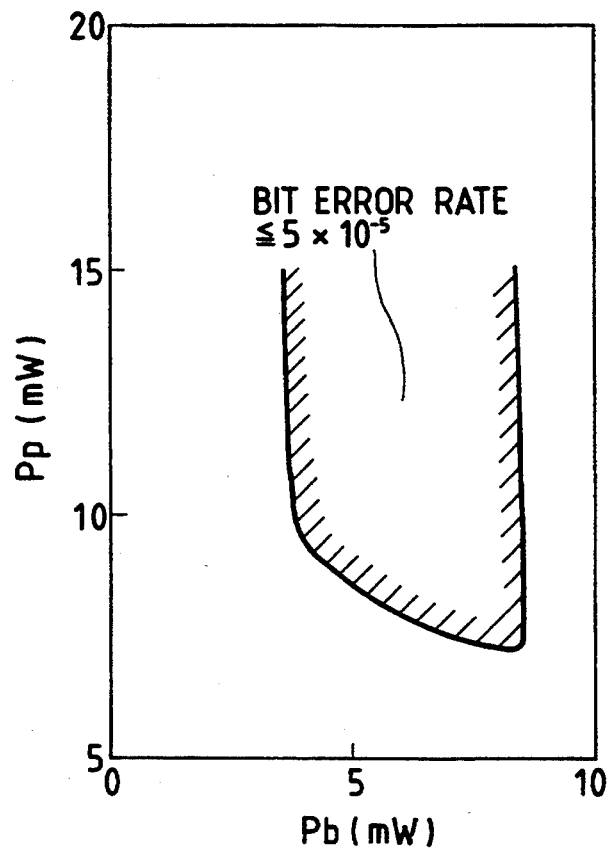
FIG. 26 is a graphical representation showing a recording power region having a bit error rate of $5 \times 10^{-5}$ or less in the magneto-optical recording medium as illustrated in FIG. 22.
Figure 27:
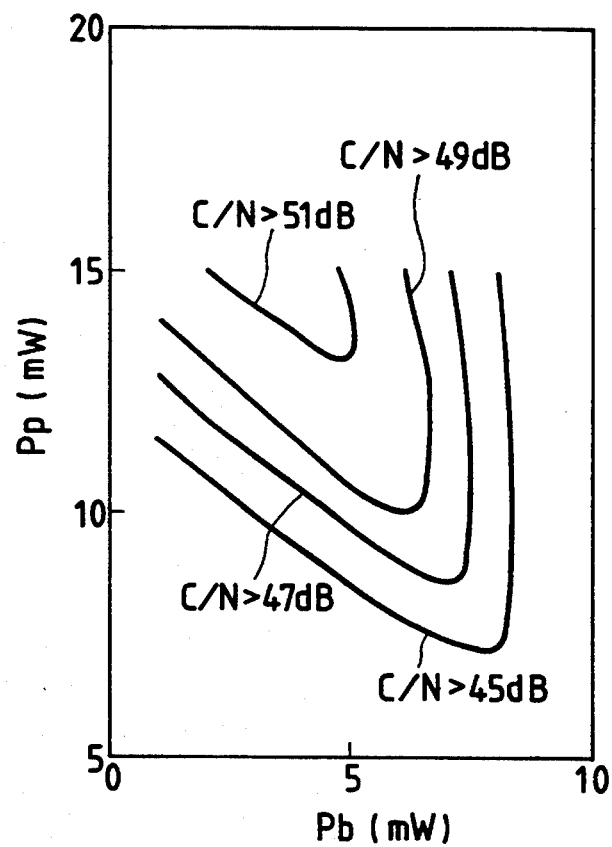
FIG. 27 is a graphical representation showing the relation between the C/N and the recording power in the magneto-optical recording medium as illustrated in FIG. 22.

An external magnetic field of about 7 kOe is applied beforehand, and the first magnetic layer is magnetized in one direction over the whole surface of the disk. Using this disk, the recording was performed by pulse modulating a laser beam for recording at two values of a bottom power (Pb) and a peak power (Pp) under the application of a bias magnetic field for reading of 200 Oe in an opposite direction to the magnetization, and then read out at a reproducing power of 1.0 mW. The (2.7) modulation recording was performed at a channel rate of 17.4 MHz, with the pulse width fixed at 57 nsec, and the bit error rate at this time was measured. When the above recording was performed by modulating to the bottom power and the peak power, respectively, after the disk was placed in a whole surface recording enable state, the recording power region where the bit error rate is below $5 \times 10^{-5}$ is shown in FIG. 26 with the slanting line. In this region, the excellent overwriting characteristics have been obtained. Furthermore, after the disk has been completely erased, the relation between the C/N and the recording power in recording the 3T pattern is shown in FIG. 27.

Next, the degradation of reproducing signal after reproductions with $10^4$ times repeatedly performed on one recorded track by modulating the reproducing power was examined by the comparison with the signals reproduced at a reproducing power of 1.0 mW before and after the repetitive reproductions. As a result, the reproducing degradation did not occur up to 3.2 mW.

For the magneto-optical disks in the examples 15 to 19, it will be understood that the conditions which are features of the present invention are satisfied.

EXAMPLE 15

A magneto-optical disk was fabricated in the exactly same constitution and fabricating method as in example 10, except for the constitution of magnetic layer as shown in Table 16. In the constitution of magnetic layer in this disk, the (2m)-th magnetic layer was an in-plane magnetized film of ferromagnetism, but as the (2m+1)-th magnetic layer had a large vertical magnetic anisotropy, the excellent formation and retention of magnetic domains were allowed. Also, the magnetic optical effects were improved for the short wavelength because of the use of light rare earth elements in the magnetic layer on the reading side. Further, in this disk, the Curie temperature of the (2m)-th magnetic layer and that of the 2(m+1)-th magnetic layer were equal when m was equal to or more than 3. However, as a slight amount of temperature gradient occurs in the direction of film thickness of magnetic layer under the application of the laser beam, even in this case, the recording process of the present invention will be realized.

EXAMPLE 16

A magneto-optical disk was fabricated in the exactly same constitution and fabricating method as in example 10, except for the constitution of magnetic layer as shown in Table 17. In the constitution of magnetic layer in this disk, the (2m)-th magnetic layer was an in-plane magnetized film as in example 15. Further on the seventh magnetic layer, one more magnetic layer was laminated, with the exchange coupling, in order to improve the magnetical optical effects in the short wavelength. Also, the fourth magnetic layer was substantially omitted, and the interface magnetic wall energy was adjusted by rising the sputtering Ar gas pressure from normal 0.3 Pa to 3.0 Pa, in forming the film on a portion of about 10 nm around the interface between the third magnetic layer and the fifth magnetic layer.

EXAMPLE 17

A magneto-optical disk was fabricated in the exactly same constitution and fabricating method as in example 10, except for the constitution of magnetic layer as shown in Table 18. In the constitution of magnetic layer in this disk, the fourth magnetic layer itself was constituted as a composite film having three layers consisting of the forty first, forty second and forty third magnetic layers in sequence. This medium was passed through a process in which the magnetization of the third and fifth magnetic layers would disappear with the heating up to a temperature near $Tc_3$, while at the same time the magnetization of each layer in the fourth magnetic layer is reversed and transferred onto the third and fifth magnetic layers. At a temperature near $Tc_3$, each layer of the fourth magnetic layer has a sufficient large magnetization, and is constituted of a material having a small coercive force, whereby the magnetization of the fourth magnetic layer can be reversed with its own demagnetizing field. Therefore, the bias magnetic field for the recording is unnecessary.

As shown in this example, the medium in which other magnetic layers are laminated before and after the magnetic composite layer of the present invention, or one layer within the magnetic composite film of the present invention is fabricated as a composite film is also included within the present invention.

EXAMPLE 18

A magneto-optical disk was fabricated in the exactly same constitution and fabricating method as in example 10, except for the constitution of magnetic layer as shown in Table 19. In the constitution of magnetic layer in this disk, the (2m+1)-th magnetic layer was a periodic structure film having Pt 2 nm and Co 0.5 nm laminated alternately, and the (2m)-th magnetic layer was TbFeCo, thereby carrying the periodic structure film. The Pt/Co periodic structure was formed in four cycles as the ninth magnetic layer respectively, and in two cycles as the seventh and fifth magnetic layer respectively.

were laminated in sequence, Al thermal diffusion layer of 60 nm was formed via a silicon nitride layer of 30 nm in order to improve the thermal characteristics. The magneto-optical disk was fabricated in the exactly same constitution and fabricating method as in example 1, except for the above-mentioned portion.

As above described in detail, the magnetooptical recording medium in the third example of the present invention has an over-write function with the light modulation, in a higher sensitivity and a higher quality of reproducing signal than the conventional medium having the same feature, and has an effect of improving the preserving ability of the information, particularly, the regenerative durability, whereby the laser power margin at the regeneration of record can be extended.

The present invention allows for various applications other than previous examples, and is not limited to a constitution where the interface of each magnetic layer is steep and clear, but can be also realized with a constitution where the material and composition are gradually changed in the direction of film thickness. Furthermore, the magneto-optical recording medium of the present invention does not need any external magnetic field in recording, and the recording may be made using the demagnetizing field energy or Bloch magnetic wall energy, for example. The present invention will cover all such applications as long as they do not depart from the scope of the claims.

TABLE 1

|  | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 7th M.L. (Magnetic Layer) | $Tb_{0.21}(Fe_{0.70}Co_{0.30})_{0.79}$ | 180 | 15 | 270 | −100 | $2.0 \times 10^6$ |
| 6th M.L. (Magnetic Layer) | $Tb_{0.26}(Fe_{0.96}Co_{0.04})_{0.74}$ | 10 | 19 | 140 | +55 | |
| 5th M.L. (Magnetic Layer) | $Tb_{0.205}(Fe_{0.70}Co_{0.30})_{0.795}$ | 140 | 12.5 | 270 | −120 | $2.0 \times 10^6$ |
| 4th M.L. (Magnetic Layer) | $Tb_{0.26}(Fe_{0.94}Co_{0.06})_{0.74}$ | 10 | 19 | 150 | +50 | |
| 3rd M.L. (Magnetic Layer) | $Tb_{0.20}(Fe_{0.70}Co_{0.30})_{0.80}$ | 100 | 10.7 | 270 | −140 | $2.0 \times 10^6$ |
| 2nd M.L. (Magnetic Layer) | $Tb_{0.26}(Fe_{0.92}Co_{0.08})_{0.74}$ | 10 | 20 | 160 | +50 | |
| 1st M.L. (Magnetic Layer) | $Tb_{0.21}(Fe_{0.90}Co_{0.10})_{0.79}$ | 350 | 12 | 170 | −100 | |

EXAMPLE 19

The magnetic layer was constituted as shown in Table 20, and after the ninth to first magnetic layers

TABLE 2

|  | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 7th M.L. (Magnetic Layer) | $Gd_{0.22}(Fe_{0.70}Co_{0.30})_{0.78}$ | 180 | 0.5 | >300 | −50 | $4.0 \times 10^5$ |
| 6th M.L. (Magnetic Layer) | $Tb_{0.26}(Fe_{0.96}Co_{0.04})_{0.74}$ | 10 | 19 | 140 | +50 | |
| 5th M.L. (Magnetic Layer) | $Gd_{0.22}(Fe_{0.70}Co_{0.30})_{0.78}$ | 140 | 0.5 | >300 | −50 | $4.0 \times 10^5$ |
| 4th M.L. (Magnetic Layer) | $Tb_{0.26}(Fe_{0.94}Co_{0.06})_{0.74}$ | 10 | 19 | 150 | +50 | |
| 3rd M.L. (Magnetic Layer) | $Gd_{0.22}(Fe_{0.70}Co_{0.80})_{0.78}$ | 100 | 0.5 | >300 | −50 | $4.0 \times 10^5$ |
| 2nd M.L. (Magnetic Layer) | $Tb_{0.26}(Fe_{0.92}Co_{0.08})_{0.74}$ | 10 | 20 | 160 | +50 | |
| 1st M.L. (Magnetic Layer) | $Tb_{0.21}(Fe_{0.90}Co_{0.10})_{0.79}$ | 350 | 12 | 170 | −100 | |

TABLE 3

| | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 5th M.L. (Magnetic Layer) | $Dy_{0.21}(Fe_{0.68}Co_{0.30}Cr_{0.02})_{0.79}$ | 200 | 12 | 210 | −100 | $1.0 \times 10^6$ |
| 4th M.L. (Magnetic Layer) | $Dy_{0.21}(Fe_{0.42}Co_{0.30}Cr_{0.28})_{0.79}$ | 20 | 10 | 80 | −100 | |
| 3rd M.L. (Magnetic Layer) | $Dy_{0.26}(Fe_{0.68}Co_{0.30}Cr_{0.02})_{0.79}$ | 150 | 20 | 200 | +50 | $1.0 \times 10^6$ |
| 2nd M.L. (Magnetic Layer) | $Dy_{0.26}(Fe_{0.54}Co_{0.30}Cr_{0.16})_{0.74}$ | 30 | 15 | 140 | +50 | |
| 1st M.L. (Magnetic Layer) | $Dy_{0.23}(Fe_{0.80}Co_{0.18}Cr_{0.02})_{0.77}$ | 400 | 16 | 150 | −50 | |

TABLE 4

| | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 9th M.L. (Magnetic Layer) | $(Gd_{0.20}Tb_{0.80})_{0.19}(Fe_{0.88}Co_{0.12})_{0.81}$ | 100 | 9 | 200 | −200 | $1.7 \times 10^6$ |
| 8th M.L. (Magnetic Layer) | $(Dy_{0.30}(Fe_{0.88}Co_{0.12})_{0.70}$ | 50 | 6 | 130 | +200 | |
| 7th M.L. (Magnetic Layer) | $(Gd_{0.50}Tb_{0.50})_{0.19}(Fe_{0.88}Co_{0.12})_{0.81}$ | 100 | 7 | 230 | −200 | $1.2 \times 10^6$ |
| 6th M.L. (Magnetic Layer) | $(Tb_{0.20}Dy_{0.80})_{0.30}(Fe_{0.88}Co_{0.12})_{0.70}$ | 50 | 8 | 140 | +200 | |
| 5th M.L. (Magnetic Layer) | $(Gd_{0.70}Tb_{0.30})_{0.19}(Fe_{0.88}Co_{0.12})_{0.81}$ | 100 | 5 | 250 | −200 | $9.0 \times 10^5$ |
| 4th M.L. (Magnetic Layer) | $(Tb_{0.40}Dy_{0.60})_{0.30}(Fe_{0.88}Co_{0.12})_{0.70}$ | 50 | 9 | 150 | +200 | |
| 3rd M.L. (Magnetic Layer) | $(Gd_{0.80}Tb_{0.20})_{0.19}(Fe_{0.88}Co_{0.12})_{0.81}$ | 100 | 5 | 260 | −200 | $7.2 \times 10^5$ |
| 2nd M.L. (Magnetic Layer) | $(Tb_{0.60}Dy_{0.40})_{0.30}(Fe_{0.88}Co_{0.12})_{0.70}$ | 50 | 10 | 160 | +200 | |
| 1st M.L. (Magnetic Layer) | $Tb_{0.23}(Fe_{0.88}Co_{0.12})_{0.77}$ | 200 | 20 | 180 | −50 | |

TABLE 5

| | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 7th M.L. (Magnetic Layer) | $Tb_{0.26}(Fe_{0.74}Co_{0.26})_{0.74}$ | 150 | 20 | 270 | +50 | $2.0 \times 10^6$ |
| 6th M.L. (Magnetic Layer) | $Tb_{0.26}(Fe_{0.92}Co_{0.08})_{0.74}$ | 20 | 20 | 160 | +50 | |
| 5th M.L. (Magnetic Layer) | $Tb_{0.26}(Fe_{0.74}Co_{0.26})_{0.74}$ | 150 | 20 | 270 | +50 | $2.0 \times 10^6$ |
| 4th M.L. (Magnetic Layer) | $Tb_{0.26}(Fe_{0.92}Co_{0.08})_{0.74}$ | 20 | 20 | 160 | +50 | |
| 3rd M.L. (Magnetic Layer) | $Tb_{0.18}(Fe_{0.70}Co_{0.30})_{0.82}$ | 100 | 2 | 300 | −250 | $1.5 \times 10^6$ |
| 2nd M.L. (Magnetic Layer) | — | | 0 | (170) | — | |
| 1st M.L. (Magnetic Layer) | $Tb_{0.27}(Fe_{0.90}Co_{0.10})_{0.73}$ | 300 | 12 | 170 | +10 | |

TABLE 6

| | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 7th M.L. (Magnetic Layer) | $(Nd_{0.05}Tb_{0.95})_{0.27}(Fe_{0.65}Co_{0.35})_{0.73}$ | 100 | 15 | 300 | +40 | $1.5 \times 10^6$ |
| 6th M.L. (Magnetic Layer) | $Nd_{0.30}(Fe_{0.90}Co_{0.10})_{0.70}$ | 50 | — | 140 | −700 | In-Plane Magnetization Film |
| 5th M.L. | $(Nd_{0.05}Tb_{0.95})_{0.27}(Fe_{0.85}Co_{0.15})_{0.73}$ | 100 | 14 | 200 | +50 | $1.4 \times 10^6$ |

TABLE 6-continued

|  | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| (Magnetic Layer) 4th M.L. (Magnetic Layer) | $Nd_{0.30}(Fe_{0.88}Co_{0.12})_{0.70}$ | 50 | — | 150 | −700 | In-Plane Magnetization Film |
| 3rd M.L. (Magnetic Layer) | $(Nd_{0.05}Tb_{0.95})_{0.27}(Fe_{0.89}Co_{0.11})_{0.73}$ | 100 | 14 | 180 | +50 | $1.4 \times 10^6$ |
| 2nd M.L. (Magnetic Layer) | $Nd_{0.30}(Fe_{0.86}Co_{0.14})_{0.70}$ | 50 | — | 160 | −700 | In-Plane Magnetization Film |
| 1st M.L (Magnetic Layer) | $Tb_{0.27}(Fe_{0.90}Co_{0.10})_{0.73}$ | 350 | 12 | 170 | +100 |  |

TABLE 7

|  | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| Additional M.L. (Magnetic Layer) | $(Nd_{0.35}Gd_{0.65})_{0.35}(Fe_{0.70}Co_{0.30})_{0.65}$ | 50 | — | 300 | −100 | In-Plane Magnetization Film |
| 5th M.L. (Magnetic Layer) | $Tb_{0.21}(Fe_{0.70}Co_{0.30})_{0.79}$ | 100 | 15 | 270 | −100 | $2.0 \times 10^6$ |
| 4th M.L. (Magnetic Layer) | $(Nd_{0.35}Gd_{0.65})_{0.35}(Fe_{0.98}Co_{0.02})_{0.65}$ | 100 | — | 160 | −100 | In-Plane Magnetization Film |
| 3rd M.L. (Magnetic Layer) | $Tb_{0.21}(Fe_{0.70}Co_{0.30})_{0.79}$ | 100 | 15 | 270 | −100 | $2.0 \times 10^6$ |
| 2nd M.L. (Magnetic Layer) | $(Nd_{0.35}Gd_{0.65})_{0.35}(Fe_{0.96}Co_{0.04})_{0.65}$ | 100 | — | 170 | −100 | In-Plane Magnetization Film |
| 1st M.L. (Magnetic Layer) | $Tb_{0.27}(Fe_{0.88}Co_{0.12})_{0.73}$ | 350 | 12 | 180 | +100 |  |

TABLE 8

|  | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 5th M.L. (Magnetic Layer) | $Tb_{0.21}(Fe_{0.70}Co_{0.30})_{0.79}$ | 60 | 15 | 270 | −100 | $2.0 \times 10^6$ |
| 4th M.L. (Magnetic Layer) | $Tb_{0.26}(Fe_{0.92}Co_{0.08})_{0.74}$ | 10 | 19 | 160 | +50 |  |
| 3rd M.L. (Magnetic Layer) | $Tb_{0.21}(Fe_{0.70}Co_{0.30})_{0.79}$ | 40 | 15 | 270 | −100 | $2.0 \times 10^6$ |
| 2nd M.L. (Magnetic Layer) | $Tb_{0.26}(Fe_{0.91}Co_{0.09})_{0.74}$ | 10 | 20 | 165 | +50 |  |
| 1st M.L. (Magnetic Layer) | $Tb_{0.26}(Fe_{0.90}Co_{0.10})_{0.74}$ | 80 | 20 | 170 | +50 |  |

TABLE 9

|  | Composition | Film Thickness h (Å) | Coercive Force Hc (kOe) | Curie Temp. Tc (°C.) | Saturated Magnetization Ms (emu/cm$^3$) | Vertical Magnetic Anisotropy Constant Ku (erg/cm$^3$) |
|---|---|---|---|---|---|---|
| 5th M.L. (Magnetic Layer) | $Tb_{0.21}(Fe_{0.70}Co_{0.30})_{0.79}$ | 70 | 15 | 270 | −100 | $2.0 \times 10^6$ |
| 4th M.L. (Magnetic Layer) | $Tb_{0.26}(Fe_{0.93}Co_{0.07})_{0.74}$ | 10 | 19 | 155 | +50 |  |
| 3rd M.L. (Magnetic Layer) | $Tb_{0.21}(Fe_{0.70}Co_{0.30})_{0.79}$ | 30 | 15 | 270 | −100 | $2.0 \times 10^6$ |
| 2nd M.L. (Magnetic Layer) | $Tb_{0.26}(Fe_{0.91}Co_{0.09})_{0.74}$ | 10 | 20 | 165 | +50 |  |
| 1st M.L. (Magnetic Layer) | $Tb_{0.26}(Fe_{0.90}Co_{0.10})_{0.74}$ | 60 | 20 | 170 | +50 |  |
| 2'nd M.L. (Magnetic Layer) | $Tb_{0.26}(Fe_{0.92}Co_{0.08})_{0.74}$ | 10 | 20 | 160 | +50 |  |

TABLE 9-continued

|  | Composition | Film Thickness h (Å) | Coercive Force Hc (kOe) | Curie Temp. Tc (°C.) | Saturated Magnetization Ms (emu/cm³) | Vertical Magnetic Anisotropy Constant Ku (erg/cm³) |
|---|---|---|---|---|---|---|
| 3'rd M.L. (Magnetic Layer) | $Tb_{0.21}(Fe_{0.70}Co_{0.30})_{0.79}$ | 50 | 15 | 270 | −100 | $2.0 \times 10^6$ |

TABLE 10

|  | Composition | Film Thickness h (Å) | Coercive Force Hc (kOe) | Curie Temp. Tc (°C.) | Saturated Magnetization Ms (emu/cm³) | Vertical Magnetic Anisotropy Constant Ku (erg/cm³) |
|---|---|---|---|---|---|---|
| 1st M.L. (Magnetic Layer) | $Tb_{0.21}(Fe_{0.90}Co_{0.10})_{0.79}$ | 50 | 15 | 170 | −100 | |
| 2nd M.L. (Magnetic Layer) | $Tb_{0.21}(Fe_{0.92}Co_{0.08})_{0.79}$ | 10 | 14 | 160 | −100 | |
| 3rd M.L. (Magnetic Layer) | $Tb_{0.21}(Fe_{0.70}Co_{0.30})_{0.79}$ | 100 | 15 | 270 | −100 | $2.0 \times 10^6$ |
| 2'nd M.L. (Magnetic Layer) | $Tb_{0.21}(Fe_{0.92}Co_{0.08})_{0.79}$ | 10 | 14 | 160 | −100 | |
| 1'st M.L. (Magnetic Layer) | $Tb_{0.21}(Fe_{0.90}Co_{0.10})_{0.79}$ | 50 | 15 | 170 | −100 | |

TABLE 11

|  | Composition | Film Thickness h (nm) | Curie Temp. Tc (°C.) |
|---|---|---|---|
| 3rd M.L. (Magnetic Layer) | $(Tb_{70}Gd_{30})_{20}(Fe_{90}Co_{10})_{80}$ | 150 | 220 |
| 4th M.L. (Magnetic Layer) | — | 0 | (220) |
| 5th M.L. (Magnetic Layer) | $Tb_{20}(Fe_{85}Co_{15})_{80}$ | 10 | 220 |
| 6th M.L. (Magnetic Layer) | $Tb_{20}(Fe_{96.7}Co_{3.3})_{80}$ | 5 | 150 |
| 7th M.L. (Magnetic Layer) | $Tb_{20}(Fe_{85}Co_{15})_{80}$ | 20 | 220 |

TABLE 12

|  | Composition | Film Thickness h (nm) | Curie Temp. Tc (°C.) |
|---|---|---|---|
| 3rd M.L. (Magnetic Layer) | $(Dy_{90}Gd_{10})_{25}(Fe_{76.7}Co_{23.3})_{74}$ | 100 | 200 |
| 4th M.L. (Magnetic Layer) | — | 0 | (210) |
| 5th M.L. (Magnetic Layer) | $Dy_{18}(Fe_{79.2}Co_{20.8})_{82}$ | 10 | 210 |
| 6th M.L. (Magnetic Layer) | $Dy_{18}(Fe_{90.8}Co_{9.2})_{82}$ | 2 | 140 |
| 7th M.L. (Magnetic Layer) | $Dy_{18}(Fe_{74.2}Co_{25.8})_{82}$ | 10 | 240 |
| 8th M.L. (Magnetic Layer) | $Dy_{18}(Fe_{94.2}Co_{5.8})_{82}$ | 2 | 120 |
| 9th M.L. (Magnetic Layer) | $Dy_{18}(Fe_{69.2}Co_{30.8})_{82}$ | 15 | 270 |

TABLE 13

|  | Composition | Film Thickness h (nm) | Curie Temp. Tc (°C.) |
|---|---|---|---|
| 3rd M.L. (Magnetic Layer) | $Dy_{18}(Fe_{70.8}Co_{29.2})_{82}$ | 40 | 260 |
| 4th M.L. (Magnetic Layer) | $(Gd_{70}HO_{30})_{35}(Fe_{70}Co_{30})_{65}$ | 10 | 200 |
| 5th M.L. (Magnetic Layer) | $Tb_{18}(Fe_{79.2}Co_{20.8})_{82}$ | 10 | 260 |
| 6th M.L. (Magnetic Layer) | $Tb_{26}(Fe_{92.5}Co_{7.5})_{74}$ | 5 | 160 |
| 7th M.L. (Magnetic Layer) | $Tb_{18}(Fe_{79.2}Co_{20.8})_{82}$ | 20 | 260 |

TABLE 14

|  | Composition | Film Thickness h (nm) | Curie Temp. Tc (°C.) |
|---|---|---|---|
| 1st Additional M.L. (Magnetic Layer) | $Tb_{18}Co_{82}$ | 30 | >300 |
| 2nd Additional M.L. (Magnetic Layer) | $Tb_{18}Co_{82}$ | 5 | 135 |
| 3rd M.L. (Magnetic Layer) | $(Dy_{90}Gd_{10})_{26}(Fe_{76.7}Co_{23.3})_{74}$ | 100 | 220 |
| 4th M.L. (Magnetic Layer) | — | 0 | (210) |
| 5th M.L. (Magnetic Layer) | $Dy_{18}(Fe_{79.2}Co_{20.8})_{82}$ | 10 | 210 |
| 6th M.L. (Magnetic Layer) | $Dy_{18}(Fe_{90.8}Co_{9.2})_{82}$ | 2 | 140 |
| 7th M.L. (Magnetic Layer) | $Dy_{18}(Fe_{74.2}Co_{25.8})_{82}$ | 10 | 240 |
| 8th M.L. (Magnetic Layer) | $Dy_{18}(Fe_{94.2}Co_{5.8})_{82}$ | 2 | 120 |
| 9th M.L. (Magnetic Layer) | $Dy_{18}(Fe_{69.2}Co_{30.8})_{82}$ | 15 | 270 |

TABLE 15

|  | Composition | Film Thickness h (nm) | Curie Temp. Tc (°C.) |
|---|---|---|---|
| 1st M.L. (Magnetic Layer) | $Tb_{17}(Co_{97.5}Cr_{2.5})_{83}$ | 30 | >300 |
| 2nd M.L. (Magnetic Layer) | $Tb_{17}(Fe_{97.5}Cr_{2.4})_{83}$ | 3 | 123 |
| 3rd M.L. (Magnetic Layer) | $Tb_{26}(Fe_{77.5}Co_{20}Cr_{2.5})_{74}$ | 18 | 220 |
| 4th M.L. (Magnetic Layer) | $Gd_{34}(Fe_{67.5}Co_{30}Cr_{2.5})_{66}$ | 20 | 200 |
| 5th M.L. (Magnetic Layer) | $Tb_{21}(Fe_{76.2}Co_{21.3}Cr_{2.5})_{79}$ | 5 | 240 |
| 6th M.L. (Magnetic Layer) | $Tb_{21}(Fe_{89.6}Co_{7.9}Cr_{2.5})_{79}$ | 3 | 160 |
| 7th M.L. (Magnetic Layer) | $Tb_{21}(Fe_{72.9}Co_{24.6}Cr_{2.5})_{79}$ | 10 | 260 |
| 8th M.L. (Magnetic Layer) | $Tb_{21}(Fe_{91.2}Co_{6.3}Cr_{2.5})_{79}$ | 3 | 150 |
| 9th M.L. (Magnetic Layer) | $Tb_{21}(Fe_{72.9}Co_{24.6}Cr_{2.5})_{79}$ | 15 | 260 |

TABLE 16

|  | Composition | Film Thickness h (nm) | Curie Temp. Tc (°C.) |
|---|---|---|---|
| 1st M.L. (Magnetic Layer) | $Tb_{20}(Fe_{65}Co_{35})_{80}$ | 20 | >300 |
| 2nd M.L. (Magnetic Layer) | $Tb_{26}(Fe_{98}Co_2)_{74}$ | 2 | 127 |
| 3rd M.L. (Magnetic Layer) | $Tb_{20}(Fe_{90}Co_{10})_{80}$ | 18 | 190 |
| 4th M.L. (Magnetic Layer) | $Gd_{35}Co_{60}Ti_5$ | 10 | 190 |
| 5th M.L. (Magnetic Layer) |  |  |  |
| 7th M.L. (Magnetic Layer) |  |  |  |
| 9th M.L. (Magnetic Layer) |  |  |  |
| 11th M.L. (Magnetic Layer) | $Tb_{20}(Fe_{90}Co_{10})_{80}$ | 2 | 190 |
| 13th M.L. (Magnetic Layer) |  |  |  |
| 15th M.L. (Magnetic Layer) |  |  |  |
| 17th M.L. (Magnetic Layer) |  |  |  |
| 19th M.L. (Magnetic Layer) |  |  |  |
| 6th M.L. (Magnetic Layer) |  |  |  |
| 7th M.L. (Magnetic Layer) |  |  |  |
| 10th M.L. (Magnetic Layer) |  |  |  |
| 12th M.L. (Magnetic Layer) | $Nd_{30}(Fe_{88}Co_{12})_{70}$ | 2 | 155 |
| 14th M.L. (Magnetic Layer) |  |  |  |
| 16th M.L. (Magnetic Layer) |  |  |  |
| 18th M.L. (Magnetic Layer) |  |  |  |

TABLE 17

|  | Composition | Film Thickness h (nm) | Curie Temp. Tc (°C.) |
|---|---|---|---|
| 1st M.L. (Magnetic Layer) | $(Tb_{50}Dy_{50})_{26}(Fe_{65}Co_{35})_{74}$ | 20 | 300 |
| 2nd M.L. (Magnetic Layer) | $(Tb_{50}Dy_{50})_{26}(Fe_{98}Co_2)_{74}$ | 7 | 100 |
| 3rd M.L. (Magnetic Layer) | $(Tb_{50}Dy_{50})_{26}(Fe_{75}Co_{25})_{74}$ | 20 | 240 |
| 4th M.L. (Magnetic Layer) | — | 0 | (240) |
| 5th M.L. (Magnetic Layer) | $(Tb_{50}Dy_{50})_{26}(Fe_{75}Co_{25})_{74}$ | 10 | 240 |
| 6th M.L. (Magnetic Layer) | $(Nd_{35}Gd_{65})_{35}(Fe_{98}Co_2)_{65}$ | 10 | 160 |
| 7th M.L. (Magnetic Layer) | $(Tb_{50}Dy_{50})_{26}(Fe_{75}Co_{25})_{74}$ | 10 | 240 |
| Additional M.L. (Magnetic Layer) | $(Nd_{35}Gd_{65})_{35}(Fe_{70}Co_{30})_{65}$ | 10 | >300 |

TABLE 18

|  | Composition | Film Thickness h (nm) | Curie Temp. Tc (°C.) |
|---|---|---|---|
| 1st M.L. (Magnetic Layer) | $Tb_{20}(Co_{98}Al_2)_{80}$ | 40 | >300 |
| 2nd M.L. (Magnetic Layer) | $Tb_{26}(Fe_{90}Co_8Al_2)_{74}$ | 10 | 150 |
| 3rd M.L. (Magnetic Layer) | $Tb_{27}(Fe_{78}Co_{20}Al_2)_{73}$ | 30 | 220 |
| 4th M.L. (Magnetic Layer) |  |  |  |
| 41st M.L. (Magnetic Layer) | $Gd_{15}(Fe_{68}Co_{30}Al_2)_{85}$ | 10 | >300 |
| 42nd M.L. (Magnetic Layer) | $Gd_{36}(Co_{98}Al_2)_{64}$ | 5 | 260 |
| 43rd M.L. (Magnetic Layer) | $Gd_{15}(Fe_{68}Co_{30}Al_2)_{85}$ | 10 | >300 |
| 5th M.L. (Magnetic Layer) | $Tb_{27}(Fe_{78}Co_{20}Al_2)_{73}$ | 10 | 220 |
| 6th M.L. (Magnetic Layer) | $Tb_{24}(Fe_{93}Co_5Al_2)_{76}$ | 5 | 160 |
| 7th M.L. (Magnetic Layer) | $Tb_{24}(Fe_{66}Co_{32}Al_2)_{76}$ | 10 | 300 |
| 8th M.L. (Magnetic Layer) | $Tb_{24}(Fe_{91}Co_7Al_2)_{76}$ | 2 | 150 |
| 9th M.L. (Magnetic Layer) | $Tb_{24}(Fe_{66}Co_{32}Al_2)_{76}$ | 10 | 300 |

TABLE 19

|  | Composition | Film Thickness h (nm) | Curie Temp. Tc (°C.) |
|---|---|---|---|
| 1st M.L. (Magnetic Layer) | $Tb_{17}Co_{83}$ | 20 | >300 |
| 2nd M.L. (Magnetic Layer) | $Tb_{26}Co_{74}$ | 5 | 120 |
| 3rd M.L. (Magnetic Layer) | $Tb_{18}(Fe_{92.5}Co_{7.5})_{82}$ | 20 | 180 |
| 4th M.L. (Magnetic Layer) | $Gd_{40}Co_{60}$ | 5 | 170 |

TABLE 19-continued

| | Composition | Film Thickness h (nm) | Curie Temp. Tc (°C.) |
|---|---|---|---|
| 5th M.L. (Magnetic Layer) | | | |
| 51st M.L. (Magnetic Layer) | Co | 0.5 | |
| 52nd M.L. (Magnetic Layer) | Pt | 2 | |
| 53rd M.L. (Magnetic Layer) | Co | 0.5 | 300 |
| 54th M.L. (Magnetic Layer) | Pt | 2 | |
| 55th M.L. (Magnetic Layer) | Co | 0.5 | |
| 6th M.L. (Magnetic Layer) | $Tb_{28}(Fe_{90}Co_{10})_{72}$ | 5 | 170 |
| 7th M.L. (Magnetic Layer) | | | |
| 71st M.L. (Magnetic Layer) | Co | 0.5 | |
| 72nd M.L. (Magnetic Layer) | Pt | 2 | |
| 73rd M.L. (Magnetic Layer) | Co | 0.5 | 300 |
| 74th M.L. (Magnetic Layer) | Pt | 2 | |
| 75th M.L. (Magnetic Layer) | Co | 0.5 | |
| 8th M.L. (Magnetic Layer) | $Tb_{28}(Fe_{92}Co_8)_{72}$ | 8 | 158 |
| 9th M.L. (Magnetic Layer) | | | |
| 91st M.L. (Magnetic Layer) | Co | 0.5 | |
| 92nd M.L. (Magnetic Layer) | Pt | 2 | |
| 93rd M.L. (Magnetic Layer) | Co | 0.5 | |
| 94th M.L. (Magnetic Layer) | Pt | 2 | 300 |
| 95th M.L. (Magnetic Layer) | Co | 0.5 | |
| 96th M.L. (Magnetic Layer) | Pt | 2 | |
| 97th M.L. (Magnetic Layer) | Co | 0.5 | |

TABLE 20

| | Composition | Film Thickness h (nm) | Curie Temp. Tc (°C.) |
|---|---|---|---|
| 1st M.L. (Magnetic Layer) | $Tb_{16}(Fe_{67.5}Co_{30}Cr_{2.5})_{84}$ | 20 | 305 |
| 2nd M.L. (Magnetic Layer) | $Tb_{28}(Fe_{77}Co_{15}Cr_8)_{72}$ | 5 | 152 |
| 3rd M.L. (Magnetic Layer) | $Tb_{20}(Fe_{83}Co_{15}Cr_2)_{80}$ | 20 | 198 |
| 4th M.L. (Magnetic Layer) | $(Tb_{80}Ho_{20})_{28}(Co_{98}Cr)_{80}$ | 10 | 190 |
| 5th M.L. (Magnetic Layer) | $Tb_{26}(Fe_{82.5}Co_{15}Cr_{2.5})_{74}$ | 10 | 190 |
| 6th M.L. (Magnetic Layer) | $Tb_{28}(Fe_{77}Co_{15}Cr_8)_{72}$ | 5 | 152 |
| 7th M.L. (Magnetic Layer) | $Tb_{26}(Fe_{80}Co_{15}Cr_5)_{74}$ | 15 | 185 |

What is claimed is:

1. A magneto-optical recording medium in which
   (a) n layers, wherein n is an odd number equal to or more than 5, of magnetic thin film are exchange-coupled and sequentially laminated together and adhered to a substrate;
   (b) the Curie temperatures, which are represented by Tc and a subscript, for the magnetic layers satisfy the following three relationships for each possible value of m, wherein m is a positive, non-zero integer equal to or less than (n−1)/2, the value of each Tc subscript in said relationships representing the particular magnetic layer, to which that Curie temperature pertains, except that a Tc having a subscript value equaling the value of n+1 represents, instead, room temperature:
   (1) $Tc_{2m+1} \geq Tc_{2m}$,
   (2) $Tc_1 \geq Tc_{2m}$, and
   (3) $Tc_{2m} \geq Tc_{2(m+1)}$; and
   (c) the properties of the magnetic layers are such that when the medium, after having been heated to the Curie temperature of the second magnetic layer, or higher, is cooled, and as the declining temperature of each (2m)-th magnetic layer passes through its Curie temperature, the magnetizations of that layer and the adjacent (2m+1)-th layer are oriented so that the coupling state due to exchange interaction is rendered stable with respect to the adjacent (2m−1)-th layer, while the magnetization of the (2m−1)-th layer retains its immediately previous orientation state.

2. A magneto-optical recording medium according to claim 1, wherein the following condition is satisfied: the vertical magnetic anisotropy constant (ku) of the (2m+1)-th magnetic layer at room temperature is $7 \times 10^5$ erg/cm$^3$ or more, and the saturated magnetization (Ms) at the room temperature is 300 emu/cm$^3$ or less.

3. A magneto-optical recording medium according to claim 1, wherein said magnetic thin films comprise rare earth—transition metal element amorphous alloys.

4. A magneto-optical recording medium in which
   (a) n layers, wherein n is an odd number equal to or more than 7, of magnetic thin film are exchange-coupled and sequentially laminated together and adhered to a substrate;
   (b) the Curie temperatures, which are represented by Tc and a subscript, for the magnetic layers satisfy the following four relationships, wherein m is a positive, non-zero integer equal to or less than (n−1)/2, the value of each Tc subscript in said relationships representing the particular magnetic layer, to which that Curie temperature pertains, except that a Tc having a subscript value equaling the value of n+1 represents, instead, room temperature:
   (1) $Tc_1 \geq Tc_3$,
   (2) $Tc_{2m} \geq Tc_{2(m+1)}$ for $m \geq 2$,
   (3) $Tc_6 \geq Tc_2 \geq Tc_{(n+1)}$, and
   (4) $Tc_{2m+1} \geq Tc_6$ for each possible value of m; and
   (c) at room temperature, the medium is stable in either a first magnetized state, in which the first magnetic layer is magnetized in a predetermined orientation state and atomic spins of each magnetic layer are aligned along the direction of film thickness, or a second magnetized state, in which the first magnetic layer is magnetized in the predetermined orientation state and atomic spins of each magnetic layer are aligned except for non-alignment of atomic spins between the third and fifth magnetic layers, said non-alignment of magnetic spins forming an interface magnetic wall;

(d) the properties of the magnetic layers are such that when the medium is heated from a temperature below $Tc_6$ to a first temperature level at which the temperature of the sixth magnetic layer equals $Tc_6$ and the temperature of the third magnetic layer is less than $Tc_3$, the magnetizations of the fourth and fifth magnetic layers are oriented and aligned with the atomic spin of the third magnetic layer so that the coupling state due to exchange interaction is rendered stable, while the magnetization of the third magnetic layer retains the orientation state existing therein before the heating;

(e) the properties of the magnetic layers are such that when the medium is heated from a temperature below $Tc_3$ to a second temperature level at which the temperature of the third magnetic layer equals $Tc_3$, the magnetization of the third magnetic layer changes to an orientation state different from the orientation state existing therein before the heating;

(f) the properties of the magnetic layers are such that when the medium, after having been heated to either the first or the second temperature level, is cooled, and as the declining temperature of each $(2m)$-th magnetic layer passes through its Curie temperature, the magnetizations of that layer and the adjacent $(2m+1)$-th magnetic layer are oriented and aligned with the atomic spin of the $(2m-1)$-th magnetic layer so that the coupling state due to the exchange interaction is rendered stable with respect to the adjacent $(2m-1)$-th layer, while the magnetization of the $(2m-1)$-th magnetic layer retains its immediately previous orientation state;

(g) the properties of the magnetic layers are such that when the medium, after having been heated to the second temperature level, is cooled, and as the declining temperature of the second magnetic layer passes through its Curie temperature, the magnetizations of that layer and the third magnetic layer are oriented and aligned with the atomic spin of the first magnetic layer so that the coupling state due to exchange interaction is rendered stable with respect to the first layer, while the magnetization of the fifth magnetic layer retains its immediately previous orientation state; and (h) the properties of the magnetic layers are such that when the medium, after having been heated to either the first or the second temperature level, is cooled, the first magnetic layer always retains the predetermined orientation state existing therein at room temperature.

5. A magneto-optical recording medium according to claim 4, wherein each magnetic layer comprises a rare earth—iron group amorphous alloy.

6. A magneto-optical recording medium according to claim 4, wherein the fourth magnetic layer comprises of a material or composition having a smaller magnetic wall energy density than other magnetic layers.

7. A magneto-optical recording medium according to claim 6, wherein the fourth magnetic layer comprises an amorphous alloy of a rare earth element containing Gd as a main component and an iron group element.

8. A magneto-optical recording medium according to claim 6, wherein the fourth magnetic layer comprises a rare earth-iron group amorphous alloy which is dominant in rare earth sub-lattice magnetization.

9. A magneto-optical recording medium according to claim 6, wherein the saturated magnetization $Ms_4$ of the fourth magnetic layer is 200 emu/cm$^3$ greater.

10. A magneto-optical recording medium according to claim 4, wherein $Tc_{2m+1} \geq Tc_3$.

11. A magneto-optical recording medium according to claim 4, wherein the film thickness of the $(2m)$-th magnetic layer except for the fourth magnetic layer is 10 nm or less.

12. A magneto-optical recording medium in which (a) n layers, wherein n is an odd number equal to or more than 5, of magnetic thin film are exchange-coupled and sequentially laminated together and adhered to a substrate;

(b) the Curie temperatures, which are represented by Tc and a subscript, for the magnetic layers satisfy the following three relationships for each possible value of m, wherein m is a positive, non-zero integer equal to or less than $(n-1)/2$, the value of each Tc subscript in said relationships representing the particular magnetic layer, to which that Curie temperature pertains, except that a Tc having a subscript value equaling the value of $n+1$ represents, instead, room temperature:
   (1) $Tc_1 \geq Tc_4$,
   (2) $Tc_{2m+1} \geq Tc_4$, and
   (3) $Tc_{2m} \geq Tc_{2(m+1)}$; and (c) the properties of the magnetic layers are such that when a first external magnetic field is applied to said medium, the magnetization of the first magnetic layer is oriented to be in a stable state relative to the external magnetic field, and the magnetization of the third magnetic layer retains the orientation existing therein before the application of the first external magnetic field;

(d) the properties of the magnetic layers are such that after the application of the first external magnetic field and during the application of a second external magnetic field that is constant, the following conditions are satisfied:

(i) at room temperature, the medium is stable in either a first magnetized state, in which atomic spins of each magnetic layer are aligned along the direction of film thickness, or a second magnetized state, in which the atomic spins of each magnetic layer are aligned, except for non-alignment of atomic spins between the first and third magnetic layers, said non-alignment forming an interface magnetic wall;

(ii) when the medium is heated from a temperature below $Tc_4$ to a first temperature level at which the temperature of the fourth magnetic layer equals $Tc_4$ and the temperature of the first magnetic layer is below $Tc_1$, the magnetizations of the second and third magnetic layers are oriented and aligned with the atomic spin of the first magnetic layer so that the coupling state due to exchange interaction is rendered stable, while the magnetization of the first magnetic layer retains the orientation state existing therein before the heating;

(iii) when the medium is heated from a temperature below $Tc_1$ to a second temperature level at which the temperature of the first magnetic layer equals $Tc_1$, the magnetization of the first magnetic layer changes to an orientation state different from the orientation state existing therein before the heating; and (iv) when the medium, after having been heated to either the first or the second temperature level, is cooled, and as the declining temperature of each (2m)-th magnetic layer passes through its Curie temperature, the magnetizations of that layer and the (2m+1)-th magnetic layer are oriented and aligned with the atomic spin of the (2m−1)-th magnetic layer so that the coupling state due to exchange interaction is rendered stable, while the magnetization of the (2m−1)-th magnetic layer retains its immediately previous orientation state.

13. A magneto-optical recording medium according to claim 12, wherein the fourth magnetic layer comprises a material or composition having a smaller magnetic wall energy density than other magnetic layers.

14. A magneto-optical recording medium according to claim 12, wherein $Tc_{2m+1} \geq Tc_3$.

15. A magneto-optical recording medium according to claim 12, wherein the film thickness of the (2m)-th magnetic layer except for the fourth magnetic layer is 10 nm or less.

* * * * *

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

It is certified that error appears in the above-indentified patent and that said Letters Patent is hereby corrected as shown below:

COLUMN 1:

Line 24, "and" should read --and a--.

Line 27, "analyser." should read --analyzer.--

COLUMN 7:

Line 49, Tc" should read --$Tc_1$--.

Line 52, "magnetooptical" should read --magneto-optical--.

COLUMN 8:

Line 68, "desire" should read --desired--.

COLUMN 13:

Line 21, "10Å," should read --1nm,--.

Line 30, "50nm/min" should read --5nm/min--.

Line 61, "2nm/rain" should read --2nm/min--.

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

It is certified that error appears in the above-indentified patent and that said Letters Patent is hereby corrected as shown below:

COLUMN 14:

Line 23, "Thereafter," should read --¶ Thereafter,--.

COLUMN 15:

Line 2, "magnetooptical" should read --magneto-optical--.

COLUMN 20:

Line 44, "is which" should read --in which--.

COLUMN 23:

Line 34, "Tc" should read --$Tc_{2m'}$--.

COLUMN 24:

Line 34, "rising" should read --raising--.

COLUMN 27:

Line 6, "beam" should read --beams--.

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

It is certified that error appears in the above-indentified patent and that said Letters Patent is hereby corrected as shown below:

COLUMN 28:

Line 61, "abut" should read --about--.

COLUMN 29:

Line 2, "abut" should read --about--.

Line 10, "was" should read --were--.

COLUMN 30:

Line 1, "$2Ms_3Hc_3H_3+2Ms_5Hc_5h_5>$" should read --$2Ms_3Hc_3h_3+2Ms_5Hc_5h_5>$--.

Line 3, "$2Ms_3Hc_3h_3+2Ms_4Hc_4h_4+2Ms_7Hc_7h_7>$" should read --$2Ms_3Hc_3h_3+2Ms_5Hc_5h_5+2Ms_7Hc_7h_7>$--.

Line 4, "$Ms_5h_4+Ms_7h_7)H$" should read --$Ms_5h_5+Ms_7h_7)H$--.

Line 65, "$2Ms_5Hc_5h_5>2Ms_5h_5Hb-\sigma\omega_{57}$" should read --$2Ms_5Hc_5h_5>2Ms_5h_5Hb-\sigma\omega_{35}+\sigma\omega_{57}$--.

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

It is certified that error appears in the above-indentified patent and that said Letters Patent is hereby corrected as shown below:

COLUMN 34:

Line 34, "$2Ms_4Hc_5h_5+2Ms_7Hc_7h_7>-2(Ms_5h_5+Ms_7h_7)h-\sigma-$" should read --$2Ms_5Hc_5h_5+2Ms_7Hc_7h_7>-2(Ms_5h_5+Ms_7h_7)H-\sigma-$ --.

Line 62, "$2Ms_3Hc_3h_3>-2Ms_3h_3Hb+\sigma\omega_{35}$" should read --$2Ms_3Hc_3h_3>-2Ms_3h_3Hb+\sigma\omega_{35}$--.

COLUMN 35:

Line 6, "$\sigma\omega_-$" should read --$\sigma\omega_{57}$--.

Line 66, "$2Ms_3Hc_3h_3+wMs_{5Hc}5h_5>$" should read --$2Ms_3Hc_3h_3+2Ms_{5Hc}5h_5>$--.

COLUMN 36:

Line 31, "(258)" should read --(250)--.

Line 59, "$2Ms_3Hc_3h_3+2Ms_5hc_5h_5+2Ms_7Hc_7h_7>$" should read --$2Ms_3Hc_3h_3+2Ms_5Hc_5h_5+2Ms_7Hc_7h_7>$--.

Line 62, "$+2Ms_9Hc_7h_9-$" should read --$+2Ms_9Hc_9h_9-$ --.

Line 63, "$>2(Ms_3h_3-Ms_5h_5-Ms_9h_9)Hb$" should read --$>2(Ms_3h_3-Ms_5h_5-Ms_7H_7)Hb$--.

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

It is certified that error appears in the above-indentified patent and that said Letters Patent is hereby corrected as shown below:

COLUMN 37:

Line 3, "$2Ms_7Hc_7h_7>-2Ms_7h_7Hb-\sigma\omega_{57}\ \omega_{79}$" should read --$2Ms_7Hc_7h_7>-2Ms_7h_7Hb-\sigma\omega_{57}-\sigma\omega_{79}$--.

Line 5, "$2Ms_7Mc_7h_7+2Ms_9Hc_9h_9>$" should read --$2Ms_7Hc_7h_7+2Ms_9Hc_9h_9>$--.

COLUMN 40:

Line 9, "$(2Ms_1h_1-2Ms_3h_3-2Ms_3h_3-M_5h_4+2Ms_5h_5)H-$" should read --$(2Ms_1h_1-2Ms_3h_3-Ms_4h_4+2Ms_5h_5)H-$ --.

Line 23, "$2Ms_3Hc_3H_3+2Ms_5Hc_5h_5>$" should read --$2Ms_3Hc_3h_3+2Ms_5Hc_5h_5>$--.

Line 55, "$H_{+\sigma\omega 13}-\sigma\omega_{35}$" should read --$H+\sigma\omega_{13}-\sigma\omega_{35}$--.

COLUMN 41:

Line 11, "magnetize" should read --magnetized--.

Line 33, "$(Ms_4h_4-2Ms_5h_5-2Ms_5h_5-2Ms_7h_7-2Ms_7h_7-2-$" should read --$(Ms_4h_4-2Ms_5h_5-2Ms_7h_7-2-$ --.

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

It is certified that error appears in the above-indentified patent and that said Letters Patent is hereby corrected as shown below:

Line 66, "$(2Ms_1h_1-2Ms_3h_3-Ms_4h_3-Ms_4h_4)-\sigma\omega_{35}$" should read --$(2Ms_1h_1-2Ms_3h_3-Ms_4h_4)Hb-\sigma\omega_{35}$--.

COLUMN 42:

Line 5, "$Ms_5h_5)Hb-_{\sigma\omega}13+\sigma\omega_{57}$" should read --$Ms_5h_5)Hb-\sigma\omega_{13}+\sigma\omega_{57}$--.

Line 32, "$2(Ms_1h_1-Ms_3h_3-Ms_4h_4+Ms_4h_4+Ms_5h_5)Hb-$-" should read --$2(Ms_1h_1-Ms_3h_3-Ms_4h_4+Ms_5h_5)Hb-$ --.

Line 37, "$2(Ms_1h_1-Ms_3h_3-Ms_3h_3-Ms_4h_4+Ms_5h_5+Ms_7h-$" should read --$2(Ms_1h_1-Ms_3h_3-Ms_4h_4+Ms_5h_5+Ms_7h-$ --.

COLUMN 43:

Line 42, "$Hb+\sigma\omega_{13}+\sigma\omega_{13}-$" should read --$Hb+\sigma\omega_{13}-$ --.

Line 63, "$Hb+\sigma2_{13}-\sigma\omega_{35}$" should read --$Hb+\sigma\omega_{13}-\sigma\omega_{35}$--.

COLUMN 44:

Line 10, "$Hb-\sigma\omega_{79}$" should read --$Hb-\sigma\omega_{35}-\sigma\omega_{79}$--

Line 35, "$2MS_3Hc_3h_3+2Ms_5Hc_5h_5+2Ms_7Hc_7Hc_7h_7+2Ms_9H-$" should read --$2Ms_3Hc_3h_3+2Ms_5Hc_5h_5+2Ms_7Hc_7h_7+2Ms_9H-$ --.

Line 36, "$c_9h_92>$" should read --$c_9h_9$--.

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

It is certified that error appears in the above-indentified patent and that said Letters Patent is hereby corrected as shown below:

Line 38, "$\sigma\omega_{13}(584)$" should read --$\sigma\omega_{13} \ldots\ldots\ldots(584)$--.

Line 42, "$(-2Ms_5h_5+_{Ms4}h_4-2Ms_7h_7)Hb$" should read --"$(-2Ms_5h_5+Ms_4h_4-2Ms_7h_7)Hb$--.

Line 44, "$2MS_5Hc_5h_5$" should read --$2Ms_5Hc_5h_5$--.

Line 51, "(589A)" should read --(58A)--.

COLUMN 46:

Line 50, "rising" should read --raising--.

COLUMN 48:

Line 7, "magnetooptical" should read --magneto-optical--.

COLUMN 49:

T.4, Under Composition, "$(Dy_{0.30}(Fe_{0.88}Co_{0.12})_{0.70}$" should read --$Dy_{0.30}(Fe_{0.88}Co_{0.12})_{0.70}$--.

COLUMN 53:

T.12, Under Composition, "$(fe_{76.7}Co_{23.3})_{74}$" should read --$(Fe_{76.7}Co_{23.3})_{74}$--.
T.13, Under Composition, "$(Gd_{70}Ho_{30})_{35}$" should read --$(Gd_{70}Co_{30})_{35}$-- and "$(Fe70Co_{30})_{65}$" should read --$(Fe_{70}Co_{30})_{65}$--.

UNITED STATES PATENT AND TRADEMARK OFFICE
CERTIFICATE OF CORRECTION

PATENT NO. : 5,418,076
DATED : May 23, 1995
INVENTOR(S) : TSUTOMU SHIRATORI

Page 8 of 9

It is certified that error appears in the above-indentified patent and that said Letters Patent is hereby corrected as shown below:

COLUMN 55:

T.18, Under Composition, "$Gd_{15(Fe68}Co_{30}Al_2)_{85}$" should read --$Gd_{15}(Fe_{68}Co_{30}Al_2)_{85}$--.

COLUMN 57:

T.20, Under Composition, "$(Tb_{80}Ho_{20})_{28}(Co_{98}Cr)_{80}$" should read --$(Tb_{80}Ho_{20})_{28}(Co_{98}Cr)_{72}$--.

UNITED STATES PATENT AND TRADEMARK OFFICE
CERTIFICATE OF CORRECTION

PATENT NO. : 5,418,076
DATED : May 23, 1995
INVENTOR(S) : Tsutomu Shiratori

It is certified that error appears in the above-indentified patent and that said Letters Patent is hereby corrected as shown below:

COLUMN 58:

Line 38, "the" should be deleted.

COLUMN 59:

Line 62, "of" should be deleted.

COLUMN 60:

Line 7, "greater," should read --or greater.--

Signed and Sealed this

Nineteenth Day of December, 1995

Attest:

BRUCE LEHMAN

Attesting Officer

Commissioner of Patents and Trademarks